(12) United States Patent
Troyer

(10) Patent No.: US 6,183,092 B1
(45) Date of Patent: Feb. 6, 2001

(54) LASER PROJECTION APPARATUS WITH LIQUID-CRYSTAL LIGHT VALVES AND SCANNING READING BEAM

(76) Inventor: Diane Troyer, 4554 Lennox Ave., Sherman Oaks, CA (US) 91403

( * ) Notice: Under 35 U.S.C. 154(b), the term of this patent shall be extended for 0 days.

(21) Appl. No.: 09/071,398

(22) Filed: May 1, 1998

(51) Int. Cl.[7] .................................................. G03B 21/14
(52) U.S. Cl. ................................ 353/31; 349/22; 359/197
(58) Field of Search ................................. 353/31, 33, 34, 353/37, 122; 349/22, 5; 348/751, 761, 766, 790; 359/197, 212, 215, 221, 223

(56) References Cited

U.S. PATENT DOCUMENTS

| | | | |
|---|---|---|---|
| 5,255,082 | * 10/1993 | Tamada | 353/31 |
| 5,317,348 | * 5/1994 | Knize | 353/31 |
| 5,465,174 | * 11/1995 | Sprotbery | 353/31 |
| 5,506,597 | * 4/1996 | Thompson et al. | 345/85 |
| 5,517,263 | * 5/1996 | Minich et al. | 353/31 |
| 5,537,258 | * 7/1996 | Yamazaki et al. | 359/634 |
| 5,700,076 | * 12/1997 | Minich et al. | 353/31 |
| 5,729,374 | * 3/1998 | Tiszauer et al. | 359/212 |

* cited by examiner

Primary Examiner—William Dowling
(74) Attorney, Agent, or Firm—Ashen & Lippman

(57) ABSTRACT

Laser lines at 635 nm or longer (ideally 647 nm) are preferred for red, giving energy-efficient, bright, rapid-motion images with rich, full film-comparable colors. Green and blue lines are used too—and cyan retained for best color mixing, an extra light-power boost, and aid in speckle suppression. Speckle is suppressed through beam-path displacement—by deflecting the beam during projection, thereby avoiding both absorption and diffusion of the beam while preserving pseudocollimation (noncrossing rays). The latter in turn is important to infinite sharpness. Path displacement is achieved by scanning the beam on the liquid-crystal valves (LCLVs), which also provides several enhancements—in energy efficiency, brightness, contrast, beam uniformity (by suppressing both laser-mode ripple and artifacts), and convenient beam-turning to transfer the beam between apparatus tiers. Preferably deflection is performed by a mirror mounted on a galvanometer or motor for rotary oscillation; images are written incrementally on successive portions of the LCLV control stage (either optical or electronic) while the laser "reading beam" is synchronized on the output stage. The beam is shaped, with very little energy loss to masking, into a shallow cross-section which is shifted on the viewing screen as well as the LCLVs. Beam-splitter/analyzer cubes are preferred over polarizing sheets. Spatial modulation provided by an LCLV and maintained by pseudocollimation enables imaging on irregular projection media.

34 Claims, 19 Drawing Sheets

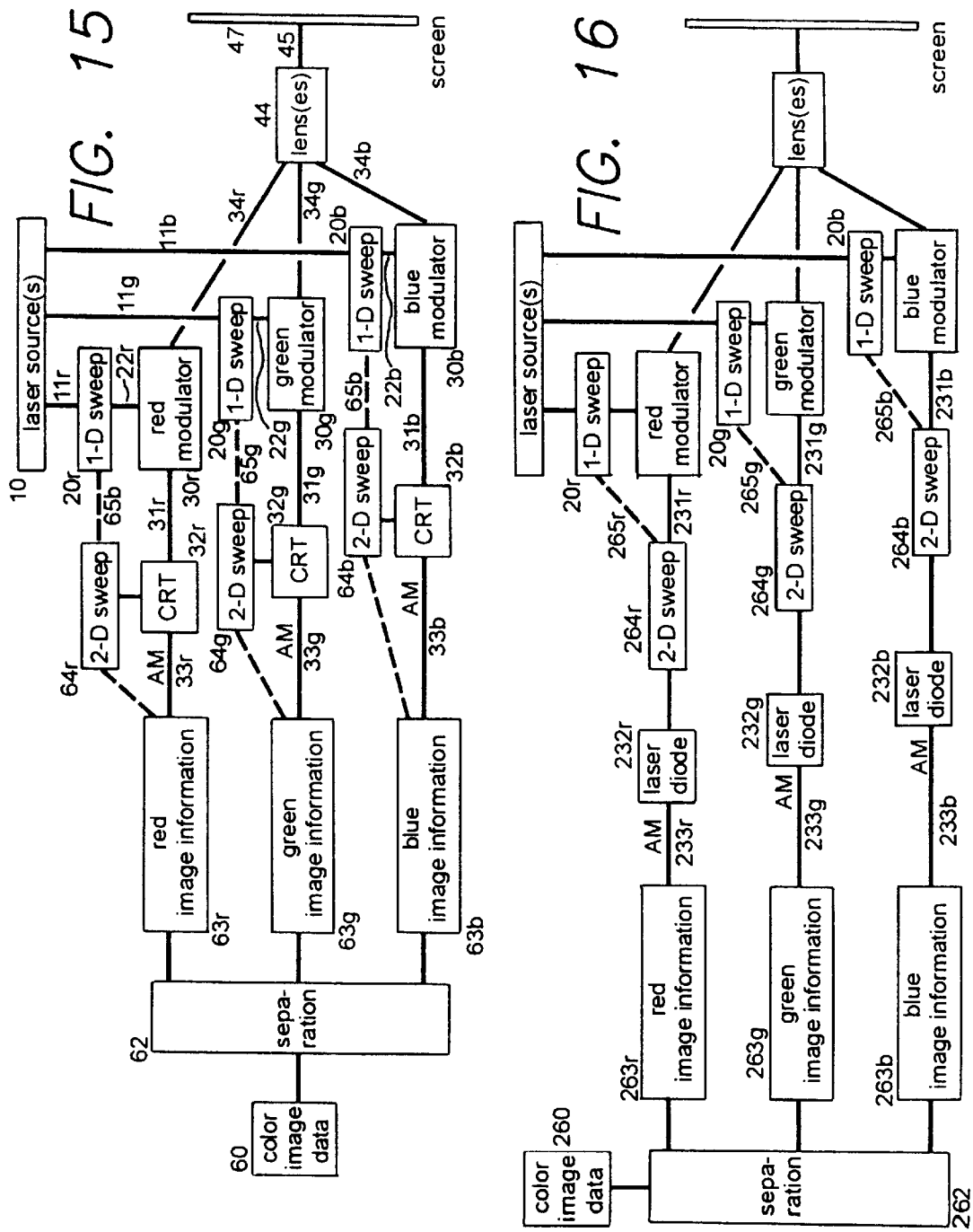

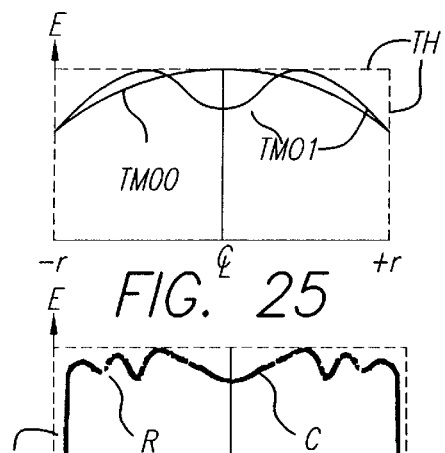
FIG. 25
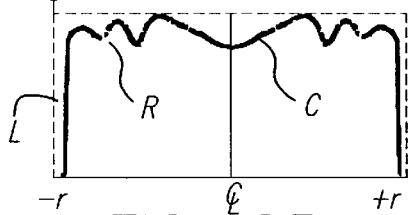
FIG. 25a
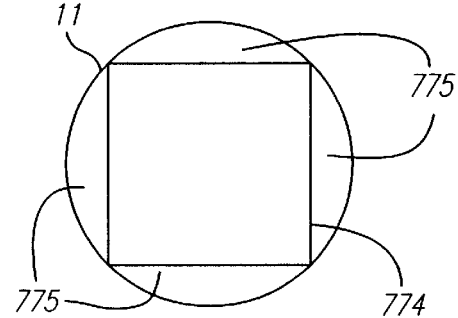
FIG. 26
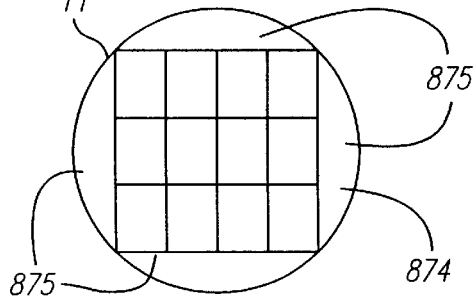
FIG. 27
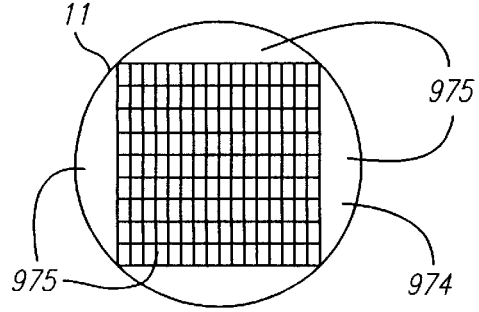
FIG. 28
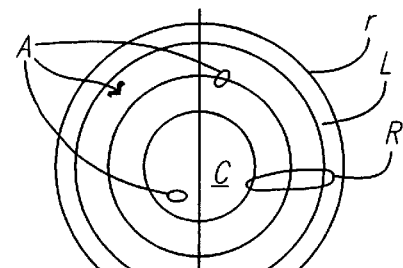
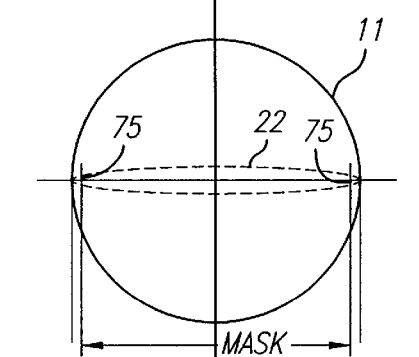
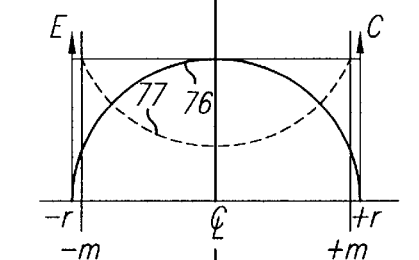
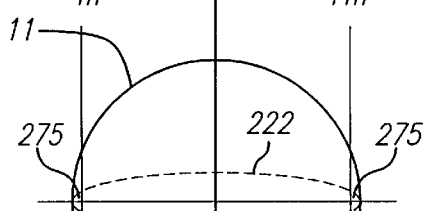
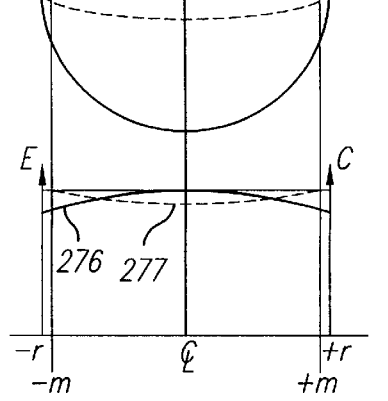
FIG. 29

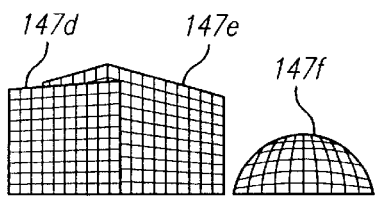
FIG. 30
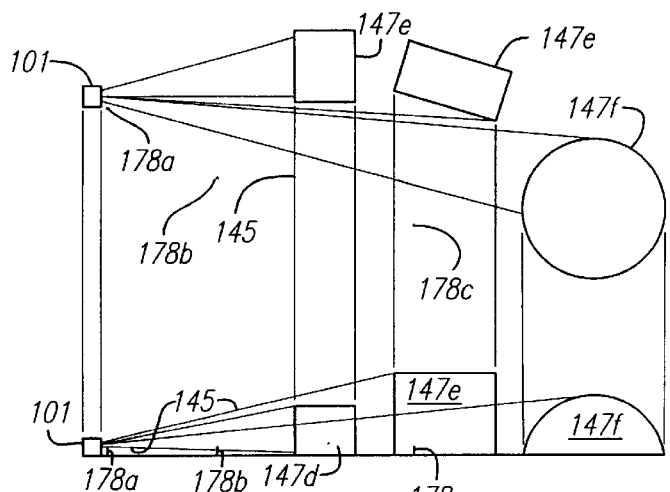
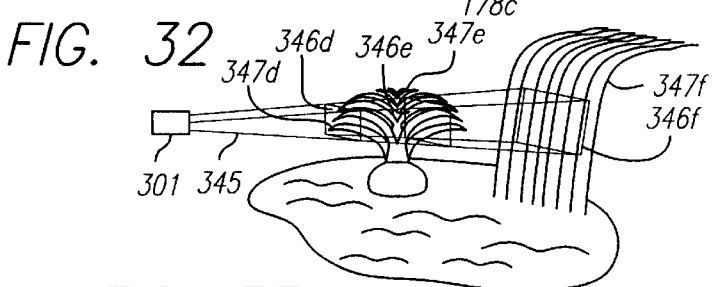
FIG. 32
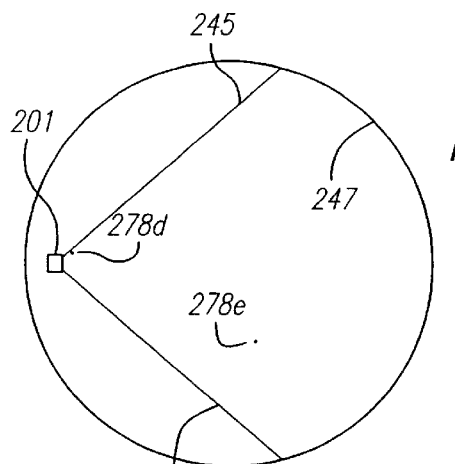
FIG. 31
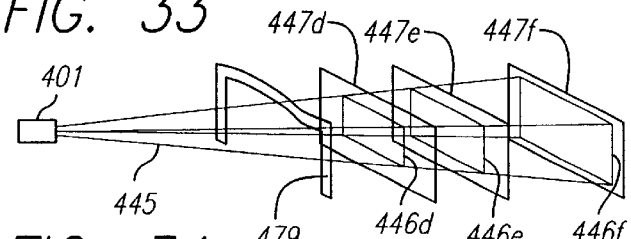
FIG. 33
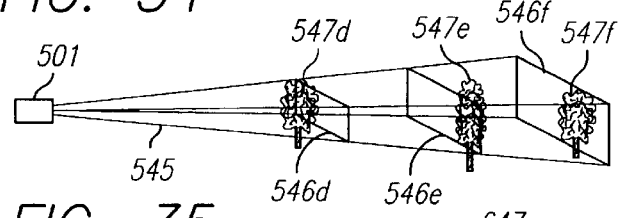
FIG. 34
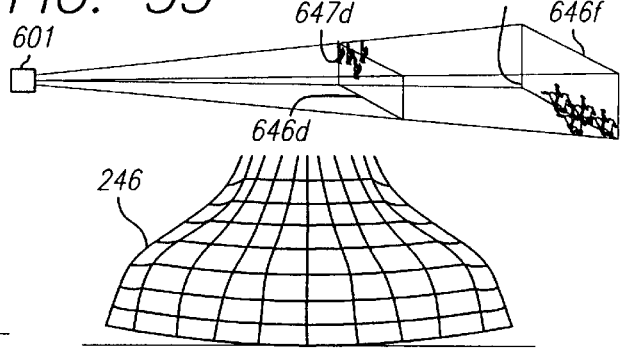
FIG. 35
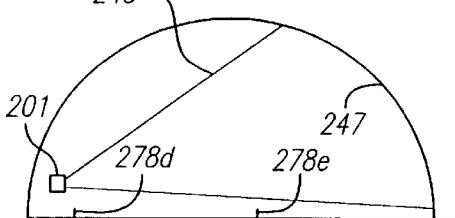

LASER PROJECTION APPARATUS WITH LIQUID-CRYSTAL LIGHT VALVES AND SCANNING READING BEAM

BACKGROUND

1. Field of the Invention

This invention relates generally to devices for projecting pictures onto large viewing screens; and more particularly to such devices that project laser beams via reflective liquid-crystal light valves to form such pictures. The invention has its most important applications in such projection of moving pictures.

2. Related Art a) Known potential of lasers—Since the advent of the laser, people have been trying to find new ways to use lasers in projecting pictures of one kind or another, for large audiences. This is both natural and reasonable, since lasers offer several important characteristics that are relevant in large-image projection.

As will be seen from the following recap of these characteristics, one would expect these characteristics to be responsible for a predominance of laser projection systems in large-screen displays for both video home use and theater-scale displays. Indeed, several powerful large international companies have attempted—at monumental cost—to develop such equipment for market.

Therefore, while reading the following discussion of laser advantages for large-screen projection sources, please bear in mind this overriding question—why are large-screen laser projectors not common in the marketplace?

(i) energy efficiency—All other things being equal, the amount of light needed to show any kind of picture on a projection medium (viewing surface) is proportional to the area to be covered by the picture. Optical energy is therefore of utmost importance in a large-format projection system, and it is necessary to pay for visible optical energy with electrical energy.

In such transactions it is well understood that some conversion inefficiency is unavoidably involved as a sort of tariff—in other words, that a sizable fraction of the electrical energy used will go into invisible forms of energy such as heat, or near-infrared and ultraviolet radiation. Normally there is relatively little objection to this price in itself, but the question does arise of just how sizable a fraction one can afford.

With nonlaser light sources, this concern is compounded when taking into account the additional surcharge for optical energy that is visible but goes off in directions other than into the collecting optics of a projector. Most nonlaser sources (incandescent hot-filament or arc lamps) radiate approximately equally in all directions. The amount of visible light that can be directly collected from such a source into an optical system is typically less than a tenth of the visible light produced.

It can be dismaying to pay for many times the amount of electrical energy used—even that which is directly used to make visible light, setting aside consideration of the conversion efficiency discussed above. Therefore it is common to provide reflectors behind the source, or more generally speaking to try to surround the source with reflectors to help capture a greater geometrical fraction of the visible energy. Such efforts, however, complicate and compound the management of heat thrown off due to those same conversion inefficiencies considered above.

A laser, though of course itself a costly article, greatly improves all these energy economics. Since its optical emissions are directional, essentially all the emitted light can be very easily captured for use.

Furthermore, to a significant extent the spectral components an be controlled so that minimal energy is wasted in infrared or ultraviolet radiation. A laser is therefore far more energy efficient than other sources—with respect to both raw conversion efficiency of electricity into visible light and geometrical capture of that visible light.

Lasers and their power supplies do give off heat, and this must be managed. In comparison with a typical arc lamp or like device, a laser is vastly more favorable with respect to the amount of heat, the temperature involved, and the difficulty of collection.

(ii) brightness—With most types of light sources, increasing the amount of light available calls for fabrication of a source that is scaled up in all three dimensions, more or less equally, and therefore greatly complicates the process of collecting the light and drawing off heat.

To make a brighter laser, it is necessary in essence to make a laser which is just like one that has various desirable known properties, except with a bigger tube. Over a small range of brightness increases, furthermore, what is needed is only a longer tube. Heat management with a longer tube reduces to using the same hardware, but more of it, as with a shorter tube. Even if brightness requirements do call for increased diameter too, the elongated character of most laser structures tends to distribute and thus mitigate the problems of power and heat management.

With a bigger laser, all the greater amount of optical flux can be made to go in essentially the same direction and into essentially the same projection system as the corresponding smaller laser. These oversimplifications of course slight some practical considerations such as design of power-supplies, cooling, and lasing modes, but summarize an important way—for purposes of image formation—in which lasers differ from other light sources.

(iii) contrast—Several properties of lasers tend to enhance contrast in a projected image. The simplest of these is once again inherent directionality, which facilitates both collection of input illumination and handling of an image, with minimum crosstalk between different portions of the beam or the image.

Contrast is enhanced by avoiding such crosstalk—or in other words preventing the spill of a cast over an entire image frame, from bright image areas. Such undesired spill corrupts areas that should be dark. Further enhancement of just the same sort arises from the inherent collimation of a laser beam.

Equally or more important, when most modern image-modulation devices are taken into account, is the inherent monochromaticity of a laser beam. Other sources emit light over the entire visible spectrum, requiring subdivision into spectral segments, and physical separation into distinct beams that can be separately modulated and then recombined to give full-color images.

In either type of system, laser or nonlaser, the final optical stage—i.e., the projection lens—is preferably broadband since it preferably carries all the colors in a common beam; for this purpose a high-quality achromat is desired. The benefits under discussion apply to all earlier optical stages, where the functions being performed are much fussier and complicated than the final projection stage.

With such other sources, each distinct beam carrying a separated spectral segment is already broadband, either complicating or degrading the effectiveness of all optical effects or manipulations. These include everything from perturbation of simple focusing (chromatic aberration) to the operation of sophisticated image-modulating devices (see below).

Since operation of lenses, polarizers, prisms, dichroics and image modulators are all wavelength-dependent, the operation of virtually all optical components in a projection system using such other sources tends to scatter light away from the precise bright-region positions where it should be. The result is to create a kind of halo about such positions—or, again, depending on the brightness contours of a particular image, even to produce a filmy bright cast over much of a scene that should be darker.

Also of great importance is the inherent polarization of a laser beam. Many large-screen projectors of the present day employ an image-writing stage that controls a high-intensity light beam by spatial modulation of the beam.

As discussed more fully in later sections of this document, almost all such modulators rely upon formation of a latent image in polarization state (or as it is sometimes called, a "phase object"). This image is later developed by passage through some form of polarization analyzer.

Other projectors intensity-modulate a scanning spot of a high-intensity beam; here too, the phenomenon most commonly exploited to accomplish modulation is the polarization of the beam. For all such applications a laser is ideally suited, first of all because no light need be discarded (or recaptured through a complicated optical train) merely because its polarization state does not match what can be used by a modulator.

More significant to contrast enhancement is the relative sharpness (i.e., narrowness of angular range) of laser polarization, in comparison with polarization obtained through a common polarizer. Because of this, in areas of a latent image that should be bright (calling for passage of a beam through the downstream polarizer), the polarization state provided when using a laser source is defined more sharply; the same is true for areas that should be bright and call for extinction. The latent image therefore is potentially brighter where it should be bright, and darker where it should be dark—or, in other words, has better contrast.

It is true that the latent image yet remains to be developed through a polarizer, leading to some imprecision in isolating for projection the polarization state that is nominally correct. Nevertheless—even based upon the sharper polarization definition in the latent image alone—both the beam passage in bright areas and the beam extinction in dark areas are better.

(iv) sharpness—Another benefit due to the inherent collimation of a laser beam is that it produces sharper images. This is partly associated with contrast enhancement, due to the wavelength- and polarization-dependent effects discussed above. In a scanning-spot projection system (whether amplitude-modulated or not), laser-formed images are sharper also in part because of the capability of a highly collimated beam to be focused to a fine spot.

In image-modulation systems, laser beams are able to traverse great distances without degradation of spatial modulation. In other words, a spatially modulated beam can carry an image over a long distance without becoming blurry. For a laser system, this performance characteristic may be more associated with favorable divergence properties than with collimation.

In any event, except for contrast effects already discussed, the capability of a good arc-lamp-based projector to produce a sharp image at a distance may be about as good as a laser-based system heretofore—provided that the image is projected onto a screen or other viewing surface that is:

(1) flat or very gently curved,
(2) essentially at right angles to the beam, and
(3) not moved toward or away from the projector after the projector is set to produce a sharp image.

In other words the prior-art laser projector may have little advantage in sharpness as such if the projection medium is all at the same distance from the projector, and there is an opportunity to adjust the projector for the actual projection distance.

Cases in which these conditions fail are discussed in the following paragraph. In both types of systems, laser and nonlaser, the ability to maintain image sharpness as such over long distances depends to a major extent on the quality and size of the final projection lens.

(v) infinite depth of sharpness—Laser systems have a unique and major advantage over white-light systems, in projection onto projection media that are at varying distances from the projector. Such media also can be positioned or oriented so that they are not all at a common, preset projection distance.

These media can include, for example, surfaces that are strongly angled to the projection beam. In the vector-graphics part of the laser-projector field, this is a well-known characteristic—which I have sometimes termed "infinite focus". It is also possible with other types of laser-transmitted images, including both vector- and raster-scanned spots as well as images projected with spatial modulators.

It has been suggested to me that the term "infinite focus" is a misnomer, in that "focus" refers to formation of an image at a preset "focal plane" (sometimes in the retina) by convergent light rays from various parts of a lens system. Such convergence requires adjustment of the optical system for a specific projection distance—a process with which of course nearly everyone is familiar. My phrase "infinite focus" derives from the concept of "depth of focus", combined with the idea that laser-transmitted images seem to have infinite depth of focus.

As I now understand, however, laser beams when used to project images in such a way as to obtain this effect are not focused at all. The image is not formed by convergence of rays from different parts of a lens, either at a preset "focal plane" or otherwise.

Rather an image can be impressed upon a laser beam by so-called "spatial modulation" of the beam. This means that each pencil of rays from the laser carries a specific, fixed part (e.g. pixel) of the image. Laser beams are initially collimated so that the ray pencils are all parallel, never crossing one another or converging.

It is possible to force a laser beam to converge to a rather fine point (of course only an approximation of a point) by interposition of a lens that does focus all the rays. For present purposes it would not make sense to do this, since there would be no image—only a single bright spot—and indeed this is never done in a system that displays the "infinite" effect.

Instead the spatially modulated beam is simply directed to a viewing medium, where the ray pencils are stopped and so make the impressed image visible to viewers. In practice such a beam can be expanded, to form a large image on a large viewing medium, and for this purpose a substantially conventional lens may be employed—and within the constraints of pixel or raster-line visibility the image will be sharp but never "focused".

The other half of the phrase "infinite focus" is also somewhat inaccurate since there are some limits to the depth, along the projection direction, at which images appear sharp. These limits are imposed by beam divergence and other diffraction effects.

For reasons that will appear after I have introduced my invention, however, these effects should never come into play in a laser-based system properly designed and assembled for image projection. Therefore in other parts of this document I have replaced my earlier terminology with the phrase "infinite depth of sharpness" or simply infinite sharpness.

It has been recognized that this deep-sharpness effect is of potentially great value for special effects. Some of this value has been actually achieved in some vector systems, as will be explained below, but the much greater potential for raster images has not been realized in practice heretofore.

The importance of the previously posed question as to the nonappearance of laser projectors in the marketplace should now be apparent. Some reasons for that peculiarity will appear from the following sections of this document.

b) Vector-scanning laser systems—Generally speaking this term refers to free-form movement of laser beams from any point on a projection medium to any other point, and following any specified trajectory (e.g. curved) rather than a preset framewise pattern as discussed in the next section.

(i) light-show style—Historically these were the first displays for large audiences, and are straightforward to produce since equipment was minimal and artistic opportunities maximal. In most cases the beams are neither amplitude modulated nor focused (a small-diameter laser tube yielded a small spot for entertainment purposes), and a relatively slow sweep is usually employed so that audiences can perceive the spot motion itself as well as the trajectory. Since the color effects of the independent laser beams are an important part of the show, there is no point in forming or sweeping a combined beam.

I mention these early systems primarily because—as long as the beams are not focused—a primitive sort of equivalent of infinite sharpness is enjoyed for each beam independently. That is to say, beams can be projected onto surfaces at considerably varying distances from the lasers without changing spot size.

The beneficial uses of this phenomenon are entirely familiar to designers and operators of these shows as a sort of special-effects trick that can be used to enhance light-show imagery. The desirability of extending this phenomenon to infinite sharpness as related to projection of whole picture images is accordingly also believed to be known in this field.

It will be understood, however, that in the light-show context spot size does change, to the extent that the beams are spread out on a viewing surface that is angled to the projection beam. (Depending on audience position—i.e., whether the audience is looking essentially along the projection direction or along a normal to the surface, or from some other direction—the stretching may not be visible in its entirety, or at all.)

It is very important to recognize this sort of spreading on an angled viewing surface, and to distinguish it from failure of the beams to be sharp. An analogous spreading/sharpness distinction arises later in discussing whole-picture-image projection.

(ii) graphics—As in the now-familiar vector graphics of computer programs such as CAD/CAM, Corel@ Draw, Visiog and so forth, the use of vector graphics in a laser-based projection system is well understood and highly versatile. It may be used to provide economically and quickly a simple, static production nameplate, or a more elaborate moving display for similar purposes, or of course cartoons for entertainment etc.

In this case the beams may be amplitude modulated for more complex effects, and the beams may be combined into a composite beam that is swept as a unit—in which case the entire resulting image may enjoy infinite sharpness provided that the beams are simply projected and not focused. As will be seen, vector-graphics projection is of only secondary interest for present purposes.

c) Raster-scanning systems—The topic now turns to reproduction of whole picture images that are generalized, in the sense that the projection system is a neutral vehicle for display of any raster-based image. The projection-system raster can be set to match traditional or conventional broadcast television, whether U.S. interlaced or otherwise, or to match a high-definition television format—or to match a conventional computer-monitor format, or any other well-defined raster specification.

(i) amplitude-modulated spot, with separately swept beams—In essence such a system would be a direct laser-projector analog of a conventional television set, requiring amplitude modulation at video speeds, and for each color independent two-dimensional sweep. Such devices may never have been put into practice, but they are well represented in U.S. Pat. No. 3,524,011 of Korpel (1968), assigned to Zenith Radio Corporation. (Korpel's independently swept beams optionally share a common projection lens.)

Such a system cannot provide accurate infinite sharpness of a full-color image, as introduced above, since Korpel's separately swept individual-color beams emanate from spaced-apart points (possibly even spaced-apart projection lenses) and can therefore accurately converge to form a registered image only at a preselected plane. If, however, the projection distance (or audience distance) is kept much larger than the spacing between the origination points or lenses, and the inherently collimated beams are not focused, registration error at differing projection distances can be made negligible and a semblance of infinite sharpness can be obtained.

(ii) amplitude-modulated spot with sweeping of a combined beam—A device of this type should have true infinite sharpness, since what is swept is a unitary beam (again provided that the system does not bring the beam to a sharp focus). Systems with this type of configuration and particularly employing solid-state lasers are disclosed by Knize, noted earlier, as well as U.S. Pat. No. 5,534,950 to David E. Hargis and U.S. Pat. No. 5,614,961 to Frank C. Gibeau, Ph. D. Amplitude modulation in these systems is by electrical control of the lasers.

It appears that these systems may have considerable promise, but are not to be found in the marketplace. It would seem that for these devices with present-day available components the laser power at certain needed wavelengths, or the modulation response speed, or the overall economics, or combinations of these considerations, are inadequate for realistic commercial exploitation.

d) Line-scanning systems—The great bulk of reported and patented developments in laser projectors is of this type, using a separate acoustooptic modulator (AOM) for each primary color. A seminal patent in the linewise AOM regime is U.S. Pat. No. 3,818,129 of Yamamoto, assigned to Hitachi. In such a system each AOM is a crystal driven by an acoustic wave propagating laterally (with respect to the laser-beam path) and modulated by one video raster line at a time.

The compressions and rarefactions of this input modulation in the AOM create or write a phase-retardation pattern within the crystal, extending transversely from one side of the crystal to the other and representing optical modulation in one primary color for an entire video raster line. In the most-advanced forms of these systems, just as the formation of this retardation pattern is completed a laser is pulsed to provide a light beam intersecting the pattern at right angles.

This reading-beam pulse length is very short compared with the propagation speed of the acoustic wave through the crystal, so that in effect the laser illumination is able to stop the motion of the raster line. The laser beam in effect reads the entire retardation pattern, and upon leaving the crystal has impressed upon it—in phase retardation—a latent image of the entire raster line.

This image is then developed, as suggested earlier, by a polarization analyzer or equivalent, downstream of the crystal. The result is an image of one primary color component of the raster line, which is then preferably combined with like images for the other two primaries, formed in separate AOMs.

At some point in the optical system, whether before or after the modulation stage, each of the three individual primary-color laser beams or the composite beam must be shaped to form a wide, shallow beam cross-section. For reasonable optical efficiency within the modulators it appears preferable to use a more-common beam aspect ratio in passage through the modulators—i.e., to perform the shaping after the beam has passed through the modulators, though before the final projection lens. Considerable variation in such aspects of the design, however, is possible.

The composite beam is enlarged and projected to a particular position vertically on a viewing screen, forming a three-color raster line for viewing by the audience. The process is repeated for successive lines—but shifting the vertical position progressively down the screen—to construct an entire image frame, and then for subsequent frames to produce moving pictures.

The vertical position for each raster line is controlled by a rotating polygon or other vertical-sweep device, so that successive lines are displaced to successive appropriate positions on the screen. This sweep, it is important to note, follows the modulators—i.e. is introduced downstream, along the optical path, from the modulators—as exemplified, for instance, by U.S. Pat. No. 5,255,082 of Tamada, assigned to Sony.

Thus in AOM systems the slot-shaped beam is scanned or stepped only on the projection screen, not on the modulators. Though capable of moderately high contrast (over 300:1 in certain military projectors), high resolution, reasonably good color saturation, and infinite sharpness, this type of system is subject to important limitations and also certain qualifications as explained below.

It appears that some of the largest and most sophisticated corporate participants in the laser-projector race have persistently placed their money—many millions of dollars of it, over many years—on the acoustooptic modulator entries. These include Sony, Schneider, TRW and IBM as well as a host of lesser players.

For all that wagering, none of the AOM entries is seen to place or even show, today. Many have dropped out entirely.

As suggested near the beginning of this "background" section, resources invested in laser projectors have been wholly disproportionate to performance. The question remains why this pattern continues.

(i) light inefficiency and energy loss—This is the dispositive consideration for AOM-based systems. Unfortunately the compromises that enable achievement of the favorable parameters listed above also reduce, to an unacceptably low level, the light efficiency of the modulators and the system in general. The only laser projectors built in this way that actually operated to produce excellent image quality were military systems that required extremely large, high-power, expensive lasers.

(ii) low bandwidth—Another element that suffers in these systems is the capability to follow rapid action in a scene. This may be related to persistence (or propagation speed) in the AOM crystal, or the modulation constraints that follow inherently from the need to refrain from outpacing the pulsed-laser optical reading system.

(iii) complex optics—Many optical stages are needed in an AOM system. The military projectors mentioned above, though they operated continuously for two years and always maintained certain military specifications of brightness, resolution and contrast, had more than forty-five optical elements. Each optical surface attenuates undesirably.

(iv) stepped, slot-shaped beam—The special significance of these features will be seen in later portions of this document. For purposes of the present "background" section, it suffices to point out that use of this type of beam is required by, and directly associated with the nature of the line-at-a-time modulator:

Since the modulator processes one raster line at a time, the pulsed beam on which this modulation is impressed must necessarily correspond in shape to the wide, shallow aspect ratio of one raster line. It would not be possible to operate a one-raster-line-at-a-time modulating system with any other beam shape.

Similarly, it follows necessarily from the generation of a complete raster line in optical form that the optical system must include an optical stepper or continuous scanner of some sort—to shift the target position successively down the viewing screen for the successive raster lines, as described earlier. Even a continuous scanner, in this type of system, amounts to a stepper since the beam is pulsed only intermittently, once per raster line. It would not be possible to operate a one-raster-line-at-a-time modulating system without some sort of stepper.

To the best of my knowledge it has not been reported in the prior art that a slot-shaped beam, or a stepping system for such a beam, might confer any other benefits upon a laser projection system.

Now before going on from vector-, raster-, and line-scanning (AOM) systems to take up systems that employ some very different kinds of modulation, I shall pause and digress to discuss some very important special considerations peculiar to laser operation. As will be seen later, these are matters of particular relevance to my invention.

e) Speckle—This well-known term describes a now-familiar phenomenon of laser illumination, a coarse and very bright granular pattern of light that shimmers with tiny movements of the viewer's eyes. Speckle is highly undesirable in image projectors for displaying ordinary pictures (movies, television shows etc.) because it pervades the images and distracts from the informational or dramatic content of the show.

It has been explained to me that speckle is an interference pattern formed within the eye. Although in principle present with other sources too, speckle is not ordinarily visible with such sources. Those skilled in the art recognize that the speckle effect can be made negligible by introducing various kinds of either phase confusion or relative motion, as between the laser source and the eye.

Heretofore, however, actual equipment called into service for accomplishing this has fallen far short of the elegant. Many elaborate schemes of greater or lesser cost and complexity are described in the literature.

One such "speckle eliminator", which is among the more complex but demonstrates the seriousness of the problem, is presented by Hargis, mentioned previously. Hargis introduces several approaches, "each of which introduces an optical path randomizing [medium] at an intermediate . . . plane within the projection optics".

One of his systems is "a spinning diffusion plate" which works at "transverse plate velocities in excess of a few centimeters per second" but suffers from "transmission inefficiency (~50%) . . . large numerical aperture . . . and . . . general bulkiness." Transmission is improved "to the 85%-95% regime" by substituting "a thin sheet of wax supported between glass plates."

Another system is a "flowing fluid diffuser" using "a highly turbid fluid", suffering from "low transmission efficiency with the inconvenience of a pump and associated plumbing." A third, relying not on flow but on "Brownian motion", Hargis rejects because "its transmission efficiency is limited, compared with what presently appears to be the best available system described below".

His favored choice is a "novel nutating plate" which "takes advantage of the desirable properties of wax laminate diffusers". It involves a screen—

"supported on springs, and caused to vibrate in a plane . . . perpendicular to the projection axis of the video image beam . . . by orthogonal electromagnets . . .

"Motion relative to two orthogonal axes is induced in plate 25, together with a 90-degree phase shift between those motions, in order to avoid periodic moments of zero velocity which would be associated with simple harmonic motion along a single axis. The result is a non-rotating diffuser which undergoes rapid nutation, much in the manner of the contact surface of a[n] orbital sander. Hence, all regions of the image are subjected to the same motion. An excursion of 1 millimeter at 60 Hz provides constant transverse velocity of about 20 cm sec$^{-1}$. This yields an inexpensive device which is barely larger in cross section than the imaging beam itself."

Provision of his illustrated device, plus a system of electromagnets and associated electrical drive, may not be expensive but it is certainly elaborate and surely diffuses—and thus randomly redirects and wastes—expensive laser energy.

Other workers have proposed a great variety of systems (likewise severely overcomplicated, in most cases) for elimination of speckle. Representative are U.S. Pat. No. 5,272,473 teaching a transducer that generates surface acoustic waves in a projection screen, U.S. Pat. No. 5,506,597 proposing an array of mirror cells movable between two positions in conjunction with a magnifying element, U.S. Pat. No. 5,274,494 disclosing use of a Raman cell to introduce optical sidebands, U.S. Pat. No. 5,233,460 counseling division of laser light into three separate beams and introducing differential delay or polarization rotation before recombination, U.S. Pat. No. 3,633,999 similarly advising a splitter to make many separate beams whose speckle patterns mutually cancel, and U.S. Pat. No. 4,511,220 describing two polarizing beam splitters and a totally reflecting right angle prism that form a composite beam with mutually incoherent components.

Very generally speaking, speckle elimination systems of which I am aware exhibit two common drawbacks. They add otherwise unnecessary mechanical or electromechanical equipment, and more importantly they subtract light.

f) Gamut and saturation—patents and other technical literature that touch on the selection of wavelengths for the primary colors in laser projectors, by and large, have favored color conventions or standards approaching those of commercial broadcast television. The most important of these conventional wisdoms relates to selection of wavelengths for use as the primary red.

It is well known that wavelengths close to the visible-color chromaticity envelope provide the broadest and best base for building a capability to display rich, saturated colors. Nevertheless leading workers in the laser-projector field have taught away from use of a long-wavelength red.

For example, U.S. Pat. No. 5,255,082 of Tamada, assigned to Sony, strongly rejects use of laser lines in the region of 647 nm for a primary red beam. Tamada offers the reasoning that such wavelengths should be avoided because they are weak in the spectra of certain lasers which he prefers.

Following suit is U.S. Pat. No. 5,136,426 of Linden, assigned to Advanced Laser Projection. Linden warns that the—

"red light component produced by the krypton ion laser requires four-to-five times the power as the comparable power of an [argon] ion laser . . . . The krypton red light component is at a wavelength that the human eye is not as sensitive to and therefore makes it difficult to balance with the other colors to give a complete color scale with reasonable power.

"The [argon] ion laser in combination with a dye laser is therefore preferred . . . . The dye laser preferably converts light energy of a shorter wavelength to a longer, tuneable wavelength."

Like other leaders in this field, Tamada and Linden counsel use of wavelengths in the range of 610 nm for primary red, generally based on rationales such as presented above.

It appears that one underlying motivation for such a choice may have stemmed from the use of commercial video standards or conventions—NTSC, PAL or HDTV—which consistently favor the 610 nm range. This historical choice, in turn, appears to have arisen not truly because of apparent luminosity to the human eye but rather from the limited availability of television-display phosphors during early color video development.

Another interesting historical development in the laser projector field is the prevalent technique of filtering out certain cyan lines that are present in popular lasers—particularly argon lasers, which are a good choice for providing both blue and green lines. There seems to be a high likelihood that the cyan light is discarded because it prevents ready mixing of accurately neutral colors (black, white and gray), as well as ideal rendition of all other colors—when 610 nm lines are chosen for the red primary.

The choice of laser light at 610 nm for red thus has complicated repercussions—particularly since the cyan light in an argon-laser beam amounts to some forty percent of the total power or energy in the beam. Discarding that large fraction of the beam power is a profligate waste, when a major challenge in the laser projector field is finding enough energy at a reasonable price to form an adequately bright large image.

Whether because television phosphors lacked the capacity for deeper red or because of their need for greater brightness, present laser-projector workers stress the NTSC-based luminance chart and the 610 nm red options—and thus forsake the broader color gamut available in both film and computer monitors, as well as the ample beam power readily available in the cyan lines.

Some writings in the laser-projector field, such as the Tamada and Linden patents, do at least mention the possibility of longer-wavelength primary reds. All such writings are limited to either:

(1) use of such reds with acoustooptic modulators (AOMs), or (2) direct, electrical amplitude modulation of the source lasers.

As will be seen, neither of these paths is part of the genealogy of my invention.

g) Laser types proposed or used—It is well known, at least in concept, to employ lasers of a great number of different types for laser projectors. In particular it is known to employ gas, dye and solid-state lasers in this field.

(i) gas—Many subtypes are known, but foremost in this category are argon lasers for spectral-line groups in the blue and green, and krypton lasers for red. Thus argon gas laser beams are commonly split for separate modulation in separate AOMs that receive blue and green image-data components, while a krypton gas laser beam is modulated in a third AOM that receives red image-data components.

These lasers are relatively straightforward to operate and adjust. They require neither pumping nor tuning. They require neither mixing nor frequency-doubling. Accordingly they provide good efficiency as to both electrooptical energy and human-operator efforts.

(ii) dye—In the opinions of many workers in this field, dye lasers are of particularly great value because they are tunable (particularly to 610 nm). In the opinion of this writer, reliance on tunability is a handicap because of the extra operator attention which it demands, as well as the high cost of tunable mirrors and other needed paraphernalia.

Dye lasers are considerably less user-friendly than gas lasers, on account of their requirements for management of an additional pumping stage at the front end and mixing stage at the back. In most cases they also consume profligate amounts of extra energy in generating light at frequencies that are not wanted but merely needed for purposes of subtraction or addition to obtain desired frequencies.

This waste may be acceptable in high-end consumer or boardroom equipment, where literally conspicuous consumption can be a virtue. It is highly questionable, however, in a cost-conscious commercial environment, for example a light-hungry projector system for driving a monumental IMAXO-style screen or an outdoor-spectacle system which projects images onto, actually, monuments and other structures.

(iii) solid state—These devices may in the end become the only sources that make economic sense, for use in my invention as well as other types of systems. At the time of writing, reasonable sources are available in red and green.

No adequate solid-state laser exists, however, for use as a blue primary source in even a large consumer/boardroom unit. Solid-state blue lasers adequate for use in large outdoor displays would appear to be at least some years in the future.

It is true that for such special applications a very large number of individual very small solid-state lasers can be ganged to amass a mighty beam. The overall economics (and possibly ancillary procedures) of that approach appears unfavorable relative to the present invention.

h) Liquid-crystal "device" modulators—Unlike the AOM, a liquid-crystal "device" or "display" (LCD) modulator provides modulation over an entire frame. Here it is possible to flood an entire frame at a time, and project the resulting full frame to a projection screen or other viewing medium.

(i) some leading work in the field—Active current effort on advanced LCD modulators that operate on unpolarized beams is seen from researchers at Kent State University (see SMPTE Journal, April 1997). Earlier LCD efforts correspond to U.S. Pat. No. 5,040,877 of Blinc, assigned to Kent State; U.S. Pat. No. 5,517,263 of Minich, assigned to Proxima Corporation; U.S. Pat. No. 4,851,918 and U.S. Pat. No. 4,720,747 of Crowley, assigned to Corporation for Laser Optics Research; and also U.S. Pat. No. 5,485,225 of Deter, assigned to Schneider.

(ii) visible electrode structure—All LCD modulators are operated in transmission. That is to say, in such a system a laser beam is projected completely through the entire device from one side to the other.

All these devices accordingly require direct electronic writing of the desired image electronically rather than optically—and this in turn requires one or another form of multiple-electrode structure, in a pattern that is spread over the entire frame. These electrodes are nominally transparent, and indeed are not readily visible in displays of modest size, such as for instance less than five feet along a diagonal.

In theater-size and larger formats, however, the electrode edges are quite conspicuous. These patterns are distracting and intrusive, leaving LCD modulation essentially unusable for high-quality imaging in theater and outdoor applications, unless all of the audience is at a very great distance from the screen or other projection medium.

(iii) no infinite sharpness—Also a drawback for such large-scale applications is the fact that these LCD units fail to preserve the laser property, described earlier, of maintaining sharp imaging at widely varying projection distances. Various special-effects potentialities are thereby foreclosed.

i) Liquid-crystal light valves—These liquid-crystal light valves (LCLVs) are to be carefully distinguished from the liquid-crystal display or device modulators discussed just above. Whereas an LCD operates in transmission and requires passing the projection beam through electrodes in the image-writing (input) stage of the modulator, an LCLV operates in reflection and has entirely separate image-writing and projection stages.

The image-writing stage may have electrodes, or may be written optically or thermally, but all such activity is entirely isolated from the projection stage by an opaque mirror. There is one, unitary electrode in the projection stage but its edges are ordinarily outside the image frame.

(i) development of the LCLV—Pioneering work with LCLVs is due entirely to Hughes Aircraft Company and Hughes-JVC Technology Corporation. This is seen in a series of patents extensively elaborating the LCLV and its usage in many variants over two decades. These include U.S. Pat. No. 4,019,807 of Boswell (1977), U.S. Pat. No. 4,127,322 of Jacobson, U.S. Pat. Nos. 4,343,535 and 4,378,955 of Bleha, U.S. Pat. No. 4,425,028 of Gagnon, U.S. Pat. No. 5,071,209 of Chang, U.S. Pat. No. 5,363,222 of Ledebuhr, U.S. Pat. No. 5,398,082 of Henderson, U.S. Pat. No. 5,428,467 of Schmidt, U.S. Pat. No. 5,450,219 of Gold, and U.S. Pat. No. 5,465,174 of Sprotbery (1995).

A particularly important precursor of the LCLV is attributed to Dr. Bleha. Particularly helpful expositions of the working principles of these ingenious modulators appear in the Boswell and Jacobson patents. Apparently an LCLV may be a twisted-nematic type, a birefringent type, a hybrid of the two, etc.

(ii) structure and operation of an LCLV—Common to the several LCLV variants is a basic laminar configuration in which an input or writing stage first develops a voltage that varies spatially within the device frame, in accordance with brightness variations that constitute an image to be projected. An output or reading stage has a polarization-influencing characteristic—such as a particular index of refraction, corresponding to a particular optical phase delay.

The writing stage and reading stage are separated by an opaque mirror, and the whole assemblage is sandwiched between two transparent planar electrodes. By virtue of these electrodes, voltages developed in the writing stage are applied to the reading stage.

The spatially varying voltage induces corresponding spatial variations in the polarization-influencing characteristic of the reading stage. Meanwhile polarized light—the reading beam—is introduced into the output or reading stage, reflected from the internal mirror and returned toward the projection screen.

The spatial variation in index causes the desired image-brightness variations to be expressed as a spatially varying polarization field, carried by the light beam leaving the reading stage. As described earlier, this polarization field is decoded or developed by a polarization analyzer so that the beam carries a spatially varying intensity field, which is perceptible to the eye as an image. For color images, this strategy is replicated for each of three primary colors.

The resulting beam or beams are projected (with or without combination into a common projection beam) in a substantially conventional way through a projection lens to a viewing medium. Whereas the writing stage may be excited with very low-intensity light as for instance from a small CRT (or by low voltages applied to an electrode matrix, or in other ways), the reading stage is preferably excited with extremely intense, projection-level illumination—such as, in the Hughes work, a high-current arc lamp.

Evidently Hughes personnel have explored the use of LCLVs with, exclusively, such incandescent sources ("white" light). One reference, however, does propose the use of LCLVs with laser sources—and that is not a Hughes document but rather is the above-noted patent of Minich (Proxima). Both types of usage are discussed below.

(iii) image projection using incandescent-lamp sources—Regardless of other optical conditions, broad-spectrum conventional light sources cannot provide the infinite-sharpness characteristic. It goes without saying that the Hughes projectors, operated as described in all the Hughes patents, necessarily operate by actually focusing images on a projection screen, with the associated shallow depth of focus. Accordingly these systems are incapable of the earlier-mentioned special-effects applications that rely on infinite sharpness.

(iv) full-frame—Most of the Hughes patents describe operation with the high-intensity "reading" or output stage of the LCLV modulator flooded continuously by projection light, or in other words all illuminated at once. This type of operation offers a particularly appealing simplicity and elegance: in essence the entire projection frame is opened and held open, for whatever input may be written to the input stage.

The output for regions of the frame that are not being written, however, is simply dark. Thus for instance if a very small but bright pen-light type of flashlight could be pointed onto the writing stage and played about manually, presumably a mammoth searchlight would appear to be—in real time—correspondingly wandering about on the projection medium, which might be for instance the exterior of a very large building. Subject to contrast limitations, the projection medium would be substantially dark in regions corresponding to writing-stage regions not illuminated by the pen-light.

(v) poor energy economics, and brightness nonuniformity—The full-frame LCLV Hughes system is, however, subject to several drawbacks. First, per the above introductory subsection on laser vs. nonlaser comparison, as in most other projection systems the light from an incandescent source is emitted in essentially all directions. Only a small fraction of this omnidirectional radiation can be effectively captured for guiding into the LCLV, and the remainder becomes a source of heat-management problems.

Second, the light collected from a high-intensity source is typically nonuniform across the frame in which that light is collected. This too can be mitigated, and in conventional ways including use of frosted (i.e., diffusing) elements—but such solutions further scatter optical energy with only limited directionality, and so inevitably further aggravate the already unfavorable collection geometry. Special lensing, too, may be used to reduce central bright spots, but at yet-additional cost—both monetary and thermal.

Third, most writing stages operate incrementally—in other words, based upon some sort of scanning input such as a raster-driven or vector-graphics-driven spot of light, which inherently can be active in only a very small portion of the writing-stage frame at any given moment. The costly or even precious high-power light beam, however, is directed indiscriminately to the entire frame, including mostly unreceptive regions that are not being written at any given moment. This mismatch of written and read regions is mitigated by the persistence characteristic of the LCLV—that is, the continuing capability of a written region to pass reading light, for a length of time perhaps equal to a tenth to a fourth of the period of an entire frame, after the writing in that region stops. Thus the unfavorable factor is not on the order of thousands, only on the order of four or ten—but still distinctly unfavorable.

Fourth, yet more energy loss is incurred in beam masking to fit the image shape & projection frame. Whereas collection systems typically yield beams that are circular, projection frames are square or (particularly for widescreen movies) rectangular.

In the case of masking down a circular beam 11 (FIG. 26) to a square projection format 774, for example, the discarded chordal areas 775 amount to about thirty-six percent of the area of the circle—as is verified by simple arithmetic later in this document. Thus 36% of the energy in a circular beam is wasted in masking to a square frame.

Worse, in masking to a three-by-four screen format 874 (FIG. 27) the discarded fractions 875 come to 39%. In going to the popular widescreen nine-by-sixteen format 974 (FIG. 28) the lost fractions 975 are nearly 46%, close to half of the optical energy in the circular beam.

(vi) polarization analyzer—Now turning from energy losses somewhat in the direction of performance, the intrinsic contrast ratio of an LCLV although high is far from perfect, particularly since polarization extinction for broad-spectral-band light is hard to control. (As noted previously, the operation of polarizing devices is wavelength-dependent.)

Thus a perceptible glow may pass through an LCLV to the projection medium in regions that should (based on the written image) be dead black. In this way some of the costly optical energy extracted from the omnidirectional source—and still remaining after the several inefficient processes discussed above—is used to illuminate areas that are dark in the desired image.

(vii) vertically swept "slot"—Several of the Hughes patents are direct testament to the intractable character of these problems. The above-mentioned Henderson, Schmidt and Gold patents in particular lay out these same difficulties and discuss a proposed solution.

Henderson teaches simply shaping of a white-light beam, from an incandescent source, into a shallow slot-shaped beam—and scanning that beam across an LCLV modulator. In this case, since the light source itself is continuously operating, a continuous sweep produces a continuum of overlapping successive beam positions rather than a discrete-stepping effect. Henderson's goal is to greatly improve energy uniformity, masking, read/write efficiency and contrast of an LCLV system by placing the reading light in precisely the region where the writing is taking place.

Evidently, as it appears, Henderson was not wholly successful in this—since the companion Schmidt patent explains at column 2 (lines 48 through 56), and also at column 9 (lines 30 and 46) that Henderson's approach, considered alone, suffers severely from the loss of "telecentric behavior" of the optical system, and also from chromatic aberration. Schmidt notes that the purpose of his own invention is to restore "telecentric behavior" and mitigate adverse chromatic effects.

A telecentric optical system is defined in the Gold patent as a system in which all "chief rays" are made to parallel the optical axis of the system. A chief ray, in turn, is by definition a ray that originates at an off-axis point of an object or source and crosses the axis. Like chromatic aberration, these are characteristics of conventional white-light systems in which, for example, rays from various points of an object which extends transverse to the axis are collected in a lens and redirected—many typically crossing the axis—to construct an image also transverse to the axis (but located at another point along the axis).

Schmidt proposes resolving the Henderson problems through particular forms of rotating polygonal deflectors that are transparent, and ingeniously configured to preserve telecentricity. Gold teaches use of a more conventional reflective rotating polygon, but coupled with somewhat elaborate optical elements to pre- and postcondition the slot-shaped beam for deflection at the polygon—also to preserve (or restore) telecentricity.

Despite these yeoman efforts, it appears that Hughes has never used the scanning-slot system commercially. Not even the most-recently introduced projector models—or technical papers—from the Hughes development group suggest any movement toward adoption of the Henderson/Schmidt/Gold system.

Perhaps this is due to the difficulty of forming a white-light source beam into a very shallow, very wide slot-shaped beam, without discarding so much light that the overall system is unacceptably inefficient and impractical. Henderson, for example, mentions (column 6, line 55) that brightness in at least the vertical cross-section of the beam is Gaussian, and suggests masking off a substantial portion of even that cross-section to avoid using the skirts of the Gaussian beam. In any event it seems that the scanning-slot beam—if not simply inoperative—was a dead-end side trip, in the course of developments at the birthplace of the liquid-crystal light valve.

(viii) image projection using laser sources—The previously mentioned Minich patent proposes to use LCLVs with laser sources—including red laser lines in the neighborhood of 620 nm. Minich asserts that his LCLV-based apparatus is "substantially similar . . . to the system [using a transmissive LCD modulator], except that the [LCLV] apparatus operates reflectively rather than transmissively."

By lumping these devices together somewhat indiscriminately, Minich suggests less than full appreciation for their major differences. As mentioned earlier, the transmissive LCD devices are objectionable for very-large-format projection because of conspicuous electrode patterns which they display.

Neither the problems of beam-shape matching and contrast nor the possibilities of scanning slot-shaped beams are taken up by Minich—in either his above-noted patent or his more-recent one, U.S. Pat. No. 5,700,076. These problems are just as important with laser sources as with the Hughes white lamps.

Likewise the problem of speckle in systems using LCLV modulators is never taken up by Minich in those patents. It is substantially impossible to operate a laser/LCLV projector without addressing this obstacle.

Minich furthermore fails to address the desirability of infinite sharpness, although this represents a major application for laser projectors. The conventional understanding is that the image-forming mechanisms of LCLV modulators destroy laser-beam coherence and thereby foreclose achievement of infinite sharpness.

Still further, in the patents mentioned above Minich says nothing of the problems of brightness uniformity. Whereas beam nonuniformity in white-light LCLV systems is significant, in a laser-beam LCLV system it is of the utmost importance—because laser beams are subject to a number of artifacts that become plainly visible on the projection screen if a laser beam is simply expanded to flood an LCLV reading stage.

To fill in certain portions of his disclosure, Minich refers to documents of Texas Instruments Incorporated (column 5, line 58) and of Hughes (column 9, line 58). The overall focus of the Proxima development program, as suggested in the Minich patent, is upon very compact, lightweight and inexpensive projectors that are very unlike the very large, high-quality Hughes product (and two orders of magnitude lower in price). Actual Proxima machines on the market appear to correspond to the more-recently issued '076 Minich patent mentioned above, not to anything in Minich '263.

All in all, it appears that the disclosures in the '263 Minich patent are conceptual rather than practical. It may offer, as the foregoing enumeration of omissions suggests, a less than completely enabling disclosure.

j) Marketplace considerations—The foregoing discussion indicates some answers to the question posed earlier, "why are large-screen laser projectors not common in the marketplace?" The answer is that numerous practical problems attendant the real-world design and manufacture of a commercially viable laser projector have not been answered.

One device that might provide a key to solution of some of these problems—the liquid-crystal light valve—has not been associated with laser projectors either in the marketplace or (notwithstanding the Minich '263 patent) in any meaningful, practically oriented enabling publication. No product or publication has revealed how to provide infinite sharpness, or otherwise how to project images on irregular projection surfaces having dramatically varying projection distances.

No teaching in the art has revealed how to defeat speckle without adding elaborate equipment appendages that subtract light. The art has never resolved, in marketplace terms, the problems of brightness, contrast, energy efficiency, masking, or illumination of nonwriting regions which Henderson, Schmidt and Gold attempted to address.

As can now be seen, the related art remains subject to significant problems, and the efforts outlined above—although praiseworthy—have left room for considerable refinement.

SUMMARY OF THE DISCLOSURE

The present invention introduces such refinement. The invention has several independently usable facets or aspects, which will now be introduced. Although these aspects are capable of use independently of one another—and as will be seen they have distinct advantages considered individually—for optimum enjoyment of their benefits the various aspects are preferably practiced together in conjunction with one another, and most preferably are all practiced together.

In preferred embodiments of a first of its independent aspects or facets, the invention is a laser projector which includes laser apparatus for projecting a picture beam that includes visible laser light. The light is of wavelength about six hundred thirty-five nanometers (635 nm) or longer. Also included is a reflective liquid-crystal light valve for modulating the beam with a desired image.

The foregoing may be a description or definition of the first facet or aspect of the present invention in its broadest or most general terms. Even in such general or broad form, however, as can now be seen the first aspect of the invention resolves certain of the previously outlined problems of the prior art.

In particular my invention uses a liquid-crystal light valve in conjunction with a laser operating wavelength region that runs counter to all the conventional wisdoms discussed in the background section of this document. By doing so, my invention provides—and is the first to provide—a laser projector that makes an energy-efficient, bright, rapid-motion image with rich, full colors that are equal to or better than the gamut and saturation produced by conventional motion-picture film projectors.

As mentioned earlier, except for some AOM systems the wavelength region of choice has been about 610 nm—and AOM systems are wholly unsatisfactory for the reasons described earlier (inefficient use of light energy, low moving-image bandwidth, and complex optics). Hence as a practical matter it has been impossible or at least uneconomic to fully realize the potential for good color gamut with such devices.

Evidently the 610 to 620 nm mind-set in this field has been due to the familiarity of television images and the desire to make images compatible with broadcast video, mitigate brightness limitations, and mix good neutral colors after discarding cyan lines from certain laser sources. The fundamental philosophy has been that laser projectors are competitors of large-screen television sets.

Workers in this field are accordingly convinced that 610 nm red yields exciting, snappy, punchy colors. Actually, however, 610 nm corresponds to orange, or at most a red-orange, and this choice prevents attainment of rich color. The rose colors, deep reds and purples, and even a good honey color are difficult to achieve if the red is not deeper. This is the reason that red roses appear a banal orange-ish on television.

My invention proceeds from a contrary philosophy. The fundamental objective of high-quality laser projector systems should be image quality consistent with or better than film, not broadcast television.

Although the first facet of my invention thus greatly improves upon the state of the art, nevertheless I prefer to practice this aspect of my invention in conjunction with certain other features or characteristics that optimize the benefits of the invention. For instance I prefer that light which appears red in the laser beam include substantially only the laser light of wavelength about 635 nm or longer.

More particularly I prefer that the apparatus project a beam of wavelength between about 635 and 650 nm. The most highly preferred wavelength is about 647 nm.

Although my invention is fully capable of projecting still images, I further prefer that the image be a moving picture.

In addition I prefer that a projector according to this aspect of the invention also provide green and blue laser light—for mixing with the laser light of wavelength about 635 nm or longer to provide substantially pure neutral colors including pure white and pure black. (Naturally the green and blue are also used for other purposes.)

There may seem to be something of a semantic contradiction in this concept of "pure black", as black is an absence of all light and color. It may be hard to conceive how controlling spectral content of light used in an image-forming device can influence what is seen when all light is absent. Since the era of oil paintings and throughout the age of color photography and color lithography, however, achieving accurate color balance "in the shadows" has been a mark of particular excellence. Precise control of color in this difficult region is an important figure of merit. Thus what is really at issue is the capability of a color-reproduction system to represent dark neutral colors, colors along the neutral axis of the color-gamut solid, in the limit as the black pole is approached.

Preferably the laser apparatus projects substantially cyan light with the blue or green light, or both. Heretofore, as mentioned earlier in this document, cyan has been systematically removed from laser beams for image-projection use, thereby both discarding a large fraction of the light power in the beam and making the achievement of good whites and blacks more awkward. In my present invention accordingly a very significant increase in available beam power is enjoyed, while at the same time color mixing is enhanced—not only along the neutral axis or at the surface of the color-gamut solid, but throughout—merely by refraining from exclusion of naturally occurring cyan lines.

Some of my other preferences relate to speckle suppression, which will be discussed more fully below. At this point, however, it bears mention that this aspect of my invention preferably also includes some means for at least partly suppressing visible speckle in such a picture.

The suppressing means preferably include apparatus for displacing the beam during its projection, in conjunction with the light of wavelength about 635 nm or longer. I have discovered that this color is particularly beneficial in reducing or eliminating speckle, when used together with at least certain arrangements for beam displacement.

Even better is a combination of the 635 nm or longer light with the cyan light mentioned above. I cannot explain reliably why these wavelength combinations help suppress speckle, but possibly the admixture of cyan—which cannot interfere constructively or destructively with the other colors—through a sort of spectral confusion tends to reduce visible speckle. In any event I have observed the improvement, and the validity of this preference in practice of my invention does not rely on the correctness of my speculation.

Several preferences relate to modes of usage. I prefer that apparatus of this first aspect of my invention also be able to receiving high-bandwidth red, green and blue computer-monitor signals from a computer; and that the projector thus serve as a high-color-fidelity computer monitor. Preferably the liquid-crystal valve is not controlled by light derived from traditional or conventional broadcast video signals.

The liquid-crystal light valve is preferably controlled by light or control signals applied to the valve by writing onto a control stage of the valve:
- a vector, bitmap or other computer file scanned from an image or generated in a computer, or
- amplitude-modulated laser-diode illumination swept two-dimensionally across the control stage, or images from a small transmissive liquid-crystal display modulator, in turn written by signals not derived from traditional broadcast video signals, or other entire frames without interlace, or a raster whose lines cross a short dimension of a picture frame, or motion-picture film color separations, or a still image from a slide or overhead-projection transparency, or a color separation made from such a slide or transparency, or a live image optically coupled, without electronic intermediary, to the control stage.

Although the most highly preferred form of my invention eschews use of broadcast video inputs, in another mode of use of my invention preferably the light valve is controlled by light substantially derived from a type of conventional or traditional broadcast video signals. In this case it is preferred that substantially no color correction or gamma adjustment be applied to remove the effects of using the 635 nm or longer-wavelength laser light instead of broadcast video standard red.

This last-discussed preference is particularly interesting in view of the previously described devotion to the 610 nm regime, among prior artisans in this field. I have discovered that 635 nm red is better even for display of traditional broadcast video signals, and that no correction is needed.

I do, however, also prefer that—where the apparatus also provides green and blue laser light—the proportions of light power of the about 635 nm or longer-wave laser light, the green laser light and the blue laser light be very roughly eight to six to five (8:6:5). The 635 nm red laser light is thus provided in greater proportion, and contrary to dire earlier teachings I have found that this can be done in a practical and economic way.

The first facet of my invention, still under discussion, can be practiced in some very important alternative forms. In one such form, for instance, every laser in the apparatus is exclusively a solid-state laser. In another form every laser in the apparatus is instead exclusively a gas laser.

Now turning to a second of the independent facets or aspects of the invention: in preferred embodiments of this second facet, my invention is a laser projector that includes laser apparatus for projecting a picture beam along a path. The beam includes laser light which tends to generate visible speckle when used to form a picture on a projection medium.

The projector includes some means for at least partly suppressing visible speckle in such a picture. For purposes of generality and breadth in describing and discussing my invention, I shall refer to these means simply as the "suppressing means".

The suppressing means in turn include some means for displacing the path during projection of the beam. Again for generality I shall call these means simply the "displacing means".

The foregoing may constitute a definition or description of the second facet or aspect of the present invention in its broadest or most general terms. Even in such general or broad form, however, as can now be seen the second aspect of the invention resolves the previously outlined problems of the prior art.

In particular this aspect of my invention reduces speckle without the primary drawback of prior systems—namely, absorbing or diffusing the beam. This second facet of my invention thereby gains not only a significant advantage in the efficient use of optical energy but also substantially preserves a sort of collimation or pseudocollimation, which as will be seen has major advantages of its own.

Although this second facet of the invention as most broadly articulated represents a major advance in the art, to enhance its benefits I nevertheless prefer to practice this aspect of the invention in conjunction with certain other features or characteristics.

For instance I prefer that the projector further include a liquid-crystal light valve having a beam-modulation stage for impressing an image onto the beam; and that the displacing means scan the beam over this beam-modulation stage during projection. In this case it is also preferable that the displacing means scan the beam over the beam-modulation stage by mechanically or electrooptically deflecting the beam path rotationally.

For such purposes preferably the directing means comprise an optical deflecting element mounted for mechanical rotation. Still more preferably the deflecting element comprises a mirror mounted on a galvanometer or motor (such as for example a stepping motor). One additional detailed preference, most particularly applicable if the mirror is planar, is that the mirror be mounted for rotation about an axis substantially in a reflective surface of the mirror.

I also prefer to use this aspect of the invention with a light valve which also has a control stage to control the "impressing" function. In this case it is preferred that the projector also include some means for writing an image incrementally onto successive portions of the control stage; and some means for controlling the displacing means in a special way. These means respectively I shall call, for the reason suggested earlier, the "incremental writing means" (or simply "writing means") and "controlling means". The controlling means operate to direct the beam onto successive selected portions of the modulation stage, and to generally synchronize the beam with the image-writing means.

The preferences stated in the preceding paragraph are particularly beneficial. The controlling means provide the beam displacement needed for reduction or elimination of speckle—but yet their small cost and slight added complexity need not be charged off to the achievement of speckle suppression alone, since stepping a shallow beam, and synchronizing the beam with the image-writing process, has numerous other important advantages.

I prefer that the control stage be a photosensitive stage that receives an incrementally written optical image. Alternatively, however, for certain purposes the control stage includes an electrode matrix that receives incrementally written electrical voltages.

I also prefer that the deflecting means be substantially nondiffusing. Incorporation of such deflecting means, in the writing and controlling means discussed above, produces a remarkable benefit: the projector can be used in forming a speckle-suppressed image on an irregular projection medium that has portions at distinctly different distances from the projector. In other words, the projector has speckle suppression in conjunction with the previously discussed capability of infinite sharpness.

As is well known, the liquid-crystal light valve operates by introducing at least partial disruption of the laser-light coherence. This second aspect of my invention, however, nevertheless preferably includes some means for projecting the picture beam onto such an irregular projection medium.

Very surprisingly, the picture beam forms an image that appears substantially sharp on the portions of distinctly different distances—notwithstanding the at least partial disruption of coherence. This extraordinary result is entirely inconsistent with the conventional understandings in the art.

In particular, when I first proposed this preferred form of the second aspect of my invention—to colleagues of advanced technical expertise in light-valve theory and operation—they advised me that the configuration would not retain infinite sharpness. They explained that the reason was that a liquid-crystal light valve (like a multimode optical fiber, for instance) destroys the coherence of the beam.

I have demonstrated, however, that this configuration does indeed achieve the infinite-sharpness characteristic. A theoretical grounding for this result has since been suggested to me. As I understand it, lasers have several special properties including not only coherence but collimation, although these two properties are to a certain extent physically interrelated and in most circumstances go hand in hand.

It appears that in my invention the phenomenon of infinite sharpness arises—after spatial modulation of the laser beam at the liquid-crystal light valve—in part because, as I understand it, spatial modulation is preserved in the propagating laser beam. This characteristic makes it possible to project an image simply by projecting that beam, rather than by refocusing an image from the light valve as with imperfectly collimated nonlaser light.

The capability to preserve spatial modulation is in turn attributable not to coherence but to collimation. In my invention, since the beam is made to expand, collimation (parallelism of rays) is not maintained literally. Nevertheless a crucial characteristic of collimation is preserved: the rays do not cross one another.

This property of noncrossing rays—which may be called pseudocollimation or perhaps quasi collimation—still further in turn, is maintained by the nondiffusing mirror or other deflecting optics in the speckle-suppression aspects and embodiments of my invention. Since the rays neither cross as in a focal system nor become scrambled as in a diffuser, there is no crosstalk between different portions of the image—or in other words spatial modulation is preserved.

I wish it to be understood that the foregoing explanations, which seem to account for successful infinite-sharpness operation of my invention, merely represent efforts of others to explain that success after the fact, and may be speculative. The actual successful operation is itself a fact, not dependent upon the validity of these explanatory efforts—and of course the validity of my appended claims related to this preference for the second aspect of my invention is not to depend upon the correctness of these efforts.

An additional preference is that the displacing means be substantially lossless, to within one percent of beam intensity. Another preference is that the projector also include beam-expansion means which cooperate with the displacing means to achieve a net gain in light-energy efficiency.

In comparison with masking off original circular edges of the laser beam, such a gain for a square image approaches roughly fifty-six percent, and for a screen aspect ratio of four to three approaches roughly sixty-four percent. For a screen aspect ratio of sixteen to nine, the gain approaches roughly eighty-three percent. (I say "approaches" because, as will be seen, a tiny amount of energy is still lost to masking at the extreme right and left ends of the frame.)

Also preferably the displacing means and beam-expansion means cooperate to substantially eliminate initial nonuniformity of brightness in the beam. The beam-expansion means may take the form of, for example, entrance optics ahead of the displacing means; these optics advantageously expand the initial laser beam to an optimum specialized shape for displacement by the displacing means.

Furthermore I prefer that the laser apparatus include optical means for shaping the picture beam to a shallow cross-section; and that the displacing means also shift the picture beam on the projection medium, during projection. The optical means preferably take the form of plural lenses in series for adjusting the beam dimension in two substantially perpendicular directions, or a curved mirror that forms part of the displacing means.

Where a curved mirror is used, it advantageously shapes the picture beam to a shallow cross-section. Preferably it is mounted in a galvanometer movement, or mounted to a motor (or otherwise equivalently mounted and driven in controlled oscillation), to scan the shaped beam over the modulation stage.

Now turning to a third major independent aspect or facet of my invention, preferred embodiments provide a laser projector that includes laser apparatus for projecting a picture beam which in turn includes exclusively laser light. The projector also incorporates a liquid-crystal light valve having a beam-modulation stage for impressing an image onto the exclusively laser-light beam, and having a control stage, distinct from the beam-modulation stage, to control the "impressing" function.

In addition the projector includes some means for writing an image incrementally onto successive generally slot-shaped portions of the control stage—as before, called the "writing means" or "incremental writing means". The projector also has some means for directing the exclusively laser-light beam onto successive selected generally slot-shaped portions of the modulation stage, and for generally synchronizing the exclusively laser-light beam with the image-writing means—i.e., "directing and synchronizing means".

(An AOM-based system cannot answer to the above description, since the control and beam-modulation stages in an AOM are in essence one and the same. Furthermore the writing means in an AOM take the form of an acoustic driver which neither writes nor reads successive portions but rather writes to and reads from the entire modulator for each raster line.)

The foregoing may represent a description of definition of the third aspect or facet of my invention in its broadest or most general form. Even as couched in these broad terms, however, it can be seen that this facet of the invention importantly advances the art.

In particular, this aspect of my invention for the first time obtains the optical-energy-saving and contrast-enhancing benefits of synchronized write/read beams in conjunction with laser light sources. These benefits have been proposed previously—particularly in the previously discussed Henderson, Schmidt and Gold patents—in connection with broadband optical sources such as arc lamps, but as noted earlier it appears that those schemes were not successful. It has never been suggested heretofore that write/read synchronization might be useful with lasers and light valves.

More specifically, the assumption (telecentricity) that is the basis of the two later patents to Schmidt and Gold is inapplicable as to lasers. If it had been obvious to solve the problems inherent in the Henderson proposal merely by substituting a laser for Henderson's arc lamp, then of course Schmidt or Gold—or both—would have suggested doing so.

In the projector of this third major independent aspect of my invention, preferably the laser apparatus initially projects the exclusively laser-light picture beam having substantially all rays substantially parallel to a common optical axis, with substantially no ray crossing the optical axis or otherwise passing through the center of any aperture stop. My preferred apparatus therefore has no telecentric zone. The exclusively laser-light picture beam is not focused at or near the directing means or the modulation stage, or elsewhere within the laser projector.

Preferably the liquid-crystal light valve includes a substantially distinct spatial portion for modulation of each distinct spatial portion of the exclusively laser-light beam, respectively—a condition that cannot be achieved with any of the Henderson, Schmidt or Gold arc-lamp-based inventions. Also preferably the projected beam has a cross-section that is substantially uniform in intensity, rather than having a Gaussian intensity distribution (as Gold states is present for at least the vertical dimension of the slot). I say "substantially" for reasons that will later become clear in conjunction with discussion of FIGS. 25a and 29.

In practice of the third facet of my invention, I prefer that substantially the entire cross-section of the exclusively laser-light beam, with only negligible masking (preferably at two very extreme edges only), be directed onto the successive selected portions of the modulation stage. Other preferences are that substantially each control-stage portion have a substantially corresponding modulation-stage portion; and in this case that the directing-and-synchronizing means generally synchronize selection of modulation-stage portions with writing at corresponding successive control-stage portions, subject to a delay generally equal to rise time in the modulation stage.

It is also preferable that the directing means comprise an optical deflecting element mounted for rotation. In this regard I most prefer to use a mirror mounted on a galvanometer, or motor; however, in alternative preferred embodiments the deflecting element comprises a mirror mounted on a rotating disc, or multiple mirrors mounted about a rotating disc.

More generally it is preferred that the directing means include a mechanically rotated reflective or refractive element; and that all dimensions of the exclusively laser-light beam at the light valve be substantially unaffected by dispersion in the directing means, regardless of whether the element is reflective or refractive—not possible with light from a halide lamp, filament lamp, arc lamp or other fundamentally incandescent source. In one preferable embodiment, the control stage is a photosensitive stage that receives an incrementally written optical image.

In connection with this third aspect of my invention I have certain preferences related to efficient and convenient mechanical layout of the system. These preferences are particularly beneficial if the projector includes some means for reflecting the beam from the directing means into the beam-modulation stage and for transmitting the beam, after return from the beam-modulation stage, to form a picture on a projection medium. In this case it is preferred that the laser apparatus be generally disposed on a first level—while the light valve, writing means, and reflecting-and-transmitting means are generally disposed on a second level above or below the first level. For optimum efficiency and convenience in this form of my invention, it is especially preferable that the directing means also transfer the beam from the first level to the second level.

This preference is advantageous in that the directing means do double duty as means for effecting the needed transfer. More specifically, in this arrangement preferably the directing means turn the beam from a path generally associated with the first level to propagate in a direction generally perpendicular to that path, toward the second level.

Still more specifically I prefer that the beam follow a first, generally rectilinear path from a laser source to the directing means; and then follow a second, generally rectilinear path from the directing means toward the beam-modulation stage. It is further preferable that the directing means also turn the beam from the first path into the second path, thus achieving greatly improved simplicity in layout, a minimum number of lossy optical elements, and efficiency of use of the several components. Preferably the first and second paths are generally mutually perpendicular.

Now in preferred embodiments of its fourth major independent facet or aspect, my invention is a laser projector that includes laser apparatus for forming a picture beam that includes laser light. The laser apparatus produces an initially substantially circular laser-light beam subject to nonuniform illumination.

The projector also includes some means for transmitting a beam out of the projector for viewing by an audience as images on a substantially rectangular viewing screen. These means may be called, for reasons as above, the "transmitting means".

Also included are some means for forming an illuminated image on the substantially rectangular viewing screen. These "image-forming means" operate by using the circular laser-light beam without masking off significant fractions of the laser-light beam. The image-forming means include:

means for reshaping the initially circular laser-light beam to a shallow, wide laser-light beam, and means for scanning the shallow, wide laser-light beam over the screen.

The foregoing may represent a description of definition of the fourth aspect or facet of my invention in its broadest or most general form. Even as couched in these broad terms, however, it can be seen that this facet of the invention importantly advances the art.

In particular, this aspect of my invention substantially eliminates masking losses, by fitting essentially all the energy from the entire circular laser beam to a rectangular image format. This is accomplished by forming the reshaped beam that generally matches the width of the rectangular image—and then sweeping this reshaped beam through successive overlapping positions along the height of the image, so that the aggregate of the continuum of overlapping shallow beams matches the overall height.

Although the fourth major aspect of my invention thus significantly advances the art, nevertheless to optimize enjoyment of its benefits I prefer to practice my invention with certain additional features or characteristics. In particular, I prefer that the projector further include some means for minimizing the influence of nonuniformity of illumination in the initially substantially circular laser-light beam.

Preferably these minimizing means include the reshaping and scanning means, which operate in such a way as to tend to cause the nonuniformity to average out. More specifically, the reshaping means typically introduce additional illumination nonuniformity along the width of the shallow, wide laser-light beam; and I prefer that the image-forming means further comprise means for compensating for the additional illumination nonuniformity.

In preferred embodiments of its fifth major independent facet or aspect, my invention is a laser projection system for forming an image on an irregular projection medium having portions at distinctly differing distances from the projector. The system includes laser apparatus for projecting a picture beam that includes laser light.

It also includes a liquid-crystal light valve for impressing an image onto the beam; and some means for projecting the beam from the light valve, with the impressed image, onto the irregular projection medium. The latter means I shall call the "projecting means".

The foregoing may represent a description of definition of the fifth aspect or facet of my invention in its broadest or most general form. Even as couched in these broad terms, however, it can be seen that this facet of the invention importantly advances the art.

In particular, this aspect of my invention is the first system of any raster type that forms a sharp image on a projection medium of the kind described. Indeed, heretofore the only disclosed laser projector using a liquid-crystal light valve is the previously discussed Minich U.S. Pat. No. 5,517,263and that patent teaches nothing of imaging on such a projection medium.

That omission should be of little surprise, in view of the previously mentioned belief among at least some experts in liquid-crystal light valve theory. As noted earlier, that belief is to the effect that such a light valve is incapable of the needed "infinite sharpness" characteristic that would enable projection on irregular projection media as defined in the above description of the fifth facet of my invention.

Although the fifth major aspect of my invention thus significantly advances the art, nevertheless to optimize enjoyment of its benefits I prefer to practice my invention with additional features or characteristics. In particular, I prefer that the irregular projection medium be one of these:

- an interior of a dome, or other building having internal surfaces that are not generally normal to a projection direction,
- an exterior of a dome, sculpture, monument, or other structure having external surfaces that are not generally normal to a projection direction,
- a waterfall,
- a water fountain,
- fog or a cloud,
- ice,
- a scrim in front of a curtain or screen,
- a plurality of scrims in optical series,
- one or more trees,
- grass, vines or other foliage,
- a hillside or other landscape, or other receding surface, or
- an array of people or other animals or other discrete objects, or combinations thereof, at diverse distances from the projecting means.

The fifth aspect of my invention as very broadly conceived, and as set forth above, is for use with an irregular projection medium of the character described. That is to say, the irregular projection medium is simply a part of the context or environment of the invention.

My invention as defined by certain of the appended claims, however, also incorporates the irregular projection medium as an element of my invention. This preferred form of the invention, in which the projection medium is not merely contextual but actually a part of the invention itself, is a particularly powerful and unique system.

That system is in effect a combination of the laser projector of the fifth aspect of the invention with the structures of the variegated types discussed. As a conjunction of my infinite-sharpness projector with specially selected or assembled irregular projection media, this particular preferred form of my invention enables presentations of an extra-ordinary and outstanding character.

For example, this form of my invention can be used to create outdoor public spectaculars in which literally many hundreds of thousands of people view giant images projected with sharp clarity upon massive surfaces. The surfaces may be selected large buildings—whether skyscrapers, huge domes, statues or monuments—or a natural canyon such as for instance the walls of Yosemite Valley or even the Grand Canyon.

My invention is capable of throws on the order of kilometers, still maintaining infinite sharpness, and (with very large powerful lasers or ganged multiple lasers) image dimensions the size of a football field. The images are not limited to vector graphics as in primitive laser shows, but can be raster images including scenery, natural faces, action scenes and anything else that can be made into a bitmap sequence or otherwise displayable image.

Alternatively this form of the invention can create, for extremely large audiences, special shows on the interiors of large domes or other large irregular spaces such as the various inside walls of a very large train station, opera house, or stadium (including parts of the audience in the stadium).

Another fertile application is the presentation of outdoor dioramas in which different portions of a show—again potentially including faces, pictures of animals etc.—are projected on waterfalls, groups of people, trees or any other symbolically or practically useful reflective medium, either unitary or composite.

In implementing the fifth form of my invention characteristically the liquid-crystal light valve operates by partial disruption of laser-light coherence in the beam; and I prefer, notwithstanding the partial disruption of coherence, that the image appear sharp on the projection-medium portions of differing distances. I also prefer that the image appear substantially evenly illuminated, except possibly where light is distributed over a receding surface.

In preferred embodiments of its sixth major independent facet or aspect, my invention is a laser projector that includes a light source for forming a picture beam—and a modulator for impressing a latent image onto the picture beam. It also includes a polarization analyzing cube for receiving light from the modulator and developing the image.

This facet of the invention also includes some means for projecting the beam, with the developed image, for viewing by an audience. As before I shall refer to these means as the "projecting means".

The foregoing may represent a description of definition of the sixth aspect or facet of my invention in its broadest or most general form. Even as couched in these broad terms, however, it can be seen that this facet of the invention importantly advances the art.

In particular, the use of an analyzing cube rather than a polarizing-sheet-material analyzer or a dichroic analyzer is advantageous because the polarization selectivity of a cube analyzer is much sharper than that of the other types. Accordingly with this sixth facet of my invention the resultant image contrast and resolution are superior to those available heretofore.

Although the sixth major aspect of my invention thus significantly advances the art, nevertheless to optimize enjoyment of its benefits I prefer to practice my invention with additional features or characteristics. In particular, I prefer that the cube also supply the picture beam to the modulator. Also preferably the light source comprises a laser, which—among the many benefits discussed earlier—enhances the sharpness of polarization sensitivity, since the cube can be one particularly designed for operation in a very narrow spectral band about the laser lines.

I further prefer that antireflective coatings be formed on three cube faces through which the beam passes to and from the modulator. Advantageously the cube has six faces, including three through which the beam passes to and from the modulator and three others; and light absorbers are at one or more of the other faces.

All of the foregoing operational principles and advantages of the present invention will be more fully appreciated upon consideration of the following detailed description, with reference to the appended drawings, of which:

BRIEF DESCRIPTION OF THE DRAWINGS

FIG. 4a is a face-on elevation of a liquid-crystal light valve as used in the embodiment of FIGS. 1 through 4;

FIG. 15 is a conceptual system diagram showing the CRT-driven FIG. 1 embodiment in block-diagrammatic form;

FIG. 16 is a like view of a related embodiment operating from input-image information applied directly by sweeping amplitude-modulated laser-diode illumination two-dimensionally across the control stage of a liquid-crystal light valve, rather than through CRT means;

FIG. 25 is a diagram showing some representative distributions of illumination across a laser beam cross-section, for comparison with an idealized distribution also shown;

FIG. 25a is a like diagram showing very schematically or conceptually another representative laser-beam intensity distribution, which I prefer to use with preferred embodiments of my invention;

FIG. 26 is a diagram showing needed masking for a prior-art system using a circular light beam and a square projection screen;

FIG. 27 is a like diagram for a screen with 4:3 aspect ratio;

FIG. 28 is a like diagram for a screen with 16:9 aspect ratio;

FIG. 29 is a group of coordinated diagrams, the first showing in elevation an intensity distribution related to that of FIG. 25a, still very conceptually, and also conceptually showing conspicuous irregular intensity nonuniformities such as are typically found in a laser beam if used in a polarization-driven light valve; and the remaining diagrams showing the shape relationship between an original circular laser light beam and a very shallow reshaped beam for scanning over a projection screen, in the efficiency- and uniformity-increasing system of the present invention; and also showing the illumination distribution in the reshaped beam, and showing residual correction factors that can be required or desirable (or superfluous) in both cases;

FIG. 30 is a group of very simplified coordinated diagrams (a side elevation at top right, plan at bottom right, and viewer's perspective at left) showing in a somewhat fanciful way the imaging capabilities of a system according to the invention as used with an irregular projection medium comprising the exteriors of various buildings or other structures including a dome, in accordance with the invention, and particularly relative to disrupted coherence;

FIG. 31 is a like set of diagrams (side elevation at top, plan at bottom) for another type of irregular projection medium that comprises the interior of a dome;

FIG. 32 is a thumbnail sketch that is a like view but even more fanciful and with another type of irregular projection medium that includes a waterfall or fountain, or both;

FIG. 33 is a like view with another type of irregular projection medium including plural scrims behind a theater proscenium;

FIG. 34 is a like view with yet another type of irregular projection medium comprising foliage; and FIG. 35 is a like view with still another type of irregular projection medium comprising arbitrary assemblages of discrete articles, including creatures.

Figure 1:
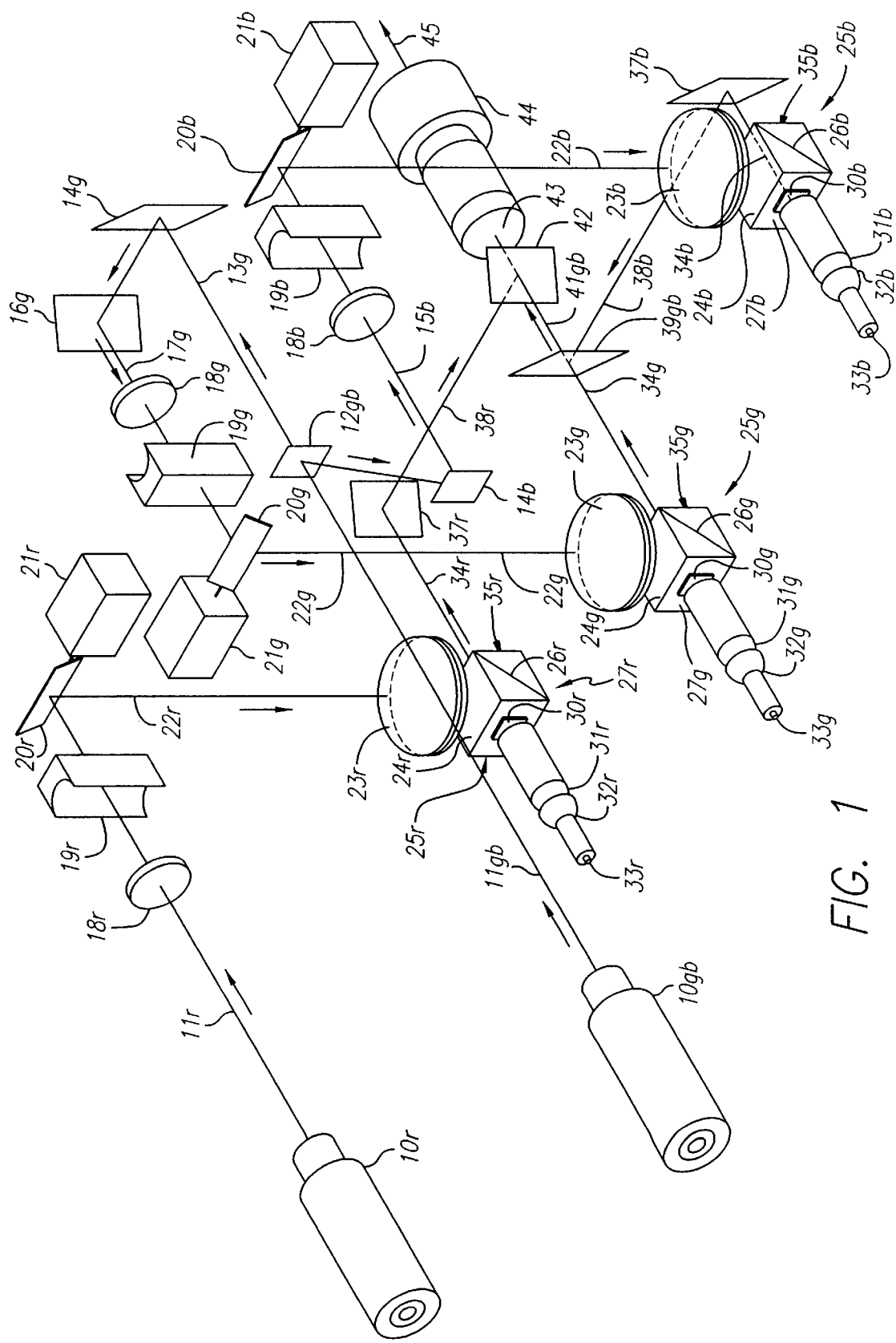
FIG. 1 is an isometric drawing—rather schematic and not to scale—of a laser-projector optical system according to a preferred embodiment of the present invention, using gas lasers or alternatively solid-state lasers, or both.
Figure 2:
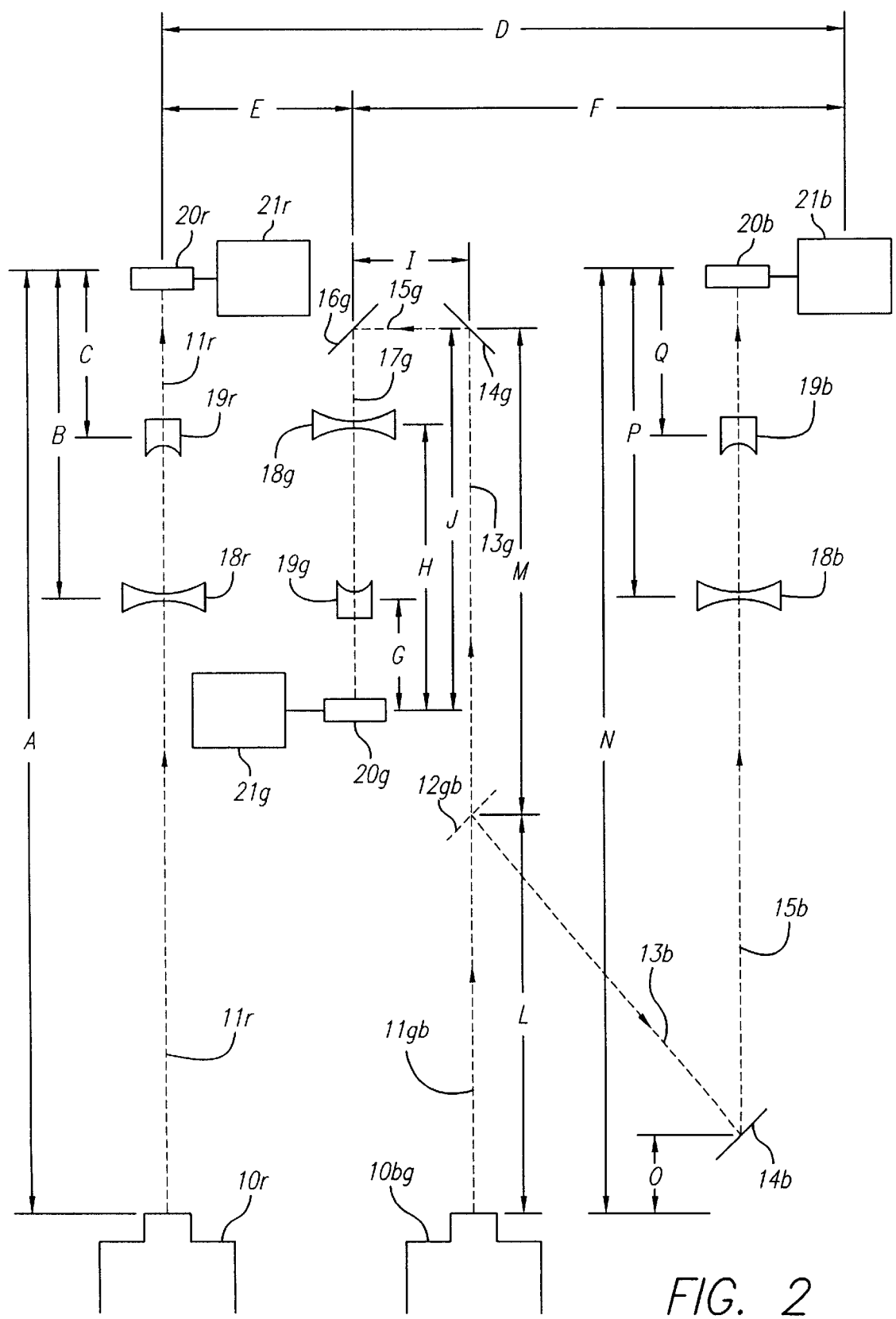
FIG. 2 is a plan view of the upper level of the FIG. 1 embodiment, still not to scale but somewhat more realistic than FIG. 1 as to proportions.
Figure 3:
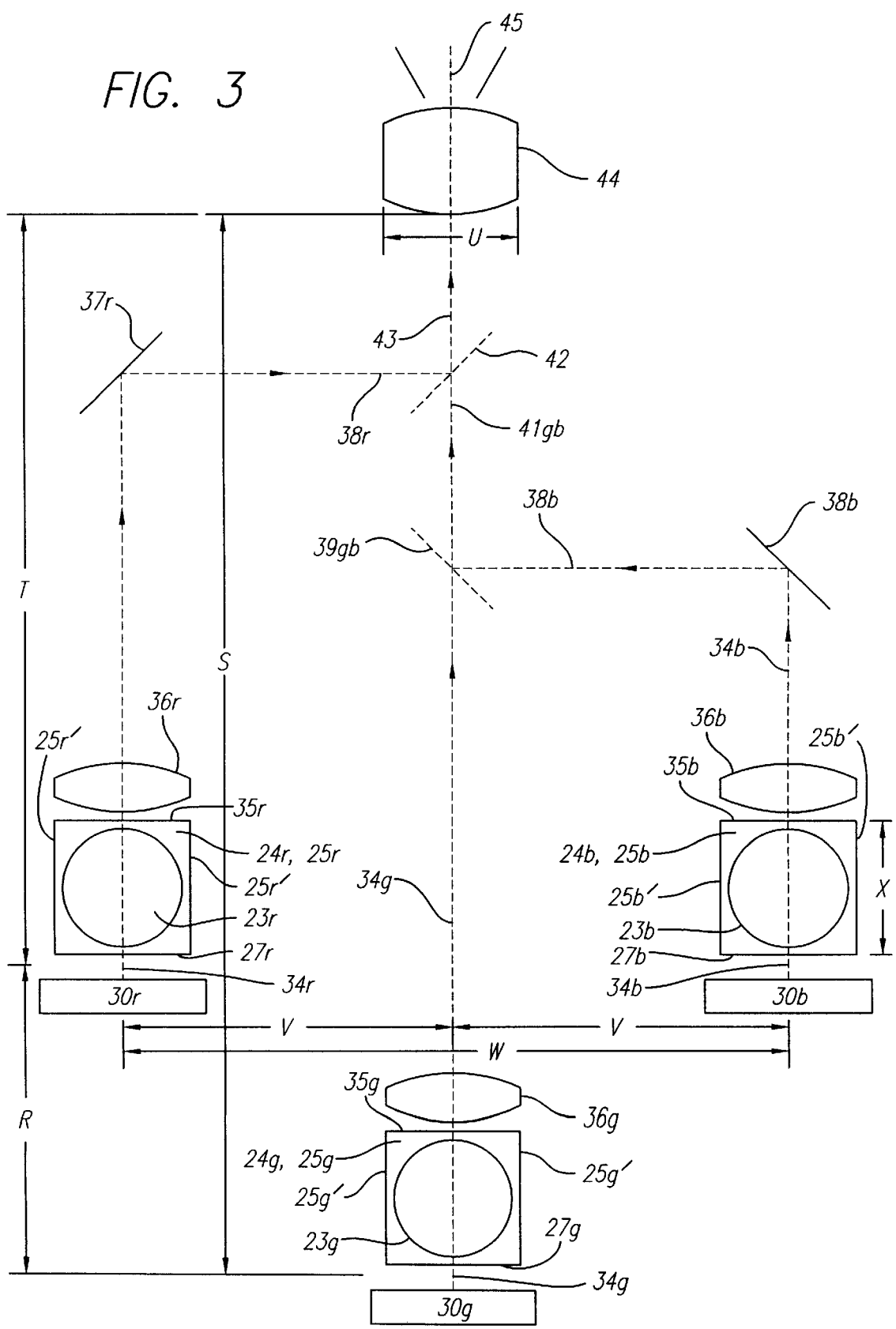
FIG. 3 is a like view of the lower level of the same embodiment, but showing a variant optical train.
Figure 4:
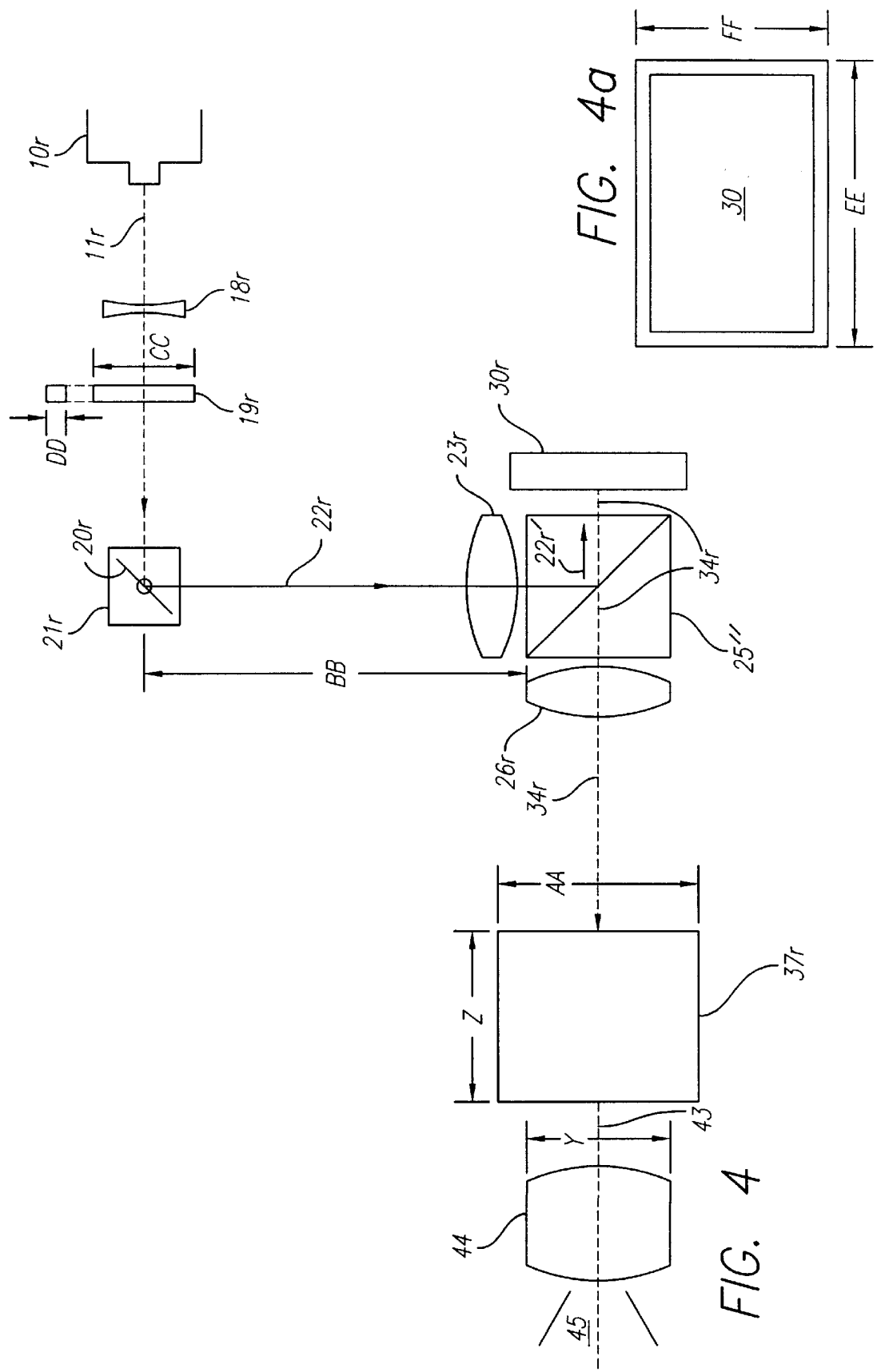
FIG. 4 is a left-side elevation, like FIG. 2 as to accuracy of relative dimensions, of the same embodiment.

DETAILED DESCRIPTION OF THE PREFERRED EMBODIMENTS a) Overall configuration—Preferred embodiments of my invention, by assigning multiple tasks to certain key elements, achieve the remarkable imaging and energy-usage characteristics described above. They also achieve a degree of simplification and a minimal number of optical surfaces not previously attainable.

Laser-projector apparatus is advantageously laid out in two levels or tiers, one above the other. Either level can be used for the sources 10 (FIGS. 1–4), and the other for the modulation and projection subsystems 23–44, but I prefer to put the sources on top. This configuration is particularly beneficial in allowing very easy exchange of the lasers, for use in image shows calling for higher- or lower-power beams.

Such interchange often demands a change of projection lens 44, too. The lens, however, is generally well forward of the lasers and therefore accessible regardless of the level on which it is mounted.

The suffixes "r", "g" and "b" on the numbered elements in the drawings represent corresponding components in the red, green and blue channels respectively. Those who are familiar with the art will best understand the layout and operation of my invention from the fact that I constructed the illustrated prototype from a conventional arc-powered Hughes projector—but with the usual source system, dichroic spectral splitters, stationary steering mirrors, and polarizer-analyzer elements removed, and most projection optics replaced.

The blue and green beam 11gb is split at a dichroic separator 12gb to form respective beams of green 13g and blue 13b, which traverse plane mirrors 14, 16 to reach their negative lenses 18g, 18b. The two-mirror dogleg path 13g–15g–17g is not strictly necessary but only included for convenience and to facilitate placement of the lasers more compactly forward above the modulation stages.

Transfer of the laser beams from the upper level to the lower—together with a change of direction that is needed for entry of the laser beams into the modulation subsystem at right angles to the final projection path—is accomplished by small folding mirrors 20 that also serve in speckle suppression, circular-to-rectangular beam shaping, and brightness and contrast enhancement. For these latter purposes the planar mirrors 20 are preceded by respective negative lenses 18 and cylindrical lenses 19, and are mounted to drivers 21 for a small angular oscillatory rotation.

Each driver is preferably a galvanometer movement but may instead be a motor, stepping motor, solenoid driver, piezoelement, pneumatically driven reed, or other suitable equivalent. As noted earlier, beam deflection alternatively may be accomplished with spinning polygon mirrors or other known devices.

(If preferred to eliminate the two dogleg bounces 14g, 16g, the argon laser 10gb can instead be shifted to a position in line with the multipurpose planar folding mirror 20g in the green channel. That mirror with its entrance optics 18g, 19g is then reversed in orientation, and the angles of the separator 12gb and deflector 14b adjusted to compensate.)

The beams from the mirrors proceed through lenses 23 into the entry faces 24 of polarizer-analyzer cubes 25. Each cube is made of two forty-five-degree right prisms, one of which has a polarizing dichroic layer 26 coated on its hypotenuse—i.e., at the interface of the two prisms.

As mentioned earlier, such a cube provides relatively very sharp polarization discrimination, and thereby improved image contrast and sharpness relative to Polaroids material or stand-alone dichroic polarizers. In my invention, however, this function is not operative with regard to the beam entering downward through a top entry face 24. Because the polarization of our laser beams is typically even sharper than the discrimination capability of the cube, ordinarily the central polarizing layer 26 instead has substantially no effect on the polarization state at this point.

The polarizing layer therefore simply deflects the downward-incoming beam at ninety degrees and out through the rear face 27 into the front or reading stage of the liquid-crystal light valve modulator 30. In my prototype the rear stage of each modulator 30 is written by an input image that is coupled through a fiber-optic or preferably lens-system matcher 31 from a respective infrared cathode-ray tube 32. The image signal for the CRT 32 is provided through cables 33 from a conventional source—either computer video or conventional broadcast video, or virtually any other source if the system is suitably configured for the corresponding form of data.

The liquid-crystal light valve 30 may be substantially conventional, or of a type not yet known. As mentioned earlier, several variant kinds of these valves have been described and are available. Each valve has a rectangular image frame (FIG. 4a).

In general the function of the valve 30 includes receiving a consistently polarized picture beam or reading beam from the rear, output face 27 of its cube 25, and reflecting the beam at an internal mirror within the valve. (The previously mentioned Hughes patents describe in great detail the inner features and workings of several different valve types.) The valve thereby returns the reading beam forward into the face 27 from which it came. In the process, the valve introduces into the reading beam a variable delay—and therefore variable polarization state—which correspond at each point in the frame to writing-light intensity, modulation-voltage level, or other type of control stimulus in the control or writing stage of the valve 30.

The beam reentering the cube face 27 thus has read, or has had impressed upon it, a latent image expressed in polarization state. In at least some types of liquid-crystal light valve, the polarization state at each point in the image frame can be described as a rotation that is related to the intensity of the writing image (or control voltage etc.) at the corresponding point.

Upon reaching the analyzing layer 26 within the cube, the beam is in effect decoded: light polarized in the original polarization plane is deflected back up, generally toward the multipurpose mirror 20, and thus discarded—while any light polarized at ninety degrees to the original plane passes through the dichroic layer and out the forward face 35 of the cube and into the projection subsystem proper. The latent image 34 component of each primary color is thus developed and forwarded for projection.

The three primary image components 34r, 34g, 34b are next combined by a turning mirror 37r and dichroic filters 39gb, 41gb to form a unitary full-color image beam 43. A projection lens 44 controllably expands—but does not focus—this optical signal to provide an expanding beam 45 for propagation to a projection medium.

b) Color gamut and saturation—The lasers include a red source 10r in the form of a krypton-gas laser, most preferably emitting red light in the 647 nm region. While this is the ideal, I prefer to use laser spectral lines that are between 635 and 650 nm, or at least are above 635 nm; these are far superior to the 610 nm conventional preference, or the approximately 620 nm indicated in the Minich patent for use with liquid-crystal modulator types.

Wavelengths at 647 or at least above 635 nm are capable of forming rich colors on the projection medium, equal or favorably comparable with those of projected images from film—which as noted earlier is the appropriate standard of comparison for the image quality produced by my invention. Deep red roses, deep red football uniforms, deep red sunsets, and vivid purples as seen using my invention are actually deep red and purple, not merely the gaudy orange or red-orange seen with 610 nm systems.

Also included in my apparatus is a green and blue source 10gb. This is preferably implemented as an argon-gas laser emitting green and blue light in the regions below roughly 540 and 490 nm respectively.

Figure 14:
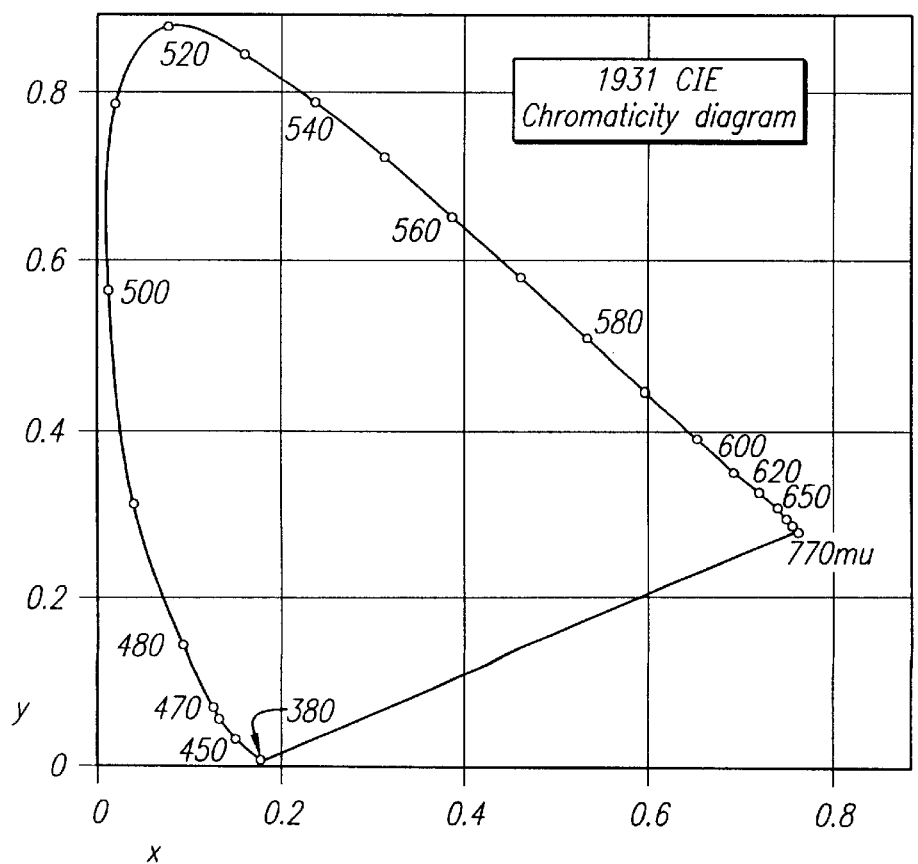
FIG. 14 is a chromaticity diagram (after Judd and Wyszecki, *Color in Business, Science and Industry*, Second Edition, Wiley 1952, 1963) showing the wavelengths and chromaticity positions of visible light wavelengths.

All three wavelength regions are in essence chosen for their capability to provide well-saturated colors not only when appearing in pure form but also when mixed; and the relative intensities mentioned earlier are preferred for the capability to mix to good neutral whites, grays and blacks when needed. The ability to yield good saturation relates to the positions of these particular wavelengths along edges and very near the corners of the familiar chromaticity diagram (FIG. 14).

Intermediate wavelengths representing cyan are preferably retained in the blue-green beam 11gb. Light in this range is somewhat divided at the dichroic separator 12gb between the two separated primary channels 13g, 13b.

These wavelengths seem to mix particularly effectively with reds in the range just above 635 nm, producing not only better neutral whites and grays but also enhanced flesh tones and earth colors. Furthermore as discussed earlier they help to suppress visible speckle, and they carry a large fraction of all the power in the original argon laser beam—which thus in my invention need not be discarded.

c) Beam-shaping and steering—Preferred forms of the invention provide one or more optical components that reform the round-cross-section laser beam into a wide, shallow slot-shaped beam (for several different beneficial uses, as described in subsection "e" below), and turn that beam from the source tier of the apparatus downward into the modulation subsystem. These shaping and steering functions may be accomplished with various sorts of devices:

(i) refractive/reflective—My present prototype employs a combination of optical elements. First the laser beam 11 enters a negative lens 18.

Figure 5:
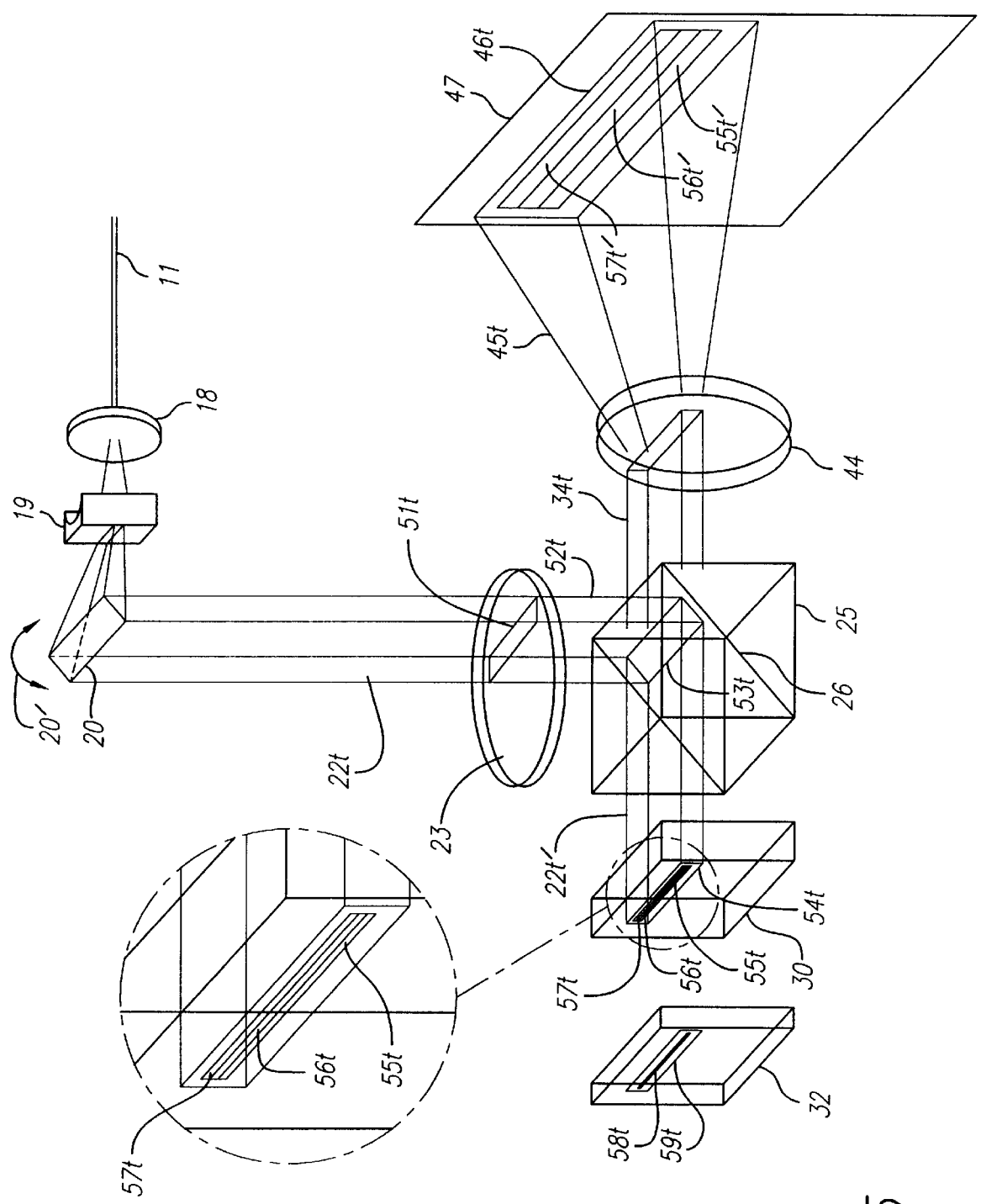
FIG. 5 is an isometric drawing, conceptual and not to scale, for a preferred embodiment of the invention related to FIG. 1 and enlarged to show only the beam-scanning portion for one color channel (e.g. red), using partly reflective and partly refractive beam shaping—and showing the scanning system at the top of its range.
Figure 6:
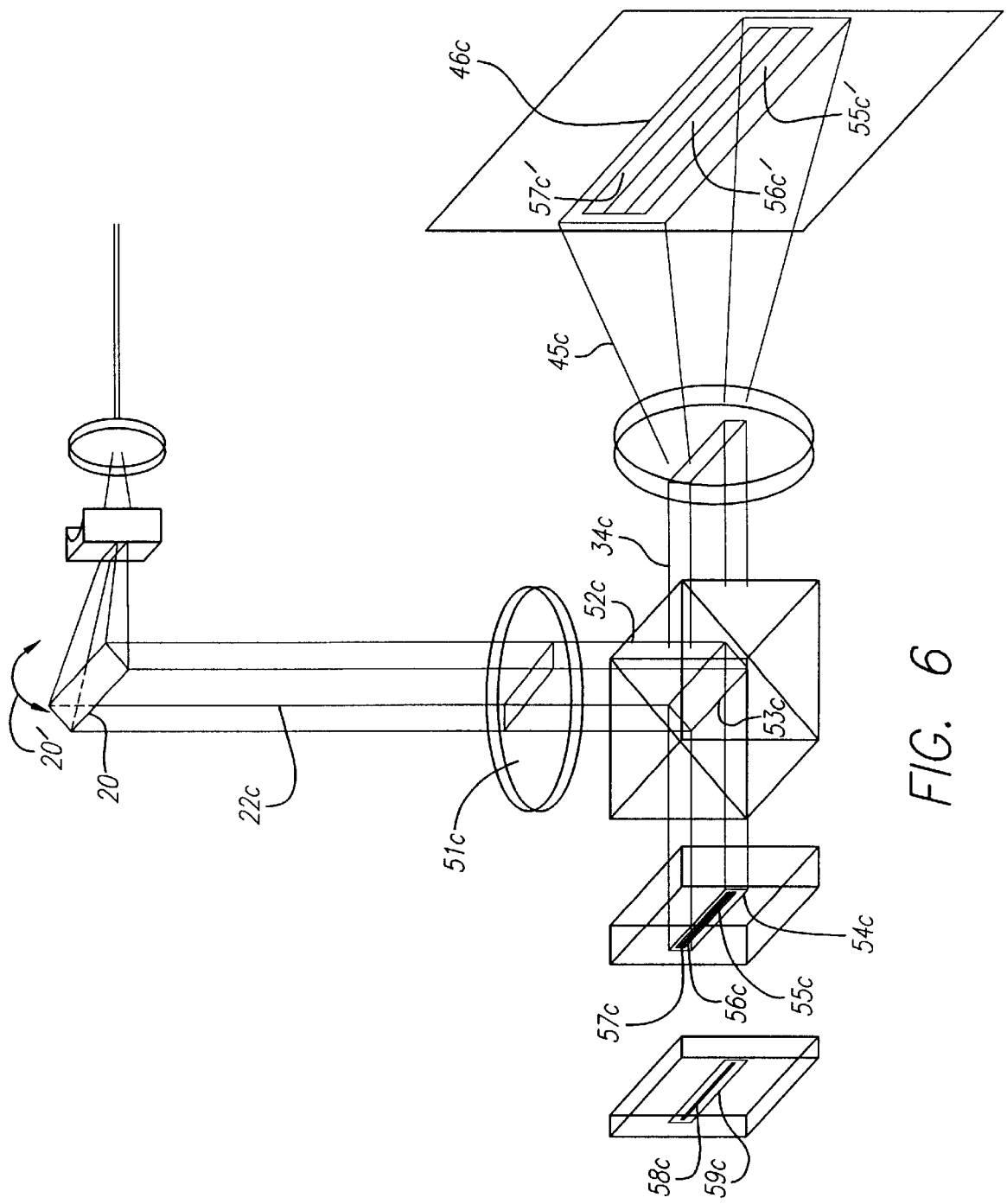
FIG. 6 is a like view but showing the scanning system at a different stage in the scanning operation, namely at the center.
Figure 7:
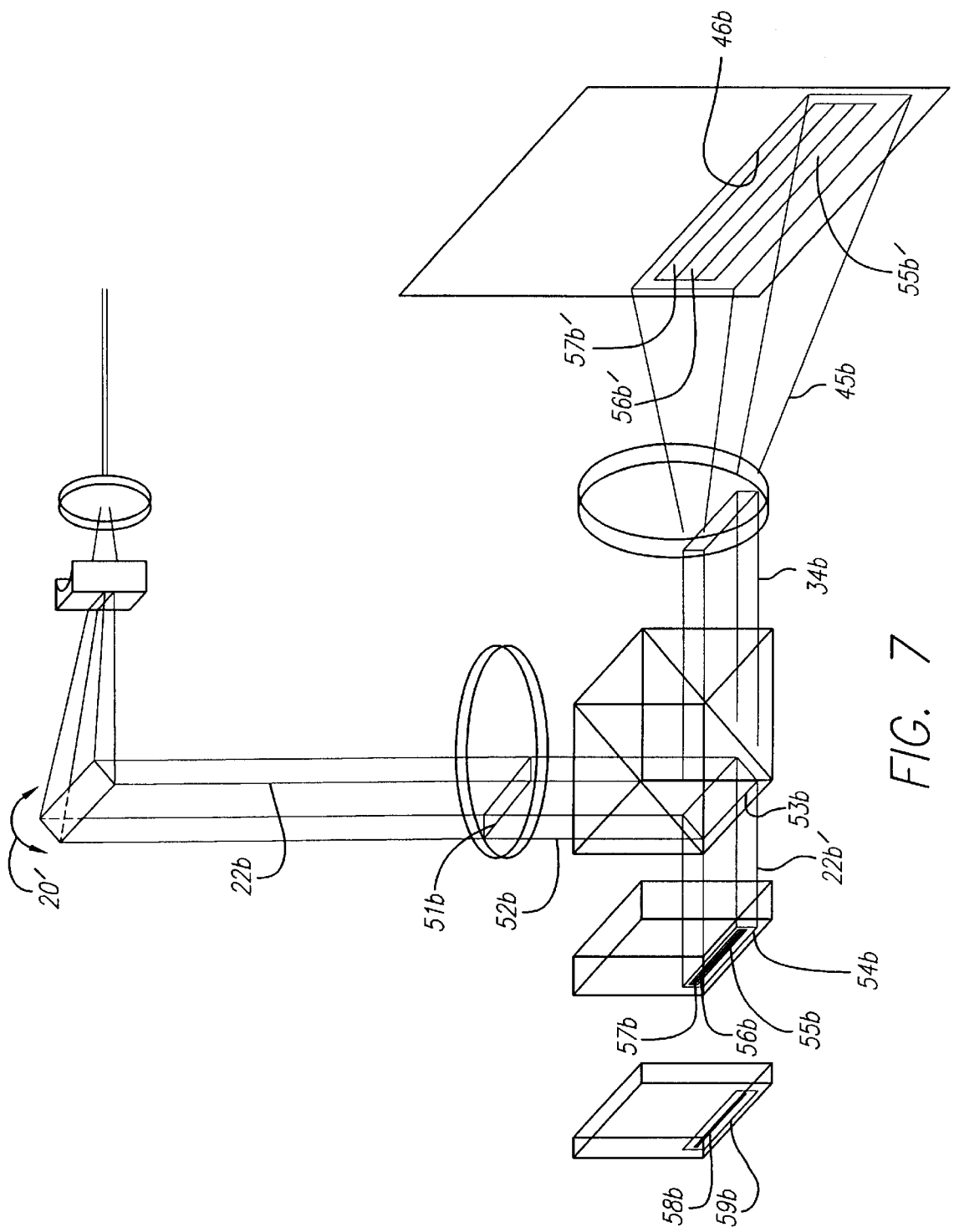
FIG. 7 is a like view with the scanning system at yet another stage, namely the bottom.
Figure 8:
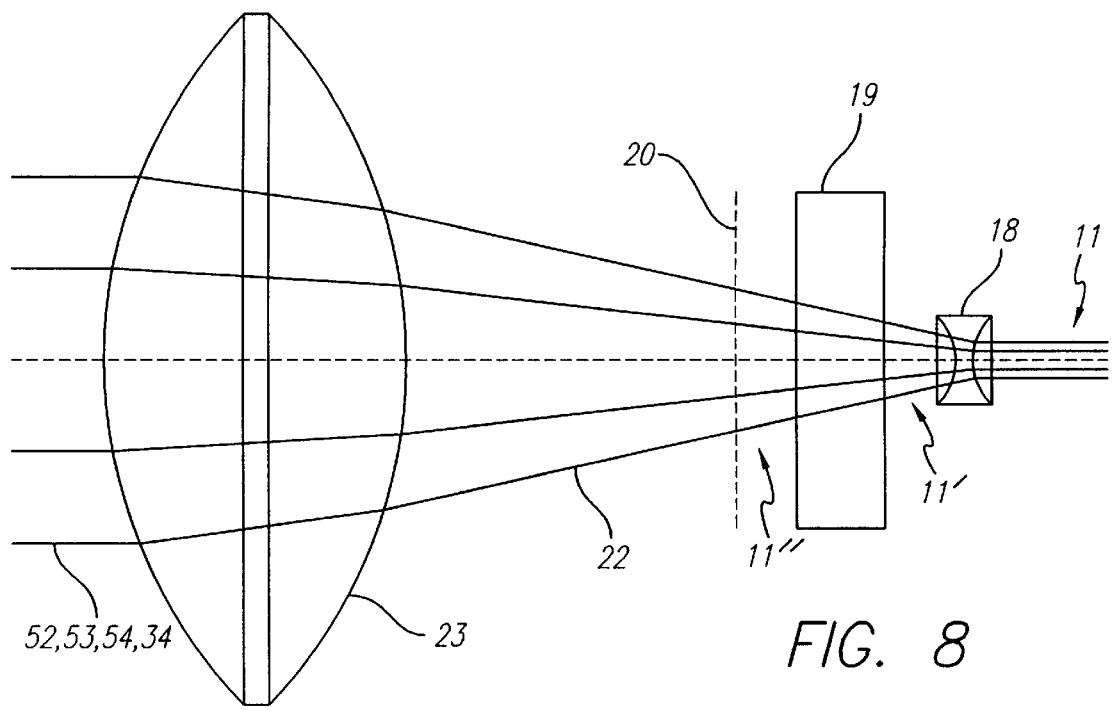
FIG. 8 is an elevational optic diagram, showing the optical path at the rotationally oscillating mirror of the FIG. 1 through 6 systems unfolded—i.e., representing the mirror only as a straight dashed line.

This first lens causes the exiting beam to slightly expand (FIGS. 5–7), in all transverse directions, while propagating. It is helpful to consider this process in only the vertical plane (FIG. 8, in which the dashed line 20 represents the planar folding mirror 20, and the optical path is shown unfolded). The vertical expansion is at such a rate that, upon reaching its cube 25 and modulator 30, the height of the beam 51, 53, 54 will correspond to several raster lines 55–57 of the input image—or in any event a region tall enough to encompass the height of the persistence zone 59 of the writing mechanism 58.

In other words the negative lens 18 causes the beam to follow an envelope that expands symmetrically (i.e., not anamorphically), so that all the previously collimated rays now progressively and slightly separate from one another. The speed of this expansion is determined so as to satisfy the stated height criterion at the modulator.

Figure 9:
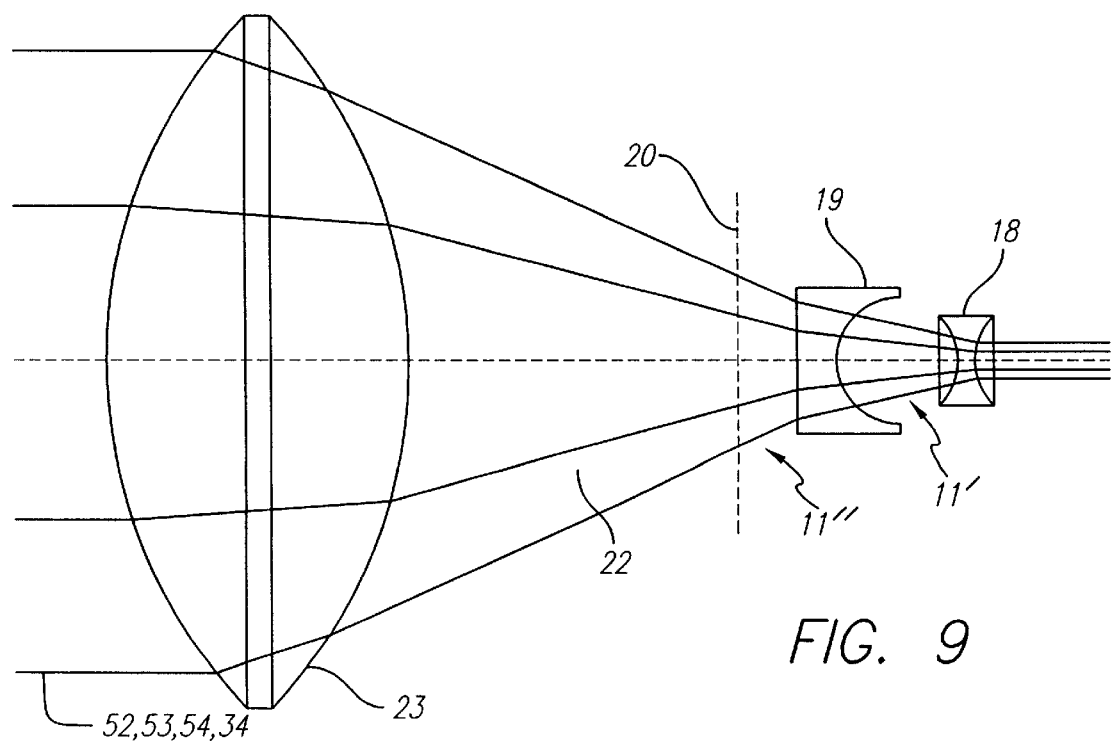
FIG. 9 is a plan view corresponding to FIG. 8.

Next a circularly cylindrical lens 19, while leaving the vertical expansion substantially undisturbed, superimposes an additional somewhat steeper horizontal expansion, best seen in the horizontal plane (FIG. 9). This expansion, as well as the resulting composite effect of the two lenses 18, 19, is of course distinctly anamorphic. The circular-cylindrical optic is selected to provide just enough horizontal expansion that—again upon reaching the cube and modulator—the width of the beam 51, 53, 54 will substantially just very slightly overfill the frame width EE (FIG. 4a) of the liquid-crystal valve.

These two elements 18, 19 thus complete the reformation of the beam into a wide and shallow shape that has been specifically optimized for the processes that follow. The small planar mirror 20 then turns the reformed beam (still expanding anamorphically as it proceeds) downward 22. In this form of the invention the two lenses 18, 19 constitute the previously mentioned beam-expanding means. As previously suggested, rays in the beam while separating from one another do not cross one another or become scrambled, and thus may be described as pseudocollimated.

This progressive separation continues until the beam reaches the recollimator 23, which halts the expansion in at least one direction—passing a substantially recollimated beam to the cube 25 and modulator 30. Ideally, taking into account the above-described character of the beam 22, this calls for an anamorph 23. Residual anamorphism and other imperfections in the beam, however, can be trimmed in a later lens 26, although I consider this stage somewhat optional.

From what has been said above, it will be apparent to those skilled in the optical arts that any effort to accomplish these same goals with light of broad spectral bands as proposed in the Henderson patent must face great obstacles. The overriding objectives are defeated if the overall beam cannot be restored to a semblance of collimation. Even the very sophisticated solutions of Schmidt and Gold evidently were not enough to overcome all the obstacles. With much more nearly monochromatic laser beams, the problems are tractable.

As mentioned earlier in this section, the mirror 20 not only turns the beam but also oscillates 20' rotationally about a horizontal axis, and so sweeps the beam 22 forward and back over the recollimator 23 and over the entry face of the cube 25. After reflection at the polarizer/analyzer layer 26, so that the beam is again propagating horizontally, this back-and-forth displacement of the beam path amounts to sweeping the beam up and down the image frame of the modulator 30.

That is, the beam is continuously shifted or successively stepped without overlap from positions 54t (FIG. 5) at top of the image frame, through positions 54c (FIG. 6) at center of the frame, to positions 54b (FIG. 7) at bottom. Correspondingly, after passage through the projection lens 44, the wide, shallow slot-shaped projection beam 45 sweeps from topmost through central to bottommost positions 46t, 46c, 46b on the projection medium 47.

Although for simplicity all this is illustrated with a flat screen 47 at right angles to the projection axis, it will be understood that the same operation holds true for irregular projection media. This point will be discussed further in later portions of this document dealing with such media.

The foregoing steering and shaping subsystem works well in my prototype, and is implemented using components that are simple, inexpensive and off-the-shelf. As will be discussed in a later subsection of this document, however, the slot-shaped beam that results does have significant nonuniformity of brightness along its length (i.e., from side to side along the horizontal extent of the beam).

Effective compensation of the nonuniformity is desirable and preferable for best image quality. This nonuniformity can be corrected by substituting a differently shaped optic—for instance perhaps an elliptically or hyperbolically cylindrical lens, or possibly an entirely custom-designed shape—in place of the circular cylinder 18.

(ii) all reflective—The system of FIGS. 5–12 does, however, require two refractive optical elements and a total of five optical surfaces with the attendant adjustment demands and energy losses. For high-volume manufacture of my invention it would be worthwhile to consider preparation of a single optic 120 (FIG. 10) that could accomplish the same purposes with just one surface, and that a low-loss reflective surface.

This optic is a curved astigmatic or anamorphic mirror having one relatively more weak or gradual curvature 120e about a generally horizontal axis, and another sharp curvature 120d about a generally vertical axis. This mirror might advantageously be cast, for example in epoxy, and then silvered.

Analogously to the refractive/reflective system, this mirror would spread the beam 122 gradually (FIG. 11) in the vertical plane and more steeply (FIG. 12) in the horizontal. The single mirror 120 would thereby yield an output beam 122 with a shallow elongated output cross-section 151—similar to the beam 22 in the prototype system.

For best results, however, the shape should not only spread the circular input beam 11 anamorphically as with the two lenses discussed above, but also should trim the distribution of the rays to at least approximately equalize intensity along the length of the shallow, elongated beam. Possibly such an optic may introduce aberrations of shape that require compensation in the recollimator 123.

The mirror 120' is to be mounted for oscillatory rotation 120', very generally as described above for its planar counterpart 20. With a curved mirror, care must be exercised in positioning the rotational axis relative to the mirror shape, to minimize undesired small effects on beam direction or movement at the modulator. Some small movements, as noted earlier, are beneficial.

Figure 10:
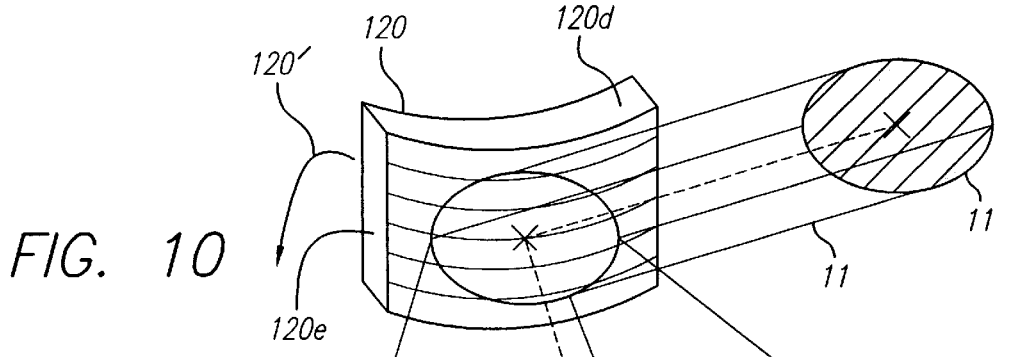
FIG. 10 is a variant mirror that is curved in two orthogonal directions, to replace the mirror and two lenses in FIGS. 1 through 9.
Figure 11:
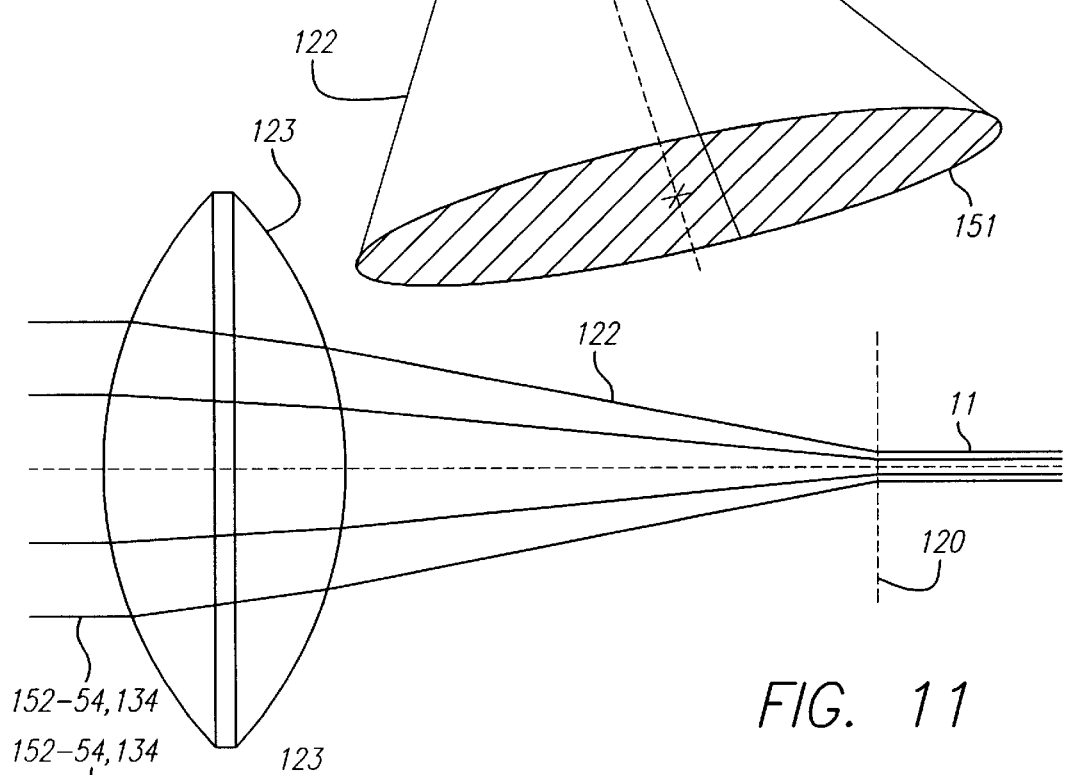
FIG. 11 is an elevational view like FIG. 8, but using the FIG. 10 rotating mirror in a variant primarily reflective beam shaper (but still with at least one recollimating lens at the modulator section of the system)
Figure 12:
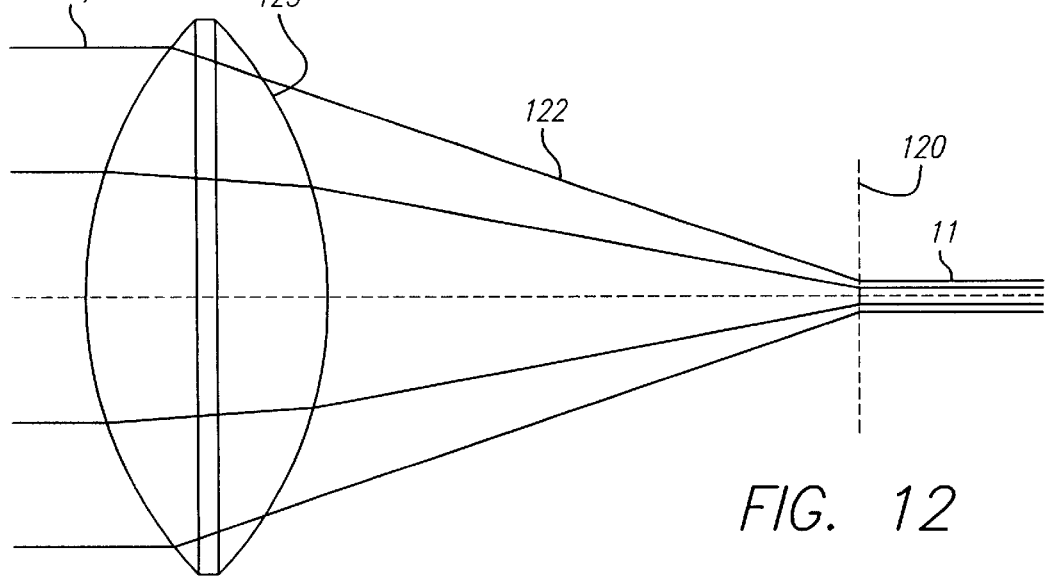
FIG. 12 is a plan view corresponding to FIG. 11.
Figure 13:
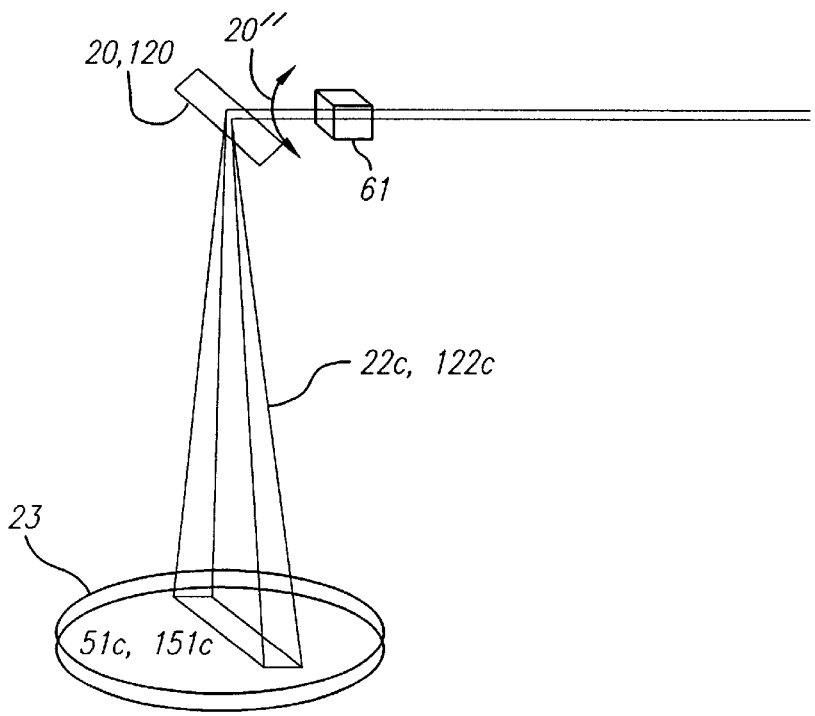
FIG. 13 is a view like the upper portions of FIGS. 5 through 7 but showing a stationary mirror and a nonmechanical beam deflector.

(iii) without moving parts—Still another solution to the shaping and steering functions is an electrically, magnetically or piezoelectrically controlled cell 61 (FIG. 13) in conjunction with a mirror 20, 120 that is fixed rather than oscillating. The mirror may be planar, necessitating additional optics similar to the previously discussed lenses 18, 19; or may be specially formed (FIGS. 10–12).

Various control devices such as Pockels or Kerr cells may be usable for such a system. Typically the performance of these devices is strongly wavelength dependent; however, this characteristic once again represents little or no obstacle since laser beams are more nearly monochromatic than arc lamps and like broadband spectral sources.

Although vibration and wear have not posed problems with my prototype, yet in principle over a period of time the oscillating mirrors 20 may give rise to significant maintenance demands. Nonmechanical sweep systems such as introduced here may therefore prove superior for at least some applications.

d) Image input—As mentioned earlier, my invention is amenable to a great many different ways of writing images to the liquid-crystal light valves. Certain of the appended claims encompass preferred forms of my invention that include some of these diverse writing modes, which are briefly discussed below.

(i) cathode-ray tubes—This approach most closely approximates the writing system of the Hughes projectors, using a small infrared CRT 32 in each color channel to write the image to the photosensitive rear stage of the light valve. In my prototype the light valve, coupler, CRT and input-signal cabling—as well as the bottom case—are all essentially standard components of a Hughes projector, for instance Model D-ILA.

There is, however, an important difference: I prefer to feed all input-image signals 60 (FIG. 15) to the CRTs 32 through an electronic apparatus known as a line doubler, particularly Model QD 7000, of the QD Technology company, Fremont California. The line doubler performs very useful functions, particularly important when using conventional broadcast video signals: (1) separating 62 the color channels to isolate the red, green and blue image components, and (2) interpolating additional raster lines between the lines of the original image data, and (3) providing a reformatted all-digital output 63 to each CRT. The device also provides a so-called "image-enhancement" function for any video feed.

Interpolation is important because many conventional signal formats provide a relatively coarse raster spacing that is conspicuous and distracting when greatly enlarged. In the context of my invention the original coarse raster would be particularly objectionable because it is more pronounced when formed by a sharp, high-contrast laser projector.

The line doubler can accept a variety of input-signal formats, including various conventional broadcast signals and computer-style video data. The doubler also incorporates convenient features such as facilitating audio management.

The doubler directs each reformatted image-data set 63 to the corresponding CRT 32 in the form of an amplitude-modulated data stream 33, synchronized with two-dimensional sweep signals 64 that control the vertical and horizontal position of the CRT electron beam. These sweep signals 64 (most particularly the vertical-advance signals) are also synchronized 65 with one-dimensional sweep of the high-power laser beam 11, 22 (FIG. 15) by the oscillating mirror 20.

Each CRT optical output (or output coupler) 31 writes the image to the corresponding modulator 30, which simultaneously receives the swept beam 22 and produces a high-power output beam 34 for combination and projection 44 as a unitary beam 45 to a projection medium 47.

If a fiber-optic light pipe is substituted for the lens system 31 used as a coupler, the light pipe must be made with extremely fine fibers for applications involving very large projection screens, to avoid image granularity (in effect a type of pixel structure) under the associated conditions of very high enlargement. If a conventional lens arrangement is used to relay the CRT image to the writing stage of the liquid-crystal light valve modulator—a subsystem very unlike the spatial laser-beam modulation in the reading stage—ordinarily there must indeed be focusing in the writing stage.

(ii) swept laser diodes—My invention does not require a CRT. An alternative system directs the amplitude-modulated image signals 233 (FIG. 16) in each channel to a respective laser diode 232. The diode responds by emitting a correspondingly amplitude-modulated laser-light beam.

This beam is processed in two-dimensional sweeping devices 264 (such as polygon mirrors, galvanometer mirrors etc.) to yield a two-dimensionally scanning laser-light beam 231. As before, the two-dimensional sweep 264 is synchronized 265 with the one-dimensional sweep 20 of the laser beam on the associated light valve.

This substitution of a laser-diode subsystem for a CRT may benefit from the superior sharpness or definition of a scanning laser spot. In any event my invention encompasses use of such a subsystem.

All three laser-diode beams can be of the same color, and this "color" if preferred can be infrared or ultraviolet rather than visible. It is not necessary that they match the projection-beam colors, since these writing beams are only in the optically isolated input stage of the light valve and therefore never seen by an audience. (The remainder of the optical system is essentially the same as in FIG. 16.)

(iii) transmissive LCD modulators—As mentioned earlier an LCD modulator (sometimes instead confusingly called a "transmissive liquid-crystal valve modulator") is unsuited for direct use in large-format projectors. This unsuitability is due to conspicuousness of the electrode pattern when used to form a greatly enlarged image; in addition, such a modulator would not appear to be capable of infinite sharpness.

When substituted for a CRT or swept-laser-diode system in the input writing stage of a liquid-crystal light valve, however, a transmissive LCD 332 (FIG. 17) should serve well. I believe that the image of the electrode pattern can be prevented from carrying through the liquid-crystal light valve to appear conspicuously in the projected output image—particularly with suitable choice of wavelength for excitation 366 of the LCDs 332, relative to the absorption spectrum and particularly refractive-index spectrum of the electrode material.

Light from these sources 366 (preferably but not necessarily laser diodes) passes through the LCDs, which meanwhile are written electronically by image data 363—with the horizontal retrace synched 365 to the laser-beam sweep. Each LCD output beam 331 proceeds into the writing stage of the corresponding light valve.

(iv) direct electronic writing—All the foregoing embodiments utilize optical writing to the liquid-crystal light valve modulators. My invention, however, does not depend upon optical writing.

Also within the scope of the invention and certain of the appended claims is a system of writing image information 463 (FIG. 18) as an electronic signal, directly to an electronic writing stage of a liquid-crystal light valve. It will be understood by those skilled in the art that the light valve now must be of a type which itself has an array of writing electrodes rather than a photosensitive writing surface.

Since the electrodes are on the writing side of the opaque dielectric mirror in the light valve, they cannot be seen on the high-power laser writing-beam side of the valve. As noted above, the two stages are optically isolated.

Figure 17:
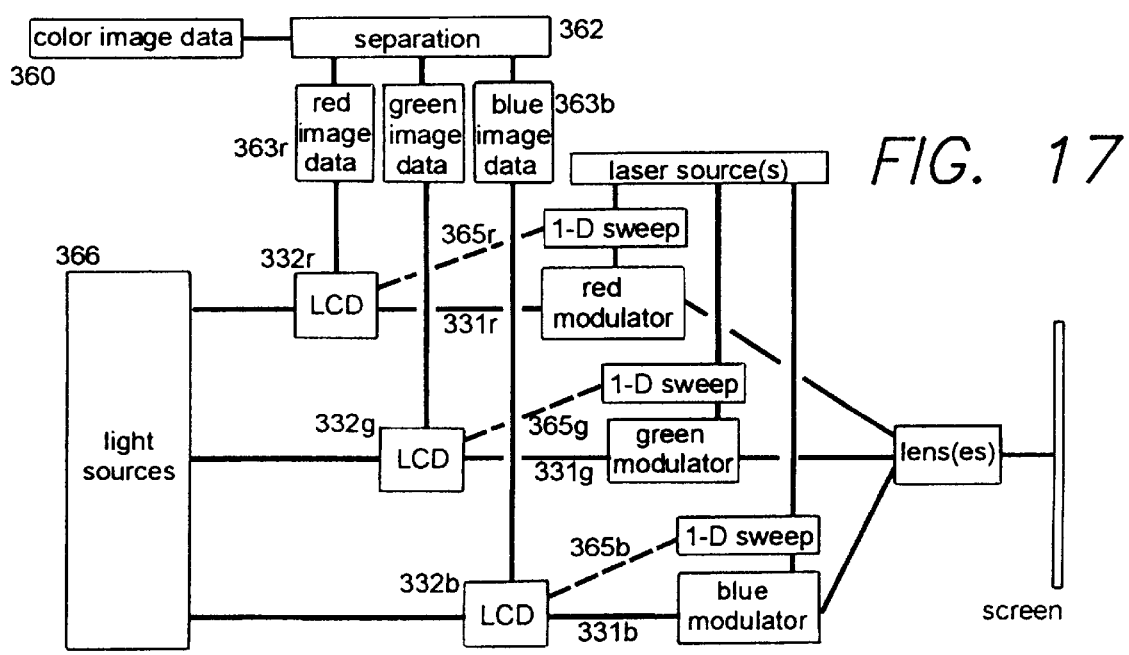
FIG. 17 is a like diagram showing a preferred embodiment operating from input-image information applied directly by illuminating the control stage of a liquid-crystal light valve with images from a small transmissive liquid-crystal display modulator.
Figure 18:
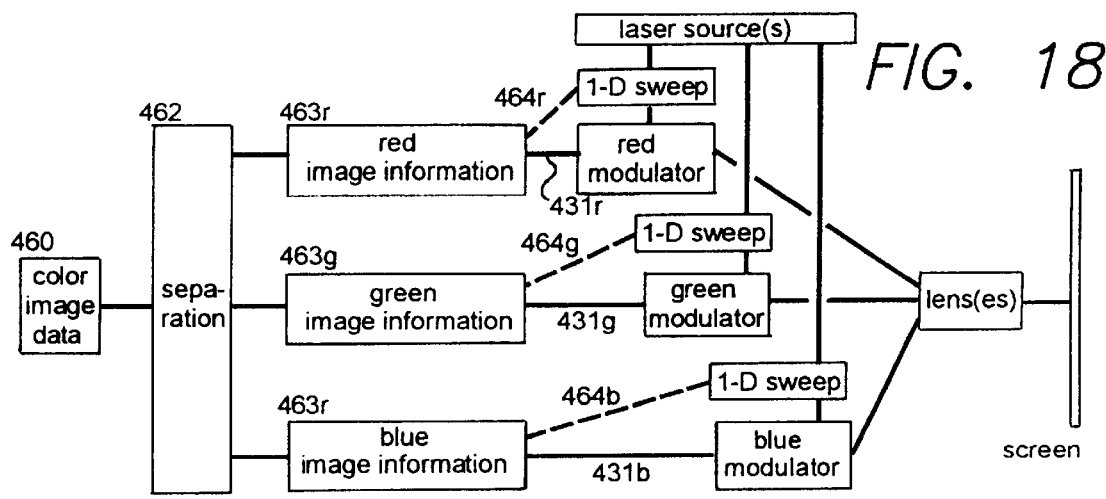
FIG. 18 is a diagram like FIG. 15 or 16 but showing a different preferred embodiment operating from noninterlaced input-image information such as a vector, bitmap or other computer file scanned from an image or generated in a computer, and written electronically to the control stage of a liquid-crystal light valve.

Those skilled in this field will recognize, by comparison of FIG. 18 with FIGS. 15 through 17, that this form of my invention eliminates a CRT 32 and optical coupler 31 (FIG. 1) from each color channel, without evident penalty. As in the other systems discussed, vertical progression of the image-data presentation 431 to the modulator is advantageously synchronized with the laser-beam sweep.

(v) still film—Whereas the optical intermediary stage (CRT and coupler) thus may be superfluous, on the other hand for certain applications the same may be true of electronic intermediaries. A color slide or transparency 560 (FIG. 19), color print, or other color image medium may be used as the color-image input—with no electronics whatsoever, upstream of the modulator writing stage.

Thus my invention may convert any very large outdoor area into a lecture hall or travelogue theater, for presentation of conventional slides or transparencies before a tremendous audience. A building, cliff or other reasonably vertical and uniformly colored surface may serve as projection medium.

For a transparency, suitable illumination 566 is desired, and a conventional optical train 562 for extracting primary-color images 563, 531. Preferably these are conventionally focused on photosensitive input stages of respective liquid-crystal valves.

To maintain some, though not all, of the benefits of my invention, one-dimensional sweep 520 should be provided. As the primary images 573, 531 are not written incrementally, however, this sweep need not be synchronized with anything.

(vi) motion-picture film—Essentially the same system (FIG. 19) may be used to project greatly enlarged and powerful laser-beam images from motion-picture film. The film can be stepped through the image plane 560 using a generally conventional film gate and sprocket system (not shown).

Although the modern trend is plainly toward digital recording, storage and playback—which is to say elimination of film as a medium for both new and legacy movies—yet there remain many thousands of fine motion pictures in film form. Projection from such originals directly, without introduction of any pixel or raster structure into the viewed image, may present a viewing experience having at least artistic or antiquarian value.

Such a system can be used at very low light levels in the writing stage, thus permitting excellent image quality in an extremely large theater or outdoor-amphitheater without over-heating the film. The system thereby avoids significant deterioration of—for example—a relatively old or otherwise fragile movie print. In this case the amount of make-ready for each motion picture is minimal in terms of both effort and cost: the film is simply run through the writing stage of the projector and viewed in brilliant, vivid color on the jumbo screen.

Alternatively if desired color separations 660 (FIG. 20), either positive or negative, can be made (or in some cases may be available) in strip form from a motion-picture film print or master. The construction and the conventional operating mode of a liquid-crystal light valve ordinarily call for a positive optical input image, but modification to operate from a negative image would appear feasible.

Figure 19:
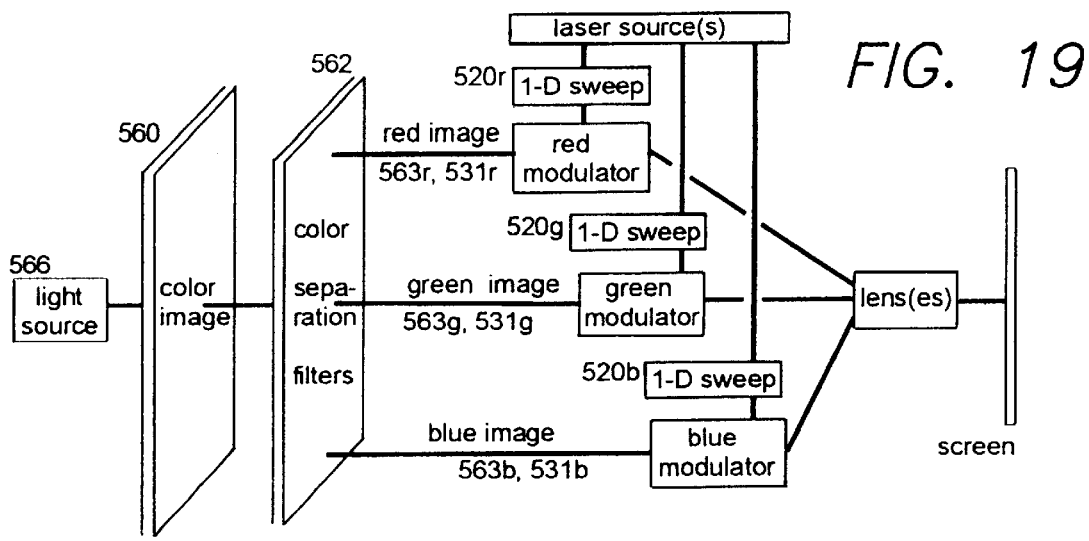
FIG. 19 is a like diagram showing still another preferred embodiment operating from input-image information in the form of a nonincrementally written still image.

Accordingly the three primary separations 660 may be stepped through coordinated sprocket-and-gate mechanisms to project independent image sequences 663, 631 onto the photosensitive writing stages of liquid-crystal light valves. The remainder of the projection system is as before. Due to the need for mechanical synchronization, color registration in this form of the invention may be more troublesome than that in the single-print form (FIG. 19).

(vii) direct live image—Still another function that need not necessarily be present in every embodiment of my invention is image storage. Modernly many public events such as large outdoor religious celebrations, political-convention speakers, certain kinds of concerts, and even certain relatively static sporting events (such as baseball games) are popularly accompanied by projection of huge video images of the celebrants, speakers, performers or players—in real time.

Often the projected images appear directly above and behind the people who are celebrating, performing etc. As is well known, due to use of conventional video imaging the pictures are typically of poor resolution, sharpness, contrast and even brightness.

My invention can be used to project an extraordinarily high-quality live image of such celebrants, speakers etc. 766 (FIG. 21) who are at a stage or podium. A conventional telephoto lens 701 is pointed toward the subject 766, to acquire an image 760 in the usual way.

Rather than being directed to the photosensitive surface of a video camera, however, the image 760 is redirected by folding mirrors 702, 703 to a filter system 762 such as in the FIG. 19 system—and thence in real time, and without any sort of electronic intervention or image storage—to a projection system as described earlier. The same image, enormously enlarged, is then returned to appear 746 on a giant projection screen 747.

As to quality, it should be fully appreciated that in this system there is no source whatsoever of any raster or pixel structure. Rather the resolution and sharpness of the displayed image 746 are limited only by the focal quality of the lens 701 and the molecular processes in the two stages of the liquid-crystal light valve modulators.

To ensure this condition, the illustrated beam-turning system of folding mirrors (with a light-sealed tube enclosure) will commonly be preferable to a fiber-optic light pipe, since the latter may exhibit some visible granularity under the extremely high enlargement taken in the final projection stage. A very fine-fiber light pipe, however, may serve.

In either case it may be desired to provide purely optical switching, fading and vignetting arrangements—as well as mechanisms for pointing the lens 701 in different directions without losing either the image 766 or its orientation or focus. Subsystems (not illustrated) of this sort enable selection or combination of different real-time views in different directions from a single projector, for display on the screen.

e) Speckle suppression—My invention incorporates several distinct contributors to the inhibition of visible speckle. These are discussed below.

(i) beam sweep—As previously mentioned the deflecting oscillatory mirrors 20 serve several distinct purposes. A particularly striking purpose is minimization of speckle.

In the art this function has been addressed with a great variety of devices, almost all of which tend to degrade the brightness and collimation or pseudocollimation (as well as the coherence) of the laser beam and thereby limit the quality of the projected image or the economics of producing it, or both. Earlier devices also add single-purpose equipment to the projector, inevitably increasing cost, maintenance requirements and simplicity of the finished product.

None of these objections applies to my invention, which achieves a significant degree of speckle reduction using the simple deflecting oscillating mirrors 20 that also serve several other very beneficial purposes in the projector—thereby achieving a desirable economy in manufacture and maintainability. The mirrors are high-quality optical surfaces that introduce no deterioration of the beam or image quality—thereby achieving a further economy in optical energy.

Figure 22:
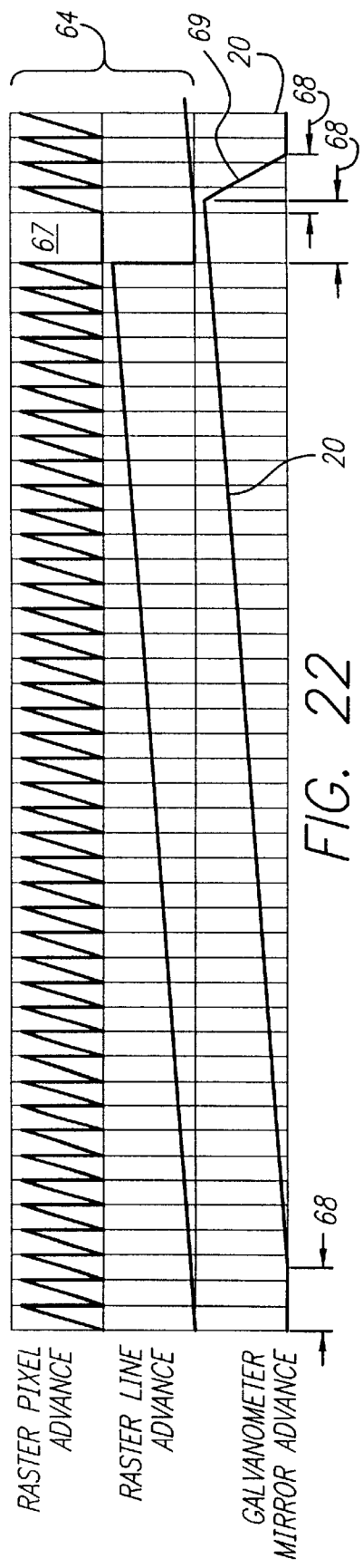
FIG. 22 is a timing diagram showing synchronization in the FIG. 19 embodiments, particularly with delay to accommodate rise time in a liquid-crystal display.

The mirrors 20 sweep the downward-directed beams 22 back and forth over the tops of the respective recollimators 23, but always within the apertures of those lenses, and into the entry faces 24 of polarizer-analyzer cubes 25. Each mirror moves in response to electronic control signals—which may be regarded as graphed at 20, FIG. 22—directed to the corresponding mirror driver 21.

Ideally, however, the control signals may be varied in such a way that the illustrated straight ramp 20 represents a constant rate of positional scan of the beam along each entry face 24 (and therefore along the modulator face and the projection medium). This is theoretically preferable to a constant rate of signal change or a constant change of angle. Nevertheless in practice the angle through which the beam sweeps over the recollimators 23, in view of the length of travel between the oscillating mirrors 20 and recollimators, is small enough that ordinarily the scan speed is adequately constant in positional terms.

Figure 20:
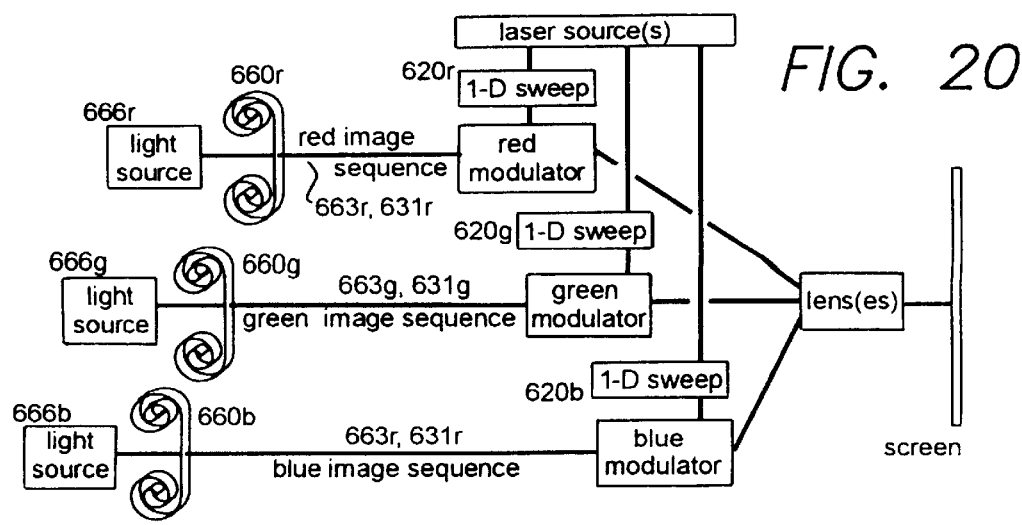
FIG. 20 is a like diagram showing yet another preferred embodiment using input-image information in the form of nonincrementally written motion-picture film color separations.
Figure 21:
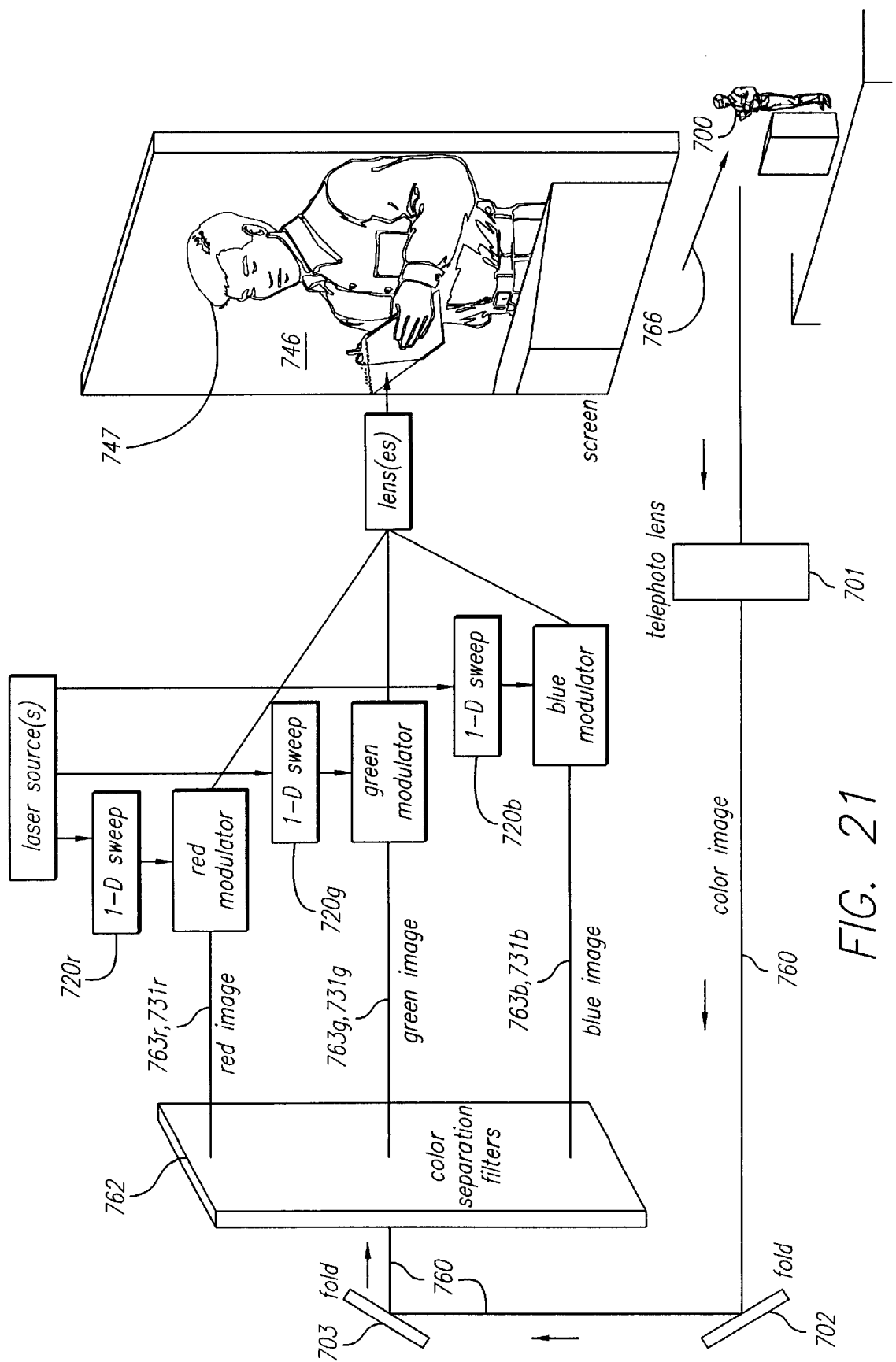
FIG. 21 is a like diagram showing yet another embodiment using input-image information in the form of live images acquired and written without electronics, optically, to the light valve—and also projected—all in real time with no need for storage.

Operation of each mirror 20 is advantageously controlled in correspondence with incremental writing of the image signal 31 to the CRT 32—or to a liquid-crystal light valve electrode, laser diode, or other writing system such as enumerated in the preceding subsection "d". Naturally this condition is inapplicable to full-frame or nonincremental writing systems (FIGS. 19–21).

Incremental writing, where used, may typically be characterized by raster pixel and line advance states or signals 64 (FIG. 22), with a vertical blanking interval 67. It is known that the writing processes of a liquid-crystal light valve have a certain very short lag time, commonly on the order of a small number of pixel periods—and also a persistence period, typically corresponding to the time in which a few raster lines are written.

Preferably the mirror sweep signal 20 (FIG. 22) is initially delayed by a time 68 (at left end of the drawing) related to the writing-process delay. Mechanical flyback 69 of the mirror may be effected during a like interval 68 (right end of the drawing).

The precise mechanism by which the mirror sweep suppresses speckle is not absolutely clear; however, the resulting suppression is a fact, and the validity of my invention is not to be deemed dependent upon a reliable explanation. The most plausible explanation of which I am aware relates primarily to shifts, and perhaps to a lesser extent disruption, of coherence—through changes in the pathlength to each point on the projection medium, as the down beam 22 scans over the central layer 26 of each cube 25.

That beam scans leftward and downward along the interface layer 26, not entirely by displacement but in part by changing incidence angle—on account of the rotation of mirror 20, 120 or the optical rotation within the cell 61. As an example, incoming rays 22p–22w (FIG. 23) which in one instant are near vertical will be redirected, only a very small fraction of a second later, as inclined rays 22p'–22w' (FIG. 24) at a small angle off (to the left of) vertical. The inclined rays reach the interface 26 slightly to the left of their previous positions when vertical.

(For clarity of the illustrations the angular offset from vertical may be exaggerated. Also the reading-beam rays directed from the interface 26 toward the liquid-crystal light valve are all drawn at slight angles to the horizontal, as they approach the mirror 30' that separates the writing stage, at left, from the reading stage in the liquid-crystal light valve 30. Similarly the rays returned from that mirror to the cube interface are all drawn at opposing slight angles to the horizontal, so that the actually horizontal return rays 34p"–34v" can be distinguished from the also-horizontal inbound rays 22p–22v. In these very simplified drawings the recollimator and cube faces 24, 27 have been omitted, so that actually-angled rays to the recollimator are represented more simply as angled rays to the interface 26—whereas actually the rays reaching the interface 26 have been recollimated and are nearly vertical for all beam positions. It will be realized by those skilled in the art that these simplifications are immaterial to the following analysis.)

As the reading beam shifts downward along the modulator mirror, passing writing-stage rays 32p–32v that represent a particular group of image points or lines, the initial correspondence between reading-beam rays 22p–22v and writing-stage rays 32p–32v is lost. Thus for instance a particular upper writing ray 32v that initially controls a particular ray 22v, 22v" (FIG. 23) in the near-vertical reading beam, later controls a shifted ray 22w' (FIG. 24) which is to the right (and lower) in the displaced, angled reading beam.

Likewise lower writing rays 32q–32u respectively control certain reading-beam rays 22q–22u, 22q"–22u" (FIG. 23) in the vertical beam, and instead control shifted reading-beam rays 22s'–22v' (FIG. 24) in the displaced, angled reading beam. In particular some reading-beam rays 22p that initially participate in the imaging of the writing-beam rays 32p will—in another instant—pass beyond these particular writing rays. Thus a corresponding angled ray 22p' (FIG. 24) moves below the illustrated writing-beam region.

In most positions such an angled ray can be used for imaging of part of a later-written raster line (not shown). Conversely a reading-beam ray 22w that initially is too high to participate in imaging the particular writing-beam rays illustrated, will later shift into position 22w' for imaging the topmost reading-beam ray 32v.

Figure 23:
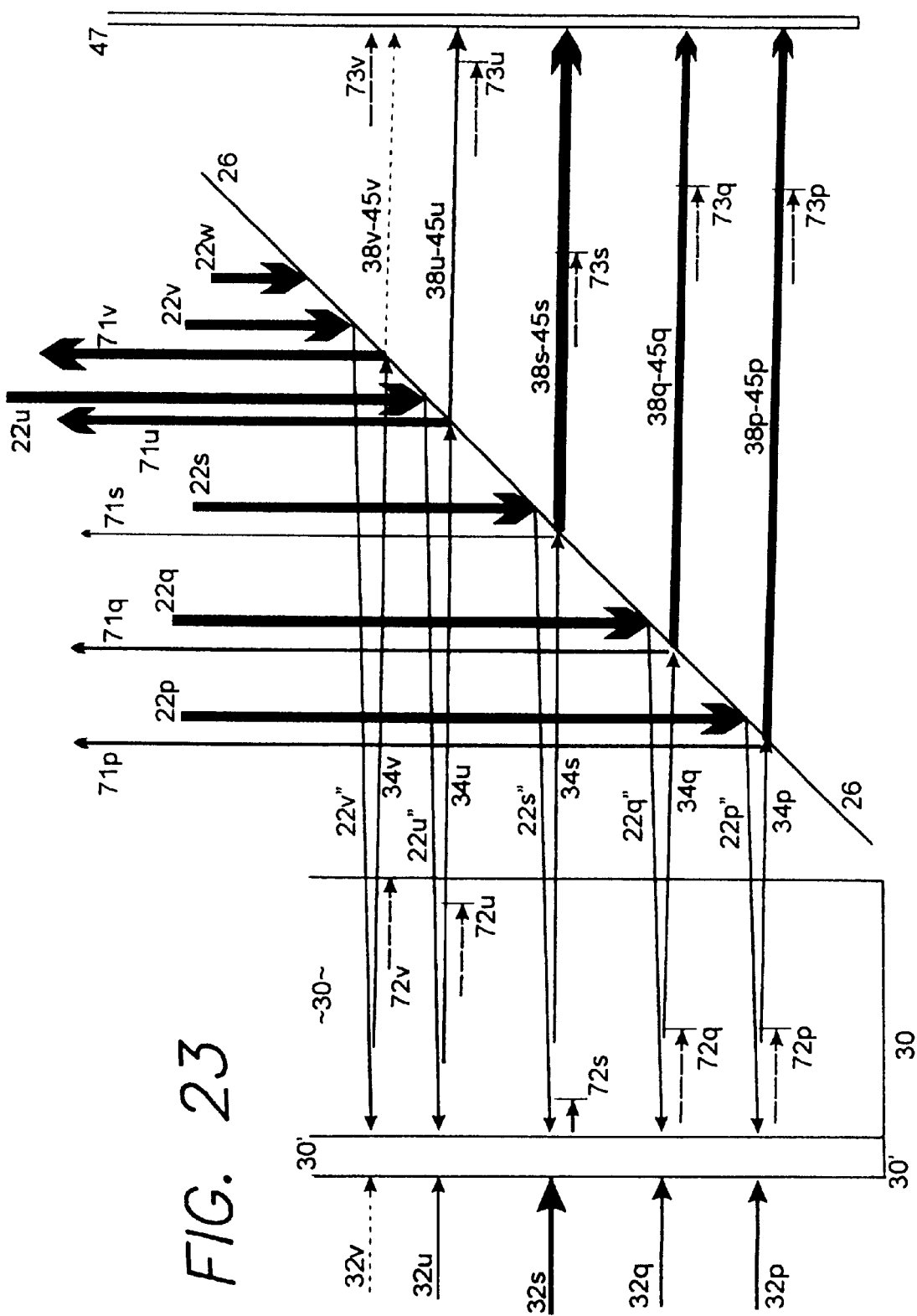
FIG. 23 is a simplified optical diagram showing two cooperating principles of operation of a speckle-suppression system that is incorporated into certain preferred embodiments of the invention—particularly with the system in one stage of its operation.

Now with these geometrical relations in mind it can be recognized that the horizontal return beam paths from the modulator mirror to the cube interface 26 are shorter for the angled, leftward-displaced beam (FIG. 24) than for the initial vertical beam (FIG. 23). The paths from that mirror to the projection screen are, at least in comparison with the other relationships discussed here, substantially unchanged.

On the other hand the down-beam paths from the oscillating mirror to the cube interface 26 are longer for the leftward beam (FIG. 24) than for the initial beam (FIG. 23). Given a forty-five degree angle at the interface 26, the increase in vertical travel should just cancel the decrease in horizontal travel; however, this is not quite the end of the story.

There are several second-order effects. First, in addition to being displaced, the later beam is also differently angled. The distance traveled along the hypotenuse of the beam path is clearly longer for a more steeply angled beam (FIG. 24) than a more nearly vertical one (FIG. 23).

Figure 24:
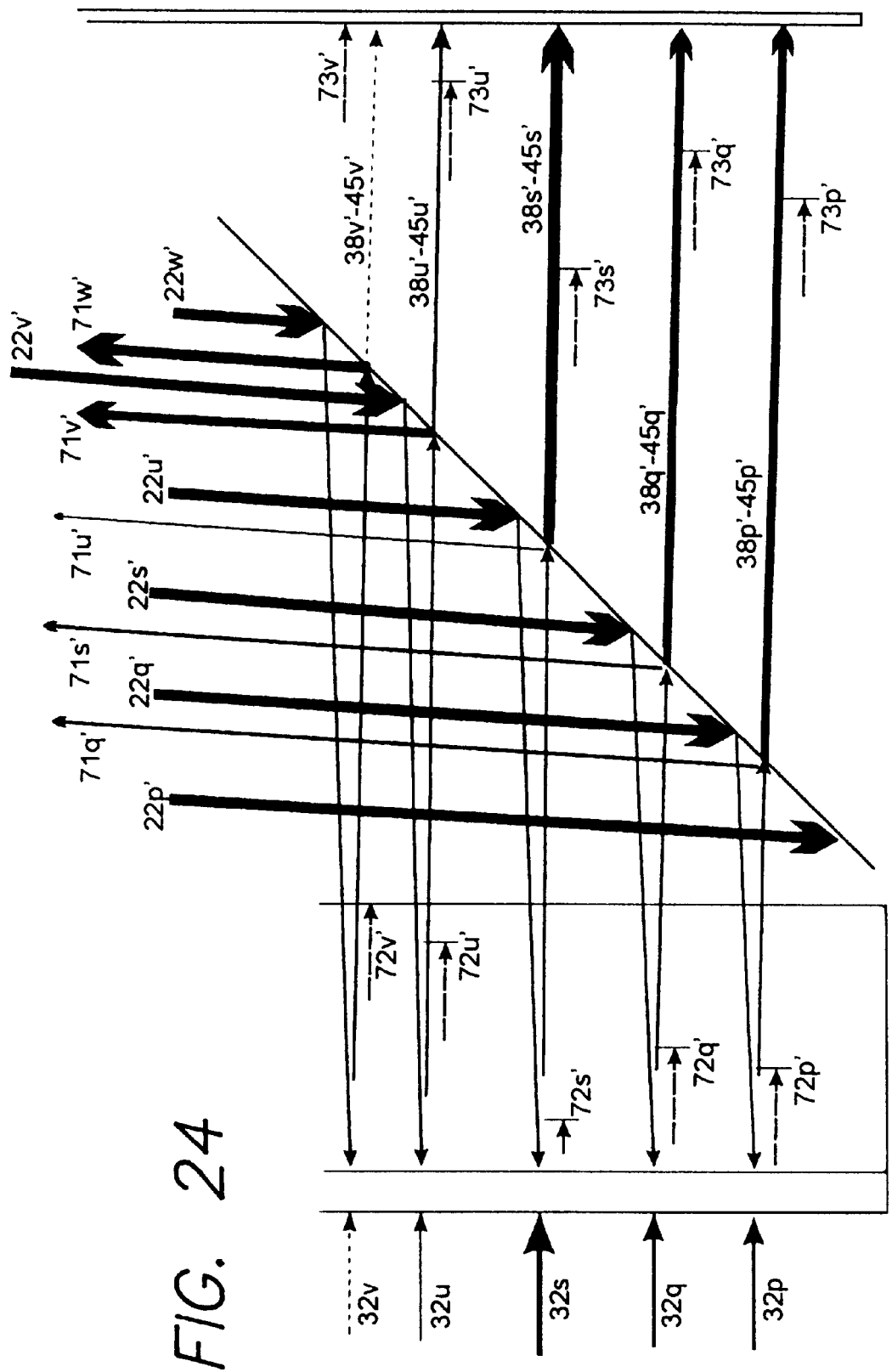
FIG. 24 is a like view showing the same system in another stage of its operation.

Hence for each writing ray 32p–32v, the reading-beam pathlength used for expressing that ray at the projection medium 47 changes continuously. For instance the very same writing ray 32s has at one instant a relatively shorter distance to the screen, due to the near-vertical beam path 22p (FIG. 23)—and at the next instant a longer distance to the screen by virtue of the extended hypotenuse along the angled path 22p' (FIG. 24). Although the differences are small by commonplace standards of comparison, they are extremely large in relation to the wavelength of light.

Still more interestingly, the earlier-discussed beam expansion, introduced by the negative lens 18, causes this difference in hypotenuse lengths to vary from ray 22p to ray 22q, etc., within the beam. Although no attempt has been made to represent this more-subtle effect in the drawings, those skilled in the art will understand that each ray 22p, 22q . . . 22v, as it propagates downward, is angled leftward (i.e. clockwise) relative to all the rays 22q, 22s . . . 22w which are to its right in the beam.

This differential angling due to the beam expansion interacts with the progressive difference in hypotenuse lengths, making the size of the difference itself vary as the process continues. The precise behavior of the system may depend upon the particular contours of brightness-trim optics used at the width-expanding lens 19 or curved mirror 120. For the simpler case of a cylindrical lens 19 and planar mirror 20, the variation may be in the nature of a continuing acceleration of the pathlength difference from moment to moment, as the ray angle steepens ever more quickly with rotation of the mirror.

Whether acceleration or deceleration, or a more-complex behavior, the effect on beam coherence is not only a shift in absolute terms, i.e. in terms of the time for an image ray to reach the screen, but also a perturbation differentially—which amounts to a disruption. In effect the planar wavefronts of the beam acquire a cylindrical (but probably not a circular-cylindrical) twist.

This geometry is still further complicated by similar relations that could be examined at the oscillating mirror 20 or in the cell 61—and which in some situations may tend to compensate for the pathlength differences described above. Due to the smaller transverse dimensions of the beam in the upper tier, however, those variations cannot overcome the larger dimensional changes described.

(As suggested earlier, simplifications in the drawings and corresponding discussion—for the sake of clarity—cause the hypotenuse paths to be defined in relation to the cube interface 26. In actuality the angled-path phenomena are primarily with respect to interception of beams at the recollimator 23, not really at the interface 26. It can now be seen, however, that the principles described have not been significantly misrepresented in this simplified presentation. Although I have referred to the near-vertical beam condition of FIG. 23 as the initial condition, it is only "initial" for purposes of comparison between FIGS. 23 and FIG. 24; more generally if desired the beam may be made to sweep from a first condition per FIG. 5 in which the beam is angled rightward from vertical, as it propagates downward, through a vertical condition in FIGS. 23 and 6, and finally to the oppositely angled condition of FIGS. 24 and 7. Thus some of the differential angle effects discussed above may, in some portions of the beam sweep, have opposite polarity than those indicated in the discussion.)

For each position of the beam as described above, speckle is theoretically present—but the speckle pattern for each position of the beam is significantly different from that for every other position. Speckle patterns are understood to arise in the eye due to interferences from neighboring screen positions that are separated by distances only on the order of a wavelength of light. Even tiny changes in projection pathlength, changes on the order of the wavelength, therefore can significantly shift or totally change the speckle pattern.

As the beam sweeps swiftly along the central layer 26, the speckle pattern therefore moves, and also changes, very quickly—far more rapidly than the eye and brain can follow it. The human vision mechanisms tend to average out the differences among the myriad diverse speckle patterns as they flash by, strongly decreasing the viewer's ability to distinguish or to perceive any single one pattern or category of patterns.

While thus greatly reducing or in many cases even eliminating visible speckle, my invention as described to this point avoids all the diffusers, absorbers and like unproductive encumbrances proposed in the prior art. This speckle-reduction feature of my invention accordingly promotes economy both of manufacture and of optical energy.

(ii) light-valve spatial modulation—It has been my observation, however, that under certain experimental circumstances a small residual of speckle may be perceived. I have discovered that, remarkably, use of the liquid-crystal light valve itself is helpful in removing this residual.

Although I have disproved the theory that such a valve—because it degrades beam coherence—must fail to produce infinite sharpness, nevertheless the degradation of beam coherence in the valve is significant. It may be that degradation which is responsible for the observed role of the valve in further suppressing residual speckle.

The reason for this seems to be that some neighboring regions of an image—where coherent laser light could interfere at the eye, to produce speckle—are prevented from doing so by slight phase shifts as between those neighboring regions. These phase shifts are associated with the production of a latent image in polarization, as described earlier.

Thus for example consider first a region of the liquid-crystal modulator where the writing beam is dark, or in other words where the writing ray 32$v$ (shown in the broken line) has null intensity. Next consider the returned reading-beam ray 34$v$, propagating from the valve mirror toward the entry surface of the valve—still at the position of that null writing ray 32$v$.

Suppose now that for a null-brightness condition 32$v$ the calibration or adjustment of the valve brings some particular wavefront 72$v$ in that returned reading beam just exactly back to the entry surface of the valve at a certain instant in time. For purposes of simplicity we assume that a corresponding wavefront 73$v$ (also in the broken line) in the projection ray 38$v$–45$v$ just reaches the projection screen at that same instant. Since this ray too, like the corresponding writing ray 32$v$, should be null, the wavefront 73$v$ is something of an abstraction but will serve as an important reference in this discussion.

An adjacent writing ray 32$u$ (drawn with a lightweight line) we assume is instead very dim but not of zero energy, and—through the modulation processes of the valve—delays the corresponding return ray 34$u$ (also in lightweight line) so that a portion 72$u'$ of the same wavefront 72$v'$ cannot quite reach the valve entry surface, at the above-defined "certain instant". The wavefront portion 72$u'$ is thus second to the null portion 72$v'$ (but only by a nose), and roughly this same very small retardation will be preserved at the projection screen 47 for a portion 73$u'$ of the same wavefront as the null wavefront 73$v$ at the screen.

The retardation in terms of physical distance will be slightly greater, making allowance for the difference in propagation speeds through the remainder of the modulator and through the air between cube and screen. (As will be understood, this retardation is shown greatly exaggerated in comparison with the schematically illustrated distance from the cube to the screen.)

Analogously a very bright writing ray 32$s$ (drawn with a bold line) will much more strongly delay its reading ray 34$s$, so that its corresponding fraction 72$s$ of the initially common wavefront 72$v$–72$u$ may perhaps only be able to just leave the mirror before the "certain instant". Before making its way out of the optically dense materials of the modulator and cube, the reading ray 34$s$ (also drawn bold) will give up an even greater handicap to the null and dim rays 34$v$, 34$u$, which by then will have moved ahead much more quickly through the air toward the screen. Accordingly the retardation of the forward wavefront 73$s$, in terms of distance at the screen, will be accentuated.

Also assumed for purposes of explanation are two additional writing rays 32$q$, 32$p$ which both have brightness (as well as line weight in the diagram) that is intermediate between those of the rays 32$u$, 32$s$ just considered. For these two rays a likewise intermediate amount of delay will bring their corresponding portions 72$q$, 72$p$ of the above-discussed common wavefront to an intermediate position within the modulator. As before, this delay—somewhat amplified by the difference in densities of the modulator and cube vs. air, will also appear for the corresponding forward wavefront segments 73$q$, 73$p$ near the screen.

Now it can be seen from inspection of the several wavefront-fragment representations 73$p$–73$v$ near the screen 47 that coherence, and therefore capability to sustain speckle, is strongly fragmented by the light valve. This particular beneficial effect, however, is available only in portions of the image having spatially abrupt variations in brightness for closely adjacent writing rays 32$p$–32$v$—and not for portions of uniform brightness.

The effect just discussed for the equal-brightness writing rays 32$q$, 32$p$ also interacts with the previously discussed beam-angle effect, and furthermore with the differential angle effect—both discussed in the preceding subsection "ii".

Such interaction can introduce differential delays between the reading-beam rays 38$p'$–45$p'$, 38$q'$–45$q'$ resulting from such equal-brightness writing rays 32$p$, 32$q$.

This effect is suggested in schematic showings of the corresponding wavefront portions 72$q'$, 72$p'$ (FIG. 24) within the modulator—and downstream wavefront portions 73$q'$, 73$p'$—thus further fragmenting beam coherence even in areas of uniform image brightness.

(iii) wavelength mixture—Still further helpful in speckle suppression is the introduction of cyan light in conjunction with the long-wavelength (over 635 nm, and preferably between 635 and 650 nm; most preferably 647 nm) primary red light. As suggested previously this enhancement may be due to a kind of admixture or dilution by wavelengths that are present in relatively pure form but cannot constructively or destructively interfere with the primaries.

It is also possible that those wavelengths themselves introduce some amount of another speckle component that helps to perceptually mask the speckle due to the primaries. In any event, this additional refinement in speckle suppression may be particularly helpful in, for example, portions of an image that are uniform in color and brightness—so that the light valve cannot provide effective disruption of coherence.

(iv) projection surface—In practice of my invention I have further found that a high-gain projection screen should be avoided to yet further minimize speckle. A convention low-gain screen is preferable. For shows in environments not requiring highest image intensity, an even more low-key projection medium such as a fine cloth screen may facilitate best speckle control, as well as imparting the most natural appearance to earth and skin tones.

f) Beam artifact control, and energy efficiency—My invention enjoys easily, for the first time in a laser projector, the advantages which were proposed by Henderson, Schmidt and Gold but so elusive in the context of an incandescent (e.g. arc) lamp. One such benefit that is particularly important involves masking losses.

(i) laser-beam intensity profiles—Possibly one obstacle in the arc-lamp environment arose from a Gaussian distribution in the shallow slot-shaped beam, as asserted by Henderson. The basis of that assertion is not clear to me, but in any event one of the most common sorts of laser beams—known as a "TM00 transverse mode" (FIG. 25)—has a like distribution.

By comparison an ideal intensity distribution across an illumination beam for use in a liquid-crystal light valve would be uniform—familiarly called a "tophat" distribution TH, for its resemblance to a very old-fashioned formal top hat. The departure of a TM00 beam from such a tophat distribution, as the illustration shows, implies that the beam periphery is relatively dark, or dim, in comparison with a bright region tailing off in all directions from the center.

The cross-sectional distributions illustrated are not merely one-dimensional—as for example from left to right across an image, or from top to bottom—but rather two-dimensional and with circular symmetry about the centerline C. Therefore it is the entire circumference, the annular region near the overall beam or aperture radius ±r in the drawing, which is degraded. Particularly for square or rectangular images, as will shortly be seen, such a two-dimensional effect becomes difficult to correct or compensate.

Another common type of laser beam is a so-called "TM00 transverse mode". As shown, this sort of beam considerably better equalizes the intensity distribution at the center with respect to the intermediate regions that are, say, halfway out from the center to the beam edge. An intensity minimum appears at the center which (for reasons that will become clear momentarily) does not create a significant problem and in fact may be advantageous.

The lower brightness about the periphery, however, is still a severe obstacle to uniform illumination in a final projected image. Thus at the outset some laser beams have brightness-distribution characteristics that limit ultimate performance and may be comparable to those mentioned.

A new dimension is introduced, however, by certain kinds of multimode laser beams (FIG. 25a, and the uppermost section of FIG. 29). No attempt is made in this document to represent the intensity function across such a beam accurately; the relationships are illustrated only very conceptually.

As shown, the brightness cross-section commonly has a central declivity C analogous to that in the TM01 beam, and an intermediate region of brightness ripples R which an engineer or scientist might describe as "ringing down". The brightness distribution also exhibits a peripheral edge or limb L that falls very abruptly—just immediately inside the beam aperture—to a minimum that is essentially zero at the edge ±r.

Multimode beams as such were not invented by me, and are well known; however, they are a particularly valuable refinement of my invention. They provide a very acceptable approximation to the ideal tophat function TH mentioned earlier. All the fluctuations within the main body of the beam, i.e. inside the limb L, are relatively quite small as a fraction of the maximum brightness.

(ii) visible beam nonuniformities—Nevertheless these fluctuations and others are plainly visible and in fact very conspicuous if a laser beam is merely enlarged and statically projected onto a viewing surface, in a liquid-crystal light-valve system. The mode-related intensity variation appears as a series of bright annular zones, with annular maxima of brightness represented very roughly by the inner concentric circles within the aperture radius r (top view of FIG. 29).

In my opinion, showing a motion picture or other natural-scene image by simply modulating such a beam with the image, and projecting the modulated beam onto a screen, would be a total failure. The worst of it, however, has yet to be pointed out.

In addition to the geometrically regular variations, a laser beam projected via a liquid-crystal light valve is subject to myriad erratic but strongly defined artifacts A (FIG. 29). It has been suggested to me that these features arise from the polarization- and phase-based character of the light valve, as used with near-monochromatic laser radiation.

Closely analogous optical trains are used for the specific purpose of displaying in stark, high-contrast relief certain extremely subtle optical effects. One such device, for example, is the phase-contrast microscope, for which Fritz Zernike received the 1953 Nobel Prize. It converts wispy, indistinct images of ultrathin biological specimens to well-defined and much more easily studied pictures.

This advantage, in phase microscopes and phase-based quality-control systems, becomes very much the opposite when it is manifested in the sensitivity of a liquid-crystal and laser projector to minor defects or even subtle stress patterns within the optics of a near-monochromatic laser projector channel. (Such phenomena undoubtedly occur in an arc-based system—as for example in a Hughes projector—but probably are averaged out by the variations due to the broad spectrum in each primary-color beam.)

As shown, some of the resulting artifacts appear to be well-defined oval shapes, often having a linear outline, while others have the appearance of irregular and sometimes moving or floating pieces of trash. All these features would be extremely distracting and contrary to desired esthetics of a projected motion picture or other image. Thus an important part of the successful practice of my invention consists of managing these artifacts.

(iii) the masking problem—Another important part, mentioned earlier, is in avoiding energy losses that arise through ordinary beam masking. The beam-masking problem can be analyzed quantitatively through simple geometry and arithmetic. Customarily a laser beam, like the white light beam in an arc-based system, is originally circular—although the reasons for this similarity are different.

If such a beam is used directly to project a square image 774 (FIG. 26), naturally to avoid totally dark corners the square projection beam must be extracted from the circular original beam in such a way that the square corners of the projection beam are entirely within the bright area of the original circular beam. On the other hand, minimum light should be wasted, so the square corners should not be spaced far inward from the circular beam edge.

(Starting with FIG. 26, and in FIG. 29 the second view, the outer circle in the drawings may be regarded as slightly redefined. No longer does it represent the initial laser aperture ±r of FIGS. 25, 25a but rather the effective aperture physically defined by the sharply cut-off peripheral limb L.)

The best that can be done, the ideal, is to inscribe the square within the circle as illustrated. In this relationship the diagonal of the square equals the diameter of the circle. If we call that common distance d, then the area of the square is $d^2/2$ and the area of the circle is $\pi d^2/4$.

Now the fraction of the circular beam that is employed in forming the square beam is the ratio of these two expressions, which is $2/\pi$ or 0.64; therefore the fraction that is discarded is $1-0.64=0.36$ or thirty-six percent. More than a third of the optical energy in the laser beam would be just thrown away.

Commercial motion pictures and most natural-scene photography, however, nowadays seldom use a square format. One more-highly preferred format is 3:4 (FIG. 27). To determine the amount of laser energy that is wasted, again we assume that the format (now rectangular) is inscribed within the circular source beam and calculate the two areas.

In this case convenient dimensional units are sides of the three vertical and four horizontal square internal cells, so that a diagonal d is given by $d^2=3^2+4^2=5^2$, and $d=5$. Now the area of the rectangle is $3\times4=12$, and the area of the circle is $\pi d^2/4=5^2\pi/4=6\frac{1}{4}\pi$. Here the fraction used is the ratio of 12 to $6\frac{1}{4}\pi$, namely 0.61, so the discarded fraction is $1-0.61=0.39$ or thirty-nine percent, slightly worse than the square-format case.

For wide-screen shows, the format preferred is 9:16 (FIG. 28), where the diagonal d can be found from $d^2=9^2+16^2=337$, and $d=18.4$. Here the area of the rectangle is $9\times16=144$, and the area of the circle again $\pi d^2/4=337\pi/4=84\frac{1}{4}\pi$, for a used-energy fraction of $144/84\frac{1}{4}=0.54$, only just over half. Forty-six percent, nearly half, is discarded.

(iv) a unitary solution—Preferred embodiments of my invention resolve both the management of artifacts and this energy-efficiency problem, and do so by a single, simple system that also effectuates the speckle suppression discussed in foregoing subsection "e". Specifically, as previously described the optics 18, 19 (FIGS. 5, 8 and 9) may in effect simply collapse the initially circular laser beam 11 (FIG. 29) to a shallow oval or elliptical beam 22; and the very small amount of energy in the extreme wings 75 is then masked off at ±m as illustrated, before the sweeping of the beam down the projection medium.

Although the beam is thus changed in shape, the original energy distribution in the beam—i.e., the not-quite-uniform pattern of annular brightness rings (top view in FIG. 29)—when collapsed to a function along a diametral cross-section, will generally approximate a semicircular function 76 (FIG. 29). If the original circular beam were entirely uniform, the pattern would be semicircular, necessarily remaining unchanged from the circular shape of the original beam.

Here the several circular brightness ripples R tend to partially wash out one another, the upper and lower arches of the ringlike brightness patterns compensating in part for the dimmer center. As a result, the only pattern of fluctuations that remains, superimposed on the semicircular distribution 76, is considerably better neutralized or homogenized.

Furthermore all the highly localized trash due to dust specks—or microscopic stress points, dimples or bubbles in optical glass—and other artifacts A are greatly diluted in the brightness of the rest of the beam, and are in effect washed out. The overall distribution 76 is now much smoother and easier to use for projection purposes.

(v) one-dimensional compensation—To provide a reasonably constant or uniform energy distribution along this flattened beam, some compensating function 77 is required. This correcting function is essentially a circular chordal shape, not quite a complete semicircle, in view of the masking near the ends.

Although this compensation may seem to be a very significant additional step, it is only necessary along an essentially linear or one-dimensional region—not within a two-dimensional frame as discussed above with respect to FIG. 26. In the process of collapsing the circular beam to a slot, all of the artifacts A and ripples R are greatly smoothed out and blended so that the one-dimensional compensation function is the main adjustment that remains to be accomplished.

As suggested earlier, a preferable approach uses special refractive elements for the initial entry optics 18, 19—or still more preferably a compound-curve molded mirror 120 (FIG. 10)—that may be customized to equalize both the energy distribution and the shape of the oval 22. With this approach, after masking off the wings 275 one can achieve a more nearly rectangular beam 222 with a very nearly flat distribution 276, calling for at most very minor compensation 277—all as shown in the fourth view of FIG. 29.

These approaches are desirable to avoid the need for an entirely separate optical compensator to impart the function 77 in the central view. (Furthermore they are helpful for enhancing the functions discussed in subsection "g" below.)

(vi) sweep refinements—With the intensity distribution along the wide, shallow beam now smooth and substantially uniform, to obtain a similarly uniform full frame for image projection it remains only to sweep the beam vertically over the screen. As shown in subsection "e" above, this is accomplished in operation of the speckle-suppressing deflection system 18–20 that precedes the liquid-crystal light valve modulators.

In consequence, considering here only the improvement attained specifically through elimination of circular-to-rectangular masking, the percentage increase in optical energy used to form the image can be found from the three percentages calculated above in subsection f(iii). For the three cases of square, 4:3 and 16:9 screen aspect ratios, again those percentages are 36%, 39% and 46%.

For these same three cases, the improvements obtained through avoidance of masking are by factors approaching respectively $1/0.36=1.56$, $1/0.39=1.64$, and $1/0.46=1.85$. In other words, the increases respectively approach 56%, 64% and 85%. (Use of the word "approach" can now be more specifically appreciated in terms of the very small amount of energy lost at the right and left ends or wings 75, 275 of the shallow beam, between the full radius ±r and the mask ±m.)

If desired, as suggested in subsection "e(i)", an additional refinement can be included without significant cost: forcing the beam to scan at a substantially constant rate in terms of distance down the modulator, rather than in terms of the angle of the vibrating mirror or other deflector. Scanning at a constant rate along the modulator should track the writing beam at the input of the modulator more accurately. This improvement, however, will be significant only if the half angle of the beam sweep (recollimator radius divided by distance from vibrating mirror to recollimator) is large enough to introduce a tracking error greater than one or two raster lines.

In such a case, the skilled person will understand that for these purposes the rectilinear ramp 20 (FIG. 22) preferably represents position within the modulator height FF, rather than galvanometer drive signal as such. The difference can be understood simply from the geometry as a faster sweep along the modulator for each angular increment when the beam is already at a steep upward or downward angle than when it is directed toward the central height of the frame.

In trigonometric terms, more specifically, the vertical position is roughly proportional to the sine of the beam angle; therefore the scan rate on the modulator can be equalized by driving the galvanometer or other deflector with its inverse function, namely an arcsine-function signal. When the angle changes as the arcsine of a constantly changing value kt, commonly written "sin$^{-1}$(kt)", screen position should vary approximately as sin{sin$^{-1}$(kt)}≡kt, or in other words at a constant speed down the modulator frame.

If the projection throw (distance to the screen) is quite short and the screen quite tall (or wide), a potential difficulty may arise in distortion and nonuniform illumination of the image due to the resulting relatively steep projection angle. In conventional projection systems the focusing of the beam on the screen by a field-curvature-correcting lens avoids these effects.

As an example, consider image distortion—and variation of image brightness—at the top or bottom of the screen with respect to the center. At the extreme positions of sweep, the distance to the screen is slightly greater, tending to spread the constant-angular-height beam over a greater distance—the beam cross-section varying with the reciprocal of the cosine of the off-axis angle of the beam relative to the system centerline. The beam therefore suffers a decrease in apparent brightness in each unit area, the brightness being proportional to the cosine.

Furthermore at its top or bottom the screen is more strongly angled to the beam, tending to spread the beam even further on the screen. This effect introduces another factor of the reciprocal of the cosine in beam height along the screen. Considering the two effects together, the screen brightness must be proportional to the square of the cosine of the off-axis angle.

To make the cosine-squared equal to, say, ninety percent or more—and thereby to make the distortion and the brightness-nonuniformity effect probably negligible—it is only necessary to restrain the vertical half-angle at the screen to no more than about thirty-two degrees. For a screen about thirteen meters (forty feet) tall, this condition requires that the projector be at least about 20 meters (roughly 60 feet) from the screen.

This is the easiest and most economical resolution, if space allows. Otherwise it should be possible to employ, or design by conventional techniques and then employ, a projection lens that corrects this factor.

In principle, like considerations may apply to horizontal deformation and brightness uniformity near the right and left ends of the screen. Equalization of brightness, however, if problematic is controllable through the compensation 77 or 277 discussed earlier.

g) Contrast enhancement and image brightness—Here too, my invention achieves easily, for the first time in a laser projector, the advantages proposed by Henderson, Schmidt and Gold but evidently not commerciable using arc sources. This is accomplished by the same mechanisms used above to suppress speckle, conceal laser-beam artifacts, and minimize masking losses.

(i) persistence zone—As mentioned earlier, optical energy is wasted if the reading beam illuminates portions of a liquid-crystal light valve where no image writing is taking place (or has recently taken place) in the image-input stage of the valve. Due to persistence effects in the valve, reading light can still be returned through an analyzer cube of my invention—and projected to a viewing screen—if that light reaches a raster line within a short time after that line has been written.

For any of the conventional or standard raster timings of which I am aware, that short time typically amounts to the time required to write a few raster lines. Such a slot-shaped region, which is in effect a persistence zone, is very similar in shape to the vertically collapsed beam 22, 222 (FIG. 29).

The persistence zone thus amounts to a fraction of the full image height. That fraction is generally between one tenth and perhaps one fifth or (with more margin for error) one quarter.

(ii) synchronization and brightness—Flooding the entire modulator frame therefore wastes three-quarters to nine-tenths of the light energy by illuminating outside the persistence zone. In other words, the image can be between four and ten times brighter if the reading beam closely conforms to the persistence zone. This implies that the reading beam must be moved with the writing signal, as has in fact been described for my invention, in earlier sections of this document.

(iii) synchronization and contrast—Such synchronization has an additional benefit. Although light wasted in parts of the modulator outside the persistence zone cannot produce any portion of an image, such light can degrade the image. To the extent that the analyzer cube may leak light that is not in the nominally selected polarization state, an overall cast or very dimly lit background appears even in areas that should be dead black.

Stray light may also arise from polarization imperfections in the source laser beam (although these should be removed upon initial entry through the cube), or from spurious polarization-degrading characteristics of the modulator itself. In any event, confining illumination to just a very small envelope about the persistence zone reduces the overall stray-light background by a factor of perhaps twenty—while simultaneously raising image brightness by a factor of four to ten as stated above.

Therefore this system in principle directly enhances the inherently high contrast of the light-valve/cube system by a multiple equal to the product of these numbers. Contrast is thereby improved, at least theoretically, by a factor between very roughly eighty and two hundred. (In practice it appears that other considerations come into play to limit the contrast improvement to factors well under eighty.)

h) Irregular projection media, infinite sharpness, and projection distance—Acoustooptic modulators (AOMs) have some capability for infinite sharpness and therefore for projection of images onto projection media at highly different distances from the projector. This characteristic, however, is essentially moot since AOMs are so poor in optical-energy efficiency that it would be impractical to use them commercially for any long-throw performance.

Liquid-crystal "displays" or "devices" are not able to provide infinite sharpness. Projectors based on such devices accordingly are limited to forming an image on a simple screen in a conventional way.

Most other laser applications involve either focusing the laser beam to a fine spot or projecting the beam unmodified. In effect the laser is manipulated and viewed from outside the beam, treated as if it were a tool or other object.

My invention is thus the first to effectively open up a laser beam and manipulate it from the inside in such a way as to provide both (1) infinite sharpness and (2) a beam that is bright enough to effectively exploit that sharpness in a long-throw environment.

It is known that the capability of a laser beam or any other light beam to maintain its overall envelope and the integrity of its individual rays without intermixing or crosstalk is fundamentally limited by diffraction. Scientists speak of the "near field" of a laser beam, which describes the behavior of the beam just outside the originating aperture where the beam maintains a cylindrical envelope, and the "far field" where the beam expands in a conical envelope.

In the near field, not only is the external shape constant but also the intermixing or confusion of rays within the beam is minimized. In the far field, both the external and internal behavior degrade.

These phenomena are special cases of diffractive effects. It is known that the distance to a region of transition between the near field and the far field is governed by the relationships between the wavelength $\lambda$ of the light and the diameter d of an aperture from which the light beam issues, and more specifically the distance to the transition equals the aperture divided by the square of the wavelength, $d^2/\lambda$.

It is also known that beyond this transition, in the far field, the expansion of the beam follows the half-angle $\theta$ defined by the ratio of wavelength to aperture, roughly $\theta \cong \lambda/d$. Traditionally this degradation of the beam is called the beam "divergence".

Now in my invention the aperture d is typically on the order of 2½ to 5 cm (one or two inches) although it can readily be made considerably larger, and the longest wavelength is preferably about 647 nm. The transition region accordingly lies at least $(2½ \text{ cm})^2/(647 \text{ nm})=965$ m, or roughly a kilometer, away from the projector.

In other words my invention operates entirely within the near field, out to a kilometer (five-eighths of a mile)—and this can be extended straightforwardly to considerably longer distances at the cost of larger optics. Even beyond that distance, beam divergence is less than $\lambda/d=(647 \text{ nm})/(2½ \text{ cm})=0.025$ mrad, or roughly one part in nearly 40,000—one millimeter per forty meters.

Therefore, in a throw extending beyond the near field by 400 m the beam would suffer a divergence of only a centimeter. Assuming an only moderately tall (e.g., 10 m or more) image after such a long throw, and with only one-inch optics, even this divergence is finer than $\frac{1}{1000}$ of the image height. Accordingly, with care in selecting constructional details suited to the intended application, the diffraction-imposed limits to sharpness depth should never come into play in the practice of my invention.

The preferred form of my invention is slightly complicated by the fact that I do not wish to transmit a cylindrical projection beam (i.e. a beam of constant cross-section) to the viewing screen or other medium. Rather I wish to use an expanding or conical/pyramidal beam 45, so that the image on the screen can be much larger than the projector optics.

The character of this beam 45 somewhat defies conventional semantics, since it is factually a spreading or diverging beam—and it is of course a laser beam—but this "divergence" differs from the conventionally conceived "divergence" of a laser source. In the conventional lexicon, as noted above, that term refers to diffraction-introduced degradation of the beam.

Again, that degradation applies to each ray or pencil within a laser beam. It represents not only a spreading of the beam as a whole, and not only a spreading of each individual ray, but also a confusion or crosstalk as between rays.

According to my invention the degradation of the beam is minuscule, and through provision of adequate aperture dimensions can be made negligible for virtually any desired projection distance—subject to availability of adequate laser power for the corresponding viewing distance and desired image size. For this reason to avoid misunderstanding in describing the projection beam of my invention I have used the term "expanding" rather than "diverging".

Now it will be understood that my invention is able to display sharp, bright images on projection media at extremely varied distances from the projector. This does not merely mean, as in the case of a conventional motion-picture projector, that my projector can be adjusted to show sharp moving pictures on a screen at any selected distance.

Rather it means that the projector of my invention can project sharp pictures on a screen at any distance without adjustment—and furthermore that my projector can project sharp pictures on multiple screens or other objects at different distances simultaneously, and still without adjustment. Naturally adjustment may be desirable to change image size, but not for sharpness.

It remains to discuss how these unique capabilities of my invention can be exploited to provide extraordinary visual effects. Several such embodiments of my invention are disclosed below.

(i) structural exteriors—To illustrate on a medium scale the extraordinary capabilities of my invention, a projector 101 (FIG. 30) can be positioned to project images onto a group of buildings 147 that are at distinctly different distances from the projector. For instance the buildings may include one structure 147d which has a surface generally at right angles to the center of the projection beam 145, another building 147e that is further away and steeply angled to the beam, so that the beam almost grazes the building, and a third building that is still further away and is a dome.

The first-mentioned structure 147d also has a side face that is essentially parallel to the beam, and which the beam only grazes in passing. (In the grid-marked perspective section of the drawing at far left, the grid lines are intended to show the contours of the structures—not a grid of the projected image.)

The projected images may be seen from any of a great number of observer positions 178. If viewed from the position of a person 178a near the projector, all portions of the projected image on the several structural surfaces have substantially the sharp, properly illuminated and properly proportioned appearance that they would have if the image were simply projected onto a screen at the distance of, say, the nearest building 147a—except of course that any part of the image projected toward the empty space between the two more-remote buildings is not visible.

From that observing position 178a, the topmost part of building 147e as shown receives a part of the image projected above the near building 147d. Even that part of the image should look normal, except to the extent that the observer's eyes are below the projector position.

If seen from other positions 178b, 178c, all parts of the image appear quite sharp, but with certain exceptions. If the projected image is raster generated, and if a person 178c stands quite near the remote buildings 147e, 147f on which the raster is gigantically enlarged, the person probably is able to visually resolve raster lines so that the image may appear coarse.

Analogously in the case of a nonraster image such as a photographic transparency projection (FIGS. 19–20), the observer may be able to see grain in the original photograph (or copy) 560. For a live natural image (FIG. 21) the observer 178c may be able to perceive the focal limitations of the original pickup lens 701.

Where the image is stretched by the cosine effect across the face of the building 147e which is angled to the beam— or over receding portions of the dome 147f—that same observer 178c sees image elements defined sharply, but distorted by the stretching. The ultimate form of this effect is along the grazing side face of the first building 147d, where substantially no image at all can be seen. Brightness too is distorted by projection distance, and such peculiarities can be seen by such an observer who is close to the projection medium.

Intermediate visual effects are perceived by an observer 178b in a position that is intermediate between the two positions discussed above. When planning a show of the sort that is schematically laid out in the drawing, the visual designers of course take into account the vantage points from which observers will be permitted to see the performance.

The designers select and arrange objects within the image frame so that desired visual effects will appear on the various structures. For instance the stretched appearance of image elements on the angled building 147e or on the dome 147f may be used to dramatic effect—or alternatively may be compensated by providing a carefully controlled compression of the image in that area—if it is known that an important fraction of the audience is to see the image from a vantage which gives that stretched effect. If desired, brightness in various image portions can be boosted or suppressed (preferably by manipulating the original image data) to produce natural appearance from such a vantage.

As noted above, the example here is at an intermediate scale. Much larger projection configurations are feasible, as for instance projection from far greater distances into the range of kilometers.

Depending upon audience position, it may or may not be necessary to project images in very greatly enlarged form; where that is not necessary, typically no special power or brightness constraints are imposed. For example if an image is projected eight hundred meters to a screen, but then the audience is positioned so that the screen as seen by the audience subtends only about the same visual angle as a normal movie screen, the power in the projection beam need be no greater than would ordinarily be used in a normal movie house.

In such situations what is particularly extraordinary about the performance of my invention may be primarily only the ability to hold sharpness over a great projection distance. Similarly for projection onto canyon or cliff walls where extremely large images are desired, but where the images are viewed from audience positions near the projector, for instance—so that, once again, the image as seen by the audience subtends only a relatively small or ordinary-size visual angle—the power in the projection beam need be only what would be used in a more commonplace projection environment.

On the other hand for relatively close viewing of such huge images on cliffs or the like, correspondingly high beam power naturally is necessary. Image color balance can be modified to partly compensate for color of projection media.

(ii) structural interiors—The converse of projection onto the outside of a dome is projection onto the inside 247 (FIG. 31). The visual effects again will differ with positions of observers 278d, 278e relative to the projector 201 that generates the image-carrying beam 245.

For example, if a rectangular grid is projected onto the ceiling and far wall of the dome, as in the two left-hand sections of the illustration, an observer 278e who is centrally positioned about midway between the projector and the far wall of the dome sees a bottom-enlarged (i.e., distorted) view of the grid—as in the lower-right-hand section of the drawing. This is because the lower far wall of the dome is farther from the projector 201 than is the top of the dome, yielding a greater distance in which the beam can expand.

An observer 278d just next to the projector, by comparison, should see the rectangular grid very nearly as it leaves the projector. The same distance which makes grid units at the bottom far wall actually larger than those at the apex also serves to make those larger grid units appear smaller to the observer.

In addition the effects in such a viewing space may vary greatly with the degree of beam expansion selected and implemented through choice of projection lens 44 (FIG. 1). Those skilled in the art will recognize a great many variations of the embodiments discussed above.

(iii) liquid (and like) sheets and sprays—Similarly, instead of static solid structures, some objects that are used as projection media may be transitory or fragmented surfaces such as diverse water-fountain sprays 347d, 347e (FIG. 32) or waterfalls 347f. These too may be at greatly differing distances from the projector 301—but, again by virtue of the infinite-sharpness effect, the images 346 on these water surfaces are sharply delineated (to the extent possible with the diffusion inherent in water sprays etc.).

A single projected image may be carefully designed, in anticipation of a specific position for the projector 301 in relation to a particular assemblage of such media, so that for example no image element will be projected toward regions of space where no desired projection medium 347 is expected. Thus in operation the projection beam may contain only image elements 346d, 346e, 346f that are respectively aligned with the flowing water surfaces 347d, 347e, 347f.

Naturally such dramatic effects are optional, but can for instance include projecting a moving image of one person—a dancer, for example, or a clown or a soldier respectively—onto each of the differently spaced water sprays 347d, 347e or sheets 347f. Narrative or musical effects can issue from a respective loudspeaker or live performer positioned at each image.

In addition to sheets and sprays of water in the form of liquid, equivalently water and other media can be used in other forms such as clouds, fog and ice. In any of these cases, if the surface itself is independently controllable—as for example in the case of computer-controlled fountains and other sprays—additional useful special effects can be obtained even if plural surfaces are aligned along a common projection axis.

More specifically, the closer fountain can be turned off so that all the light bypasses the position of that fountain and proceeds to the position of another fountain that is farther from the projector. Analogously, such effects can be made more subtle or interesting by only feathering or otherwise changing the density or other character of the first spray—rather than turning it completely on or off—to shift the balance, progressively, between projection primarily onto that spray or primarily onto the more-remote spray.

(iv) successive scrims—In the case of the water sprays and surfaces discussed above, images may be either directed to water elements that are laterally spaced apart, or partially projected through one such element to another behind it. The latter arrangement may also be mimicked in nonliquid elements that are nevertheless translucent or only partially reflective, such as stage scrims 447d, 447e (FIG. 33).

Whether made of liquid or of solid mesh, the more-forward partially transmissive surfaces 347d, 347e, 447d, 447e typically can reflect to the audience only filmy or gauzy but nearer images, while the rearwardmost surfaces 347f, 447f may be used to reflect perhaps more solid-seeming but also more distant images. The degree of transparency or translucency of a water surface or scrim can be adjusted by the density of the droplets, mesh or weave, thereby adjusting the balance between brightnesses of the nearer and more distant images.

Although filmy in the sense of being projected on a mesh or other noncontinuous surface, all the images 346, 446 are sharp. If the forward scrims 447d, 447e extend across an entire stage (e.g. behind a proscenium 479), so that the projection beam 445 can reach the rearward scrims only by passing through the forward ones, opportunities for separation of images in space are somewhat restricted.

Nevertheless many useful stage effects can be created through exploitation of the infinite sharpness of my invention and the consequent sharp-appearing images on successive scrims. Projection of sharply defined abstract art or geometric figures, for example, that materialize on the several scrims in series but with progressively increasing size, may be well adapted to presentations with scientific or futuristic themes.

In addition, carefully designed images projected at suitable angles onto successive scrims—and with the audience positioned in a somewhat restricted angular range—can appear to hover between two scrims in an interesting kind of three-dimensional effect. This phenomenon may be related to Nader-Esfahani's discussion in U.S. Pat. No. 5,556,184.

(v) axially spaced natural objects: foliage—Still another class of projection media are living things. Particularly interesting image effects may be obtained by projection on trees 547 (FIG. 34), vines, bushes, and other plants. As shown in the drawing, an image set may be prepared for projection that contains components at roughly left, right and center that are aligned for projection onto respective trees 547d, 547e, 547f.

The show may be viewed from near the position of the projector 501, or if preferred from an audience position somewhat off to one side as actually demonstrated by the illustration. Once again different moving images may appear sharply on each of the trees—made, for instance, from dramatic film clips of faces (e.g. statesmen, actors, singers, storytellers), or perhaps of cartoon characters, animals, fish, birds etc.

(vi) axially spaced natural objects: living creatures—In many of the foregoing exemplary embodiments of my invention I have suggested projecting images of living people onto inanimate objects. Another creative form of my invention encompasses instead projecting images onto living people 647 (FIG. 35).

For instance images 646 of inanimate (or animate) objects—such as flags, swords, cannons, or even scenery—might be projected onto groups of people. This can be done in such a way as to simultaneously illuminate the people and superimpose upon them images of emblems or icons related to their dramatic roles.

One such scheme appears in the illustration. Actually in an outdoor scene, a group of actors 647d costumed as native Americans is standing on a hill, relatively near to the projector 601. In a more-distant grouping and considerably lower are other actors costumed as frontiersmen and mounted on horses.

A sharply defined image of a peacepipe (not shown), with smoke curling above it and a fluttering feather below, is projected on the upper group. An image of a ranch house (not shown), or perhaps a small child (not shown) playing with an old-fashioned wooden toy, is projected—from a different part of the same projector, but simultaneously—onto the lower group.

i) Exemplary dimensions—Following are representative approximate dimensions used in my prototype projector.

| milli-meter | inch | item |
|---|---|---|
| | | in the red channel: |
| 240 | 9.45 | distance A (FIG. 2) from the laser 10r to the galvanometer 21r axis |
| 50 | 1.97 | distance B from the negative lens 18r to the galvanometer 21r axis |
| 4 | 0.16 | distance C from the cylindrical lens 19r to the galvanometer 21r axis |
| | | interchannel: |
| 240 | 9.45 | offset D between the red and blue channel mirror centerlines |
| 120 | 4.72 | offset E between the red and green channel mirror centerlines |
| 120 | 4.72 | offset F between the blue and green channel mirror centerlines |
| 100 | 3.94 | distance L from the blue-green laser to the dichroic color separator 12gb |
| | | in the green channel: |
| 4 | 0.16 | distance G from the cylindrical lens 19g to the galvanometer 21g axis |
| 50 | 1.97 | distance H from the negative lens 18g to the galvanometer 21g axis |
| 70 | 2.76 | distance J from the folding mirror 16g centerline to the galvanometer 21g axis |
| 80 | 3.15 | offset distance I along the crosspath 15g, between the dogleg paths 17g, 13g |
| 100 | 3.94 | distance M from the dichroic color separator 12gb to the folding mirror 14g |
| | | in the blue channel: |
| 240 | 9.45 | distance N from the blue-green laser 10bg to the galvanometer 21b axis |
| 60 | 2.36 | distance O from the blue-green laser 10bg to the folding mirror 14b |
| 50 | 1.97 | distance P from the negative lens 18b to the galvanometer 21b axis |
| 4 | 0.16 | distance Q from the cylindrical lens 19b to the galvanometer 21b axis |
| | | in the modulator tier: |
| 110 | 4.33 | distance R (FIG. 3) between the forward planes 30r, 30g of the red and green modulators |
| 330 | 12.99 | distance S between the forward plane 30g of the green modulator and the rear apex of the projection lens 44 |
| 220 | 8.66 | distance T between the forward plane 30r of the red modulator and the rear apex of the projection lens 44 |
| 100 | 3.94 | diameter U of the projection lens 44 |
| 120 | 4.72 | offsets V between the centerline of the green modulator 30g and the centerlines of the red and blue modulators 30r, 30b |
| 240 | 9.45 | offset W between the centerlines of the red and blue modulators 30r, 30b |
| 50 | 1.97 | length X (FIG. 4) of each cube 25r, 25g, 25b |
| 103 | 4.06 | height Y of the projection lens (output objective) 44 |
| 70 | 2.76 | width Z of the red-channel folding mirror 37r |
| 50 | 1.97 | height AA of each beam-splitter/analyzer cube 25r, 25g, 25b |
| 320 | 12.60 | vertical distance BB from the horizontal midplane of the upper tier to the top surfaces of the cubes 25 |

-continued

| milli-meter | inch | item |
|---|---|---|
| 20 | 0.79 | height CC of each cylindrical lens 19 |
| 10–20 | 0.39 to 0.79 | widths DD of cylindrical lenses 19 |
| 30–50 | 1.18 to 1.97 | focal lengths of cylindrical lenses 19 |
| 44 | 1.73 | overall width EE (FIG. 4a) of each modulator 30 |
| 34 | 1.34 | overall height FF of each modulator 30 |
| 70 | 2.76 | diameter of each recollimator lens 23 |
| 310 | 12.20 | focal length of each recollimator lens 23 |
| 60 | 2.36 | diameter of each modulator output lens 36 |
| 250 | 9.84 | focal length of same |
| 25 | 0.98 | diameter 2r (FIGS. 25a, 29) of the laser aperture |
| ~22 | 0.87 | diameter 2m across the beam as defined by the limb L (FIG. 25a). |

Although these values have been found to lead to excellent results, I continue to experiment with component substitutions in the interest of still further enhancement.

It will be understood that the foregoing disclosure is intended to be merely exemplary, and not to limit the scope of the invention—which is to be determined by reference to the appended claims.

I claim:

1. A laser projector comprising:
   laser apparatus for projecting a picture beam that includes visible laser light of wavelength about six hundred thirty-five (635) nanometers or longer;
   a reflective liquid-crystal light valve for modulating the beam with a desired image; and
   further laser apparatus for projecting one or more picture beams that include green and blue laser light; and
   wherein the laser light of wavelength about 635 nanometers or longer mixes with the green and blue laser light to provide substantially pure neutral colors including pure white and pure black;
   wherein the further laser apparatus projects substantially cyan light with the blue and green light;
   wherein the laser light of wavelength about 635 nanometers or longer sometimes generates visible speckle when used to form a picture on a projection medium; and
   further comprising means for at least partly suppressing visible speckle when present in such a picture;
   said suppressing means comprising the combination of:
      means for displacing the beam substantially as a unit, during its projection;
      said light of wavelength about 635 nanometers or longer; and
      said cyan light.

2. A laser projector comprising:
   laser apparatus for projecting a picture beam that includes visible laser light of wavelength about six hundred thirty-five (635) nanometers or longer;
   a reflective liquid-crystal light valve for modulating the beam with a desired image; and
   further laser apparatus for projecting one or more picture beams that include green and blue laser light;
   wherein the laser light of wavelength about 635 nanometers or longer mixes with the green and blue laser light to provide substantially pure neutral colors including pure white and pure black; and
   wherein the laser light of wavelength about 635 nanometers or longer sometimes generates visible speckle when used to form a picture on a projection medium; and
   further comprising means for at least partly suppressing visible speckle when present in such a picture;
   said suppressing means comprising the combination of:
      means for displacing the beam substantially as a unit during its projection; and
      said light of wavelength about 635 nanometers or longer.

3. A laser projector comprising:
   laser apparatus for projecting a picture beam that includes visible laser light of wavelength about six hundred thirty-five (635) nanometers or longer;
   a reflective liquid-crystal light valve for modulating the beam with a desired image; and
   further laser apparatus for projecting one or more picture beams that include green and blue laser light;
   wherein the laser light of wavelength about 635 nanometers or longer mixes with the green and blue laser light to provide substantially pure neutral colors including pure white and pure black; and
   the liquid-crystal light valve is controlled by light generated substantially in response to a type of traditional broadcast video signals; and
   substantially no color correction or gamma adjustment is applied to remove any color-balance effect of using said 635-nanometer or longer-wavelength laser light instead of broadcast video standard red.

4. A laser projector comprising:
   laser apparatus for protecting a picture beam that includes visible laser light of wavelength about six hundred thirty-five (635) nanometers or longer; and
   a reflective liquid-crystal light valve for modulating the beam with a desired image;
   wherein the laser light sometimes generates visible speckle when used to form a picture on a projection medium; and
   further comprising means for at least partly suppressing visible speckle when present in such a picture;
   said suppressing means comprising means for displacing the beam substantially as a unit during its projection.

5. The projector of claim 4, wherein:
   said suppressing means further comprise said light of wavelength about 635 nanometers or longer, in combination with the displacing means.

6. The projector of claim 5:
   wherein the liquid-crystal light valve has a beam-modulation stage for impressing the desired image onto the beam, and a control stage to control said impressing; and further comprising:
   means for writing an image incrementally onto successive portions of the control stage; and
   means for directing the beam onto successive selected portions of the modulation stage, and for generally synchronizing the directing means with the image-writing means.

7. A laser projector comprising:
   laser apparatus for protecting a picture beam that includes visible laser light of wavelength about six hundred thirty-five (635) nanometers or longer;
   a reflective liquid-crystal light valve for modulating the beam with a desired image;

wherein the liquid-crystal light valve has a beam-modulation stage for impressing the desired image onto the beam, and a control stage to control said impressing;

means for writing an image incrementally onto successive portions of the control stage; and means for directing the beam onto successive selected portions of the modulation stage, and for generally synchronizing the directing means with the image-writing means.

8. A laser projector for use in forming an image on an irregular projection medium having portions at distinctly different distances from the projectors said projector comprising:

laser apparatus for projecting a picture beam that includes visible laser light of wavelength about six hundred thirty-five (635) nanometers or longer;

a reflective liquid-crystal light valve for modulating the beam with a desired image;

wherein the liquid-crystal light valve operates by introducing at least partial disruption of the laser-light coherence; and means for projecting the picture beam onto such irregular projection medium to form an image that appears substantially sharp on said portions of distinctly different distances, notwithstanding said at least partial disruption of coherence.

9. A laser projector comprising:

laser apparatus for projecting along a path a picture beam that includes laser light which sometimes generates visible speckle when used to form a picture on a projection medium, said path having an axis; and means for at least partly suppressing visible speckle when in such a picture; and the suppressing means comprising means for displacing the axis of the path during projection of the beam.

10. A laser projector comprising:

laser apparatus for protecting along a path a picture beam that includes laser light which sometimes generates visible speckle when used to form a picture on a projection medium;

means for at least Partly suppressing visible speckle when in such a picture;

the suppressing means comprising means for displacing the path during projection of the beam; and a liquid-crystal light valve having a beam-modulation stage for impressing an image onto the beam; and wherein:

the displacing means scan the beam over the beam-modulation stage during said projection.

11. The projector of claim 10, wherein:

the displacing means comprise an optical deflecting element mounted for mechanical rotation.

12. The projector of claim 11, wherein:

the deflecting means comprise an optical deflecting element mounted for mechanical rotation.

13. The projector of claim 12, wherein:

the deflecting element comprises a mirror mounted on a galvanometer or motor.

14. The projector of claim 13, wherein:

the mirror is mounted for rotation about an axis substantially in a reflective surface of the mirror.

15. The projector of claim 10:

the light valve also having a control stage to control said impressing; and further comprising:

means for writing an image incrementally onto successive portions of the control stage; and means for controlling the displacing means to direct the beam onto successive selected portions of the modulation stage, and to generally synchronize the beam with the image-writing means.

16. The projector of claim 15, wherein:

the control stage is a photosensitive stage that receives an incrementally written optical image.

17. The projector of claim 15, wherein:

the control stage comprises an electrode matrix that receives incrementally written electrical voltages.

18. The projector of claim 10, for use in forming an image on an irregular projection medium having portions at distinctly different distances from the projector, wherein:

the displacing means are substantially nondiffusing; and the liquid-crystal light valve operates by introducing at least partial disruption of the laser-light coherence; and further comprising:

means for projecting the picture beam onto such irregular projection medium to form an image that appears substantially sharp on said portions of distinctly different distances, notwithstanding said at least partial disruption of coherence.

19. The projector of claim 9, wherein:

the displacing means are substantially lossless, to within one percent of beam intensity.

20. A laser projector comprising:

laser apparatus for projecting along a Path a picture beam that includes laser light which sometimes generates visible speckle when used to form a picture on a projection medium;

means for at least partly suppressing visible speckle when in such a picture;

the suppressing means comprising means for displacing the path during projection of the beam; and beam-expansion means; and wherein the displacing means and beam-expansion means cooperate to achieve a net gain in light-energy efficiency.

21. The projector of claim 20, wherein:

the gain in efficiency approaches approximately fifty-six percent, in comparison with masking off original circular edges of the laser beam.

22. The projector of claim 20, wherein:

for a projection-surface aspect ratio of four to three, the gain in efficiency approaches approximately sixty-four percent, in comparison with masking off original circular edges of the laser beam.

23. The projector of claim 20, wherein:

for a projection-surface aspect ratio of sixteen to nine, the gain in efficiency approaches approximately eighty-five percent, in comparison with masking off original circular edges of the laser beam.

24. The projector of claim 20, wherein:

the displacing means and beam-expansion means also cooperate to substantially eliminate initial nonuniformity of brightness in the beam.

25. The projector of claim 9, wherein:

the laser apparatus comprises one or more lasers; and every laser in the laser apparatus is exclusively a solid-state laser.

26. The projector of claim 9, wherein:

said projection medium has a shape;

the laser apparatus comprises optical means for shaping the picture beam to a cross-sectional shape shallower than the shape of said projection medium; and the displacing means also shift the picture beam on the projection medium, during said projection.

27. The projector of claim 26, wherein the optical means are selected from the group consisting of:

plural lenses in series for adjusting the beam dimension in two substantially perpendicular directions; and a curved mirror that forms part of the displacing means.

28. The projector of claim 26, further comprising:

a liquid-crystal light valve having a beam-modulation stage for impressing an image onto the beam, said modulation stage having a cross-sectional shape; and wherein:

the displacing means comprise a curved mirror that shapes the picture beam to a cross-sectional shape shallower than the cross-sectional shape of said modulation stage; and said curved mirror is mounted in a galvanometer movement or motor, to scan the shaped beam over said modulation stage.

29. A laser projector comprising:

laser apparatus for forming a picture beam that includes laser light;

said laser apparatus producing an initially substantially circular laser-light beam subject to nonuniform illumination;

means for transmitting a beam out of the projector for viewing by an audience as images on a substantially rectangular viewing screen that has a shape; and means for forming an illuminated image on the substantially rectangular viewing screen by using the circular laser-light beam without masking off significant fractions of the laser-light beam;

said illuminated-image-forming means comprising:

means for reshaping the initially circular laser-light beam to a laser-light beam of shallower shape than said shape of the substantially rectangular viewing screen, and means for scanning the reshaped laser-light beam over the screen.

30. The projector of claim 29, further comprising:

means for minimizing the influence of nonuniformity of illumination in the initially substantially circular laser-light beam;

said minimizing means comprising said reshaping and scanning means;

wherein the reshaping and scanning means cause said nonuniformity to at least partially average out.

31. The projector of claim 29, wherein:

the reshaping means introduce additional illumination nonuniformity along the width of the shallow, wide laser-light beam; and the illuminated-image-forming means further comprise means for compensating for the additional illumination nonuniformity.

32. A laser projection system for forming an image on an irregular Projection medium having portions at distinctly differing distances from the projector; said system comprising:

laser apparatus for protecting a picture beam that includes laser light;

a liquid-crystal light valve for impressing an image onto the beam; and means for protecting the beam from the light valve, with said impressed image, onto such irregular projection medium;

wherein the liquid-crystal light valve operates by partial disruption of laser-light coherence in the beam; and further comprising means for, notwithstanding said partial disruption of coherence, causing the image to appear sharp on said projection-medium portions of differing distances.

33. The system of claim 32, wherein:

the image appears substantially evenly illuminated, except where light is distributed over a receding surface.

34. A laser projection system for forming an image on an irregular projection medium which comprises a curved screen or dome having an image-receiving area that has a shape and that has portions at distinctly differing distances from the projector; said system comprising:

laser apparatus for projecting a picture beam that includes laser light;

a liquid-crystal light valve for impressing an image onto the beam; and means for projecting the beam from the light valve, with said impressed image, onto such irregular projection medium; and wherein the laser apparatus comprises means for shaping the beam to have a cross-sectional shape shallower than the shape of such image-receiving area, and means for scanning the beam on such irregular projection medium; and the beam at such irregular projection medium is substantially uniform in distribution across its cross-section.

* * * * *